United States Patent
Yamamoto et al.

(10) Patent No.: US 6,874,942 B2
(45) Date of Patent: Apr. 5, 2005

(54) ROLLING DEVICE

(75) Inventors: Toyohisa Yamamoto, Fujisawa (JP);
Norifumi Ikeda, Fujisawa (JP);
Kouichi Yamamoto, Fujisawa (JP)

(73) Assignee: NSK Ltd., Tokyo (JP)

( * ) Notice: Subject to any disclaimer, the term of this patent is extended or adjusted under 35 U.S.C. 154(b) by 132 days.

(21) Appl. No.: 10/296,155

(22) PCT Filed: Mar. 1, 2001

(86) PCT No.: PCT/JP02/01929

§ 371 (c)(1),
(2), (4) Date: Nov. 22, 2002

(87) PCT Pub. No.: WO02/070910

PCT Pub. Date: Sep. 12, 2002

(65) Prior Publication Data

US 2003/0198417 A1 Oct. 23, 2003

(30) Foreign Application Priority Data

| Mar. 2, 2001 | (JP) | 2001-59128 |
| Mar. 5, 2001 | (JP) | 2001-60103 |
| Mar. 7, 2001 | (JP) | 2001-62975 |
| Mar. 28, 2001 | (JP) | 2001-94256 |
| Jun. 12, 2001 | (JP) | 2001-177705 |
| Jul. 5, 2001 | (JP) | 2001-302300 |
| Jan. 16, 2002 | (JP) | 2002-7937 |
| Jan. 28, 2002 | (JP) | 2002-18916 |
| Feb. 15, 2002 | (JP) | 2002-37590 |

(51) Int. Cl.⁷ ............................................. F16C 33/44
(52) U.S. Cl. .................. 384/492; 384/907.1; 384/45
(58) Field of Search .............................. 384/492, 907.1, 384/43–45

(56) References Cited

U.S. PATENT DOCUMENTS 6,174,089 B1 * 1/2001 Kitamura et al. ........... 384/492

FOREIGN PATENT DOCUMENTS

| JP | 173204 | 11/1984 |
| JP | 19956 | 1/1986 |
| JP | 62024025 | 2/1987 |
| JP | 140042 | 9/1987 |
| JP | 04248018 | 9/1992 |
| JP | 07042732 | 2/1995 |
| JP | 2054857 | 3/1995 |
| JP | 07144967 | 6/1995 |
| JP | 08121488 | 5/1996 |
| JP | 09157030 | 6/1997 |
| JP | 09165265 | 6/1997 |
| JP | 10082426 | 3/1998 |
| JP | 11062958 | 3/1999 |
| JP | 2000205276 | 7/2000 |
| JP | 2000319064 | 11/2000 |
| JP | 2001271842 | 10/2001 |
| JP | 2001328869 | 11/2001 |
| JP | 2001335363 | 12/2001 |
| JP | 2001335369 | 12/2001 |
| JP | 2002005180 | 1/2002 |

* cited by examiner

Primary Examiner—Thomas R. Hannon
(74) Attorney, Agent, or Firm—Crowell & Moring LLP

(57) ABSTRACT

A guide rail 13 is formed of a ceramic material having a specific strength of $2 \times 10^7$ mm or more and has a planar part with a surface roughness of 0.5 μmRa or less. Further, the guide rail 13 has a recess 18 for avoiding interference with a part to be attached in which the corner 18a of the recess 18 is formed with a radius of curvature of 0.1 mm or more.

26 Claims, 21 Drawing Sheets

CORRESPONDING TO TABLES-9,10

ROLLING DEVICE

TECHNICAL FIELDS

This invention relates to a rolling device such as a rolling bearing, a linear motion guiding device or a ball screw and, more in particular, it relates to a rolling device that can be used under high load at high speed, in a corrosive circumstance, high temperature circumstance or in a circumstance supporting a radial load, such as in various kinds of spindles, various kinds of pumps, semiconductor production apparatus (transportation apparatus and the like), machine tools and turbines.

BACKGROUND ART

Electronic part mounting apparatus used, for example, in the process of producing electronic equipments such as computers or mobile telephones are adapted, for example, such that an electronic part suction head is disposed vertically movably above an X-Y table on which a substrate is placed and electronic parts are mounted at predetermined positions on the substrate by sucking electronic parts such as semiconductor devices by the head. Accordingly, for mounting electronic parts exactly to predetermined positions on the substrate in such electronic part mounting apparatus, it is necessary to improve the positioning accuracy for the X-Y table, as well as improve the positioning accuracy of a head lifting mechanism for reciprocating the electronic part suction head in the vertical direction and, for this purpose, it is necessary to improve the positioning accuracy of a linear motion guiding device used as a linear guide for the head lifting mechanism.

Particularly, along with size-reduction of the electronic equipments themselves in recent years, size reduction of electronic parts mounted on a substrate and high integration degree of the substrate have been proceeded and, since the positioning accuracy upon mounting the electronic parts reaches the order of several $\mu$m, the positioning accuracy required for the linear motion guiding device has been increased more and more.

Further, for improving the production efficiency, the mounting speed has also tended to be increased and, for enabling mounting of electronic parts at such a speed, for example, of 0.5 to 0.1 sec or less for one cycle, a head lifting mechanism capable of vertically moving the electronic part suction head at a high speed is required and, for this purpose, the linear motion guiding device assembled into the head lifting mechanism also has to cope with high speed reciprocation of the head. Further, they are required not only for the linear motion guiding device used in the head lifting mechanism described above but also for the linear motion guiding device, for example, used as a bonding head lifting mechanism of a wire bonding apparatus.

By the way, for vertically moving, for example, an electronic part suction head of an electronic part mounting apparatus or a bonding head of a wire bonding apparatus accurately and at a high speed, it is necessary to increase the rigidity of a guide rail of a linear motion guiding device to decrease distortion or vibration caused to the guide rail. As a linear motion guiding device intended to increase the rigidity of such guide rail, a device disclosed, for example, in Japanese Published Unexamined Patent Application No. 175691/1987 (Japanese Published Examined Patent Application No. 44051/1994) has been known. Further, Japanese Published Unexamined Patent Application No. 62958/1999 discloses a technique of using cemented carbides as the rail materials for the guide rail.

However, in the linear motion guiding device disclosed in Japanese Published Unexamined Patent Application No. 175691/1987, the guide rail is formed of a ceramic material having a specific rigidity of $0.8 \times 10^8$ mm or more and its application to the electronic part mounting apparatus or the wire bonding apparatus has been difficult by the following reasons.

That is, most of the electronic part mounting apparatus and the wire bonding apparatus generally have a constitution in which a slider of the linear motion guiding device is fixed on a support bed or the like, while the guide rail is moved to reciprocate the head. On the contrary, since the linear motion guiding device disclosed in the publication above has a constitution of fixing both ends of the guide rail on the supporting bed or the like and moving the slider in use, it is not suitable to the application to the electronic part mounting apparatus or wire bonding apparatus described above.

Further, since most of the electronic part mounting apparatus conduct a series of steps from suction to mounting of electronic parts continuously, a so-called machine gun system of disposing plural guiding rails on a rotating drum to continuously mount electronic parts has been adopted. Accordingly, since vertical movement for mounting the electronic parts and, in addition, rotational acceleration due to the rotation of a drum synchronized therewith exert on the guide rails, inertia force generated by the own weight of the rails or head weight exerts as a bending moment on the guide rails. Particularly, when the cycle time for the vertical movement of the guide rail exceeds 0.2 sec, acceleration applied on the guide rail increases to as high as about several to ten G and, in addition, acceleration in the circumferential direction of the drum also reaches about several G. Accordingly, a sufficient strength is required for the guide rail used under such conditions regarding the composite acceleration described above and the inertia force generated by the own weight of the rail and the mass of the head.

However, in the guide rail formed of ceramics disclosed in the publication described above, while hardness and rigidity are high, the bending strength is not so high, and the bending strength is lower compared with guide rails formed of iron and steel materials such as bearing steels or stainless steels. Further, when a large bending moment is loaded on the guide rail, the guide rail is fractured in a case where the bending strength is insufficient even if the constituent material therefor is alumina ceramics, silicon carbide ceramics or silicon nitride. Accordingly, it is difficult to increase the speed of the apparatus by merely forming the guide rail of ceramics regarding the reliability in view of the strength (particularly, reliability to bending strength).

Further, the guide rail formed of a brittle material such as ceramics is also sensitive to the change of strength (stress concentration) depending on the rail shape and, in a case where attaching holes for attaching parts such as a head or recesses or the like for avoiding interference with attaching parts are provided to the guide rail, stresses tend to be concentrated to the portions. Accordingly, it is difficult to increase the speed of the apparatus by merely constituting the guide rails with ceramics in view of the reliability for the strength (particularly, bending strength).

Further, while the rigidity of the rail per se is increased by forming the rail material of ceramic material, surface contact pressure with a rolling member incorporated in a slider increases, which increases the load on the rolling member compared with a case of using a rail formed of steels. For example, when silicon nitride is used as the rail material and the rolling element is constituted with martensitic stainless steel, a difference of twice or more is caused for the hardness between them and wear of the rolling element is sometimes accelerated compared with a case of using a rail formed of steels.

On the other hand, as disclosed in Japanese Published Unexamined Patent Application No. 62958/1999, a material of high rigidity, that is, a material of high young's modulus as the material property includes cermet or cemented carbide. Cermet or cemented carbide has young's modulus as high as about 300 GPa–650 GPa compared with metal a material such as bearing steel(250 GPa) and it is high also compared with various ceramics(silicon nitride at about 250 GPa–350 GPa, alumina at about 350 GPa–420 GPa and silicon carbide at about 400 GPa–420 GPa). Accordingly, when the guide rail is formed of a cermet or cemented carbide having high young's modulus, rigidity of the guide rail can be increased. However, when the guide rail rotates while moving vertically at a high speed as in the electronic part mounting apparatus or wire bonding apparatus, large inertia force is generated by acceleration or own weight of the rail and the head weight, and the driving performance (cycle speed, response performance) is deteriorated by the inertia force. Further, since the inertia force is also increased when the density(mass) of the guide rail is large in this case, the bending strength of the guide rail is insufficient to sometimes result in fracture even in a case of using the cermet or cemented carbide as the rail material.

Further, when the ceramic material(particularly, usual silicon nitride) is used as the rail material, the heat conductivity is low and heat tends to be accumulated in the inside of the apparatus. That is, when the guide rail is formed of a ceramic material of poor heat conductivity such as silicon nitride, since the temperature on the sliding surface of the guide rail becomes higher during operation and the grease viscosity lowers due to the temperature elevation on the rail sliding surface compared with a case of using iron and steel material such as bearing steels as the rail material, formation of oil membranes between the rolling element and the surface of the rail groove is inhibited to cause wear or minute seizure of the rolling element. They cause generation of vibrations during operation of the linear motion guiding device, giving undesired effects on the accuracy in the repetitive positioning. Further, temperature elevation of the rail material accelerates thermal expansion of the guide rail, which also gives undesired effects on the accuracy in the repetitive positioning.

Further, for obtaining stable accuracy in the repetitive positioning for a long time, a rail material of good heat dissipation is necessary. Particularly, the speed as the operation condition increases more and more and, in addition, demand for the accuracy in the repetitive positioning becomes more stringent in the linear motion guiding device. For satisfying such requirements, it necessitates a linear motion guiding device capable of ensuring the positioning accuracy for a long time with less positional displacement caused by elastic deformation of the rail material, as well as with less occurrence of thermal expansion or wear of the rolling element by the improvement in the heat dissipation of the apparatus.

By the way, since various chemicals are used in the cleaning step or film deposition step upon manufacture of semiconductors, liquid crystal panels and hard discs, it is required for the rolling device used in such steps to operate with no troubles even in a corrosive atmosphere such as in an atmosphere of chemicals. Further, in view of increase in the diameter of wafers or liquid crystal panels, it results in the requirement for the rolling device to support larger load.

Japanese Published Unexamined Patent Application No. 121488/1996 discloses a corrosion resistant rolling bearing in which an outer ring is formed of ceramic material manufactured by an atmospheric pressure sintering process and an inner ring is formed of a ceramics material manufactured by a gas pressure sintering process or an HIP process.

Further, Japanese Published Unexamined Patent Application No. 82426/1998 discloses a rolling bearing formed of ceramics of excellent corrosion resistance in which each of an inner ring, an outer ring and rolling elements is constituted with silicon carbide.

On the other hand, in jet engines or gas turbines, since the efficiency has been improved in view of energy saving and environmental problem, it is required for the rolling device used therefor to operate with no troubles under higher load and at higher temperature.

However, in the rolling bearing described in Japanese Published Unexamined Patent Application No. 121488/1996, since the outer ring is manufactured by an atmospheric pressure sintering process, it involves the following problems. That is, a member manufactured by the atmospheric pressure sintering process has low strength and fracture toughness in which micro-cracks tend to develop starting from the surface or internal. Accordingly, a great amount of abrasion powder is formed or cracks are resulted to sometimes shorten the life of the rolling bearing.

Particularly, when the rolling bearing supports a radial load, since the load is concentrated to a load region of the outer ring, cracks propagate easily in the load region of the outer ring manufactured by the atmospheric pressure sintering process even under a slight load to sometimes shorten the life extremely.

Further, in a case where the inner ring, the outer ring and the rolling elements are constituted with silicon carbide as in the rolling bearing described in Japanese Published Unexamined Patent Application No. 82426/1998, although the corrosion resistance is excellent, it involves a problem that the strength and the fracture toughness are low. When a load exerts to some extent on the rolling bearing, cracks propagate on the surface or through the entire portion to sometimes cause flaking or cracking.

Particularly, when the rolling bearing supports a radial load, since the load is concentrated in the load region of the outer ring, flaking and cracking occur to sometimes shorten the life extremely even under a slight load.

Further, Japanese Published Examined Patent Application No. 30788/1995 proposes a rolling bearing having rolling elements between an inner ring fitted to a steel shaft and an outer ring held on a housing, in which the material for the inner ring is formed of a material of lower linear expansion coefficient than the material for the outer ring and the linear expansion coefficient of the material for the inner ring is less than the linear expansion coefficient for the material of a steel shaft fitted to the inner ring.

In machine tools or various kinds of spindles, rotation has tended to be increased more and more in recent years, and the rolling bearing for supporting the rotational portion, for example, of the machine tools is also required to operate at high accuracy and under severe working conditions. Further, also in a usual bearing support device, since heat of the outer ring along with heat generation tends to be dissipated relatively easily through a housing but the heat of the inner ring is less dissipated from the side of the shaft, the temperature of the inner ring tends to be higher compared with the outer ring.

However, in an existent rolling bearing in which the outer ring and the inner ring are formed of an identical material, for example, a high carbon chromium bearing steel material such as bearing steel (SUJ2), when the temperature of the inner ring is higher than that of the outer ring due to the heat generation of the bearing or the heat from the outside to cause a temperature difference between the outer ring and the inner ring of the bearing, an internal gap of the bearing is decreased compared with a case before heat generation. Accordingly, under severe working conditions at high speed rotation, particularly, the radial gap of the bearing is excessively small or a preload becomes excessive by the change of the gap to sometimes bring about seizure or shorten the working life extremely.

Usually, in a case where the rotational speed is constant, it may suffice that a rolling bearing which was previously compensated so as to give an optimal gap or an optimal preload under the specified working conditions is selected and assembled. However, in a case where rotational conditions changes variously, and heat generation is large in the inside of the bearing or external heat is conducted to cause a temperature difference in the inside of the bearing, the gap in the inside of the bearing or the preload caused by the change of the gap may be adjusted by an external force(for example, by oil pressure mechanism) by detecting the temperature of the bearing assembled into the rotational device, but this involves a drawback that the device is complicated and becomes expensive.

Further, in the technique described in Japanese Published Examined Patent Application No. 30788/1995, since the material for the inner ring is formed of a material of smaller linear expansion coefficient than that of the material for the outer ring, and since the thermal expansion coefficient of the inner ring is smaller than the thermal expansion coefficient for the material of the steel shaft fitted to the inner ring, change of the gap is smaller compared with the case where the inner ring and the outer ring are formed of an identical material.

However, as the rotational speed increases and the heat generation increases to increase the temperature gradient in the rolling device, since the rolling element is formed of a bearing steel of the same material as that for the outer ring and the amount of thermal expansion is large, even if the amount of thermal expansion of the inner ring is less than the amount of the thermal expansion of the outer ring, the gap becomes insufficient to cause seizure or to sometimes shorten the life excessively.

Further, while Japanese Published Unexamined Patent Application No. 205276/2000 discloses a rolling bearing in which the heat conductivity of the ceramic material constituting the outer ring is made larger than the heat conductivity of the ceramic material constituting the inner ring and the rolling element, the rolling bearing described in this publication involves the following problems. That is, since some of the ceramic materials are insufficient in the thermal impact resistance or bending strength, when they are used in a high temperature atmosphere or high temperature/corrosive atmosphere, a temperature gradient is caused in the bearing and thermal stresses are generated by the temperature gradient. Then, micro-cracks propagate on the surfaces of the outer ring or the inner ring to sometimes form a great amount of abrasion powder, or cracks penetrate the member to cause breakage to shorten the working life of the rolling bearing.

On the other hand, since a rolling bearing used in a molten metal plating apparatus is used in a state immersed in a molten metal, it is required to be excellent in corrosion resistance to the molten metal. The rolling bearing described above is generally constituted with an iron and steel material. However, since the corrosive property of the molten metal to the iron and steel material is extremely strong and the level of the corrosion resistance of the iron and steel material directly gives an effect on the rolling life of the rolling bearing, a rolling bearing in which a portion in contact with the molten metal is constituted with a ceramic material has been proposed(for example, in Japanese Published Unexamined Utility Model Application No. 89428/1988 and Japanese Published Unexamined Utility Model Application No. 90852/1986).

However, although Japanese Published Unexamined Utility Model Application No. 89428/1988 and Japanese Published Unexamined Utility Model Application No, 90852/1986 disclose the names of various ceramics materials constituting the rolling bearing($Si_3N_4$, SiC, $Al_2O_3$ and sialon), the thermal impact resistance value and the bending strength thereof are not described at all. Even when the rolling bearing is constituted with $Si_3N_4$, SiC, $Al_2O_3$ or sialon, when the thermal impact resistance value or bending strength is insufficient, micro-cracks propagates on the surface of the constituent members to cause a great amount of abrasion powder or cracks penetrate the constituent members to sometimes cause breakage.

OBJECT OF THE INVENTION

A first object of this invention is to provide a rolling device operating, particularly, at a high speed capable of effectively suppressing lowering of the accuracy in the repetitive positioning caused by thermal expansion of a support, wear of rolling elements or the like, capable of being used stably for a long period of time and capable of improving the strength of a support to a bending moment while keeping a high rigidity of the support and suppressing the wear of rolling elements.

A second object of this invention is to provide a rolling device formed of a ceramic material having a long life even when used under a high load, at a high speed in a corrosive circumstance, in a high temperature circumstance, or in a circumstance of supporting a radial load.

A third object of this invention is to provide a rolling device that can be used in a location suffering from large thermal expansion due to temperature elevation or in a location of causing temperature gradient in the inside of the rolling device.

A fourth object of this invention is to provide a long life rolling device which is excellent in corrosion resistance, thermal impact resistance and wear resistance and having a long life even when used in a high temperature/corrosive circumstance or in a high temperature circumstance at a high speed.

SUMMARY OF THE INVENTION

A rolling device according to this invention is a rolling device comprising a movable member capable of rotation or capable of linear motion, a support for supporting the movable member and a plurality of rolling elements disposed rotationally between the movable member and the support in which at least one of the movable member, the support and the rolling elements is formed of one of materials of ceramic materials, cermets and cemented carbides, and the material has a ratio of bending strength to density (hereinafter referred to as "specific strength") of $1.2 \times 10^7$ mm or more.

In a preferred embodiment of this invention, the movable member, the support and the rolling members are formed of at least one of materials of the ceramic materials, cermets and cemented carbides and have a bending strength of 500 MPa or more during use.

With the constitution described above, since cracks less propagate on the surface or in the inside of the ceramic material and flaking or wear less occurs, the rolling device has a long life even when operated at a high speed.

Each of the materials for constituting the movable member, the support and the rolling elements may be of an identical material or of different material so long as the bending strength of each material is 500 MPa or more and the specific strength is $1.2 \times 10^7$ mm ore more in the working circumstantial temperature. Naturally, two of the movable member, the support and the rolling elements may be formed of an identical material and the remaining one may be formed of a different kind of materials.

In another preferred embodiment according to this invention, the movable member and the rolling member are formed of one of materials of ceramic materials, cermets and cemented carbides and have a bending strength of 500 MPa or more during use. Further, the material constituting the movable member and the rolling element has a specific strength of $1.2 \times 10^7$ mm or more and the specific strength is set to a value greater than that of the material constituting the support (ceramic material, cermet or cemented carbide).

With the constitution described above, in the movable member or the rolling element to which hoop stress or centrifugal force exerts during operation, cracks less propagate on the surface or in the inside and flaking or wear less occurs. As a result, since flaking or wear by the hoop stress as a main cause for the exhaustion of life upon operation at high speed can be suppressed effectively, the rolling device has a long life even when it is operated at a high speed.

The specific strength of the material constituting the movable member, the support and the rolling element (ceramic material, cermet or cemented carbide) is preferably $1.5 \times 10^7$ mm or more and, further preferably, $1.8 \times 10^7$ mm or more.

In this case, when the specific strength is less than $1.2 \times 10^7$ mm, since cracks tend to propagate starting from defects on the surface or in the inside, to possibly form a great amount of abrasion powder or cause cracks, the life of the rolling device is sometimes shortened. Particularly, when the operation speed is high, cracks propagate relatively easily to cause flaking or cracking even under a light load by the hoop stress exerting on the movable member by the centrifugal force, to possibly shorten the life of the rolling device extremely.

In a further preferred embodiment according to this invention, the material constituting the movable member, the support and the rolling element (ceramic material, cermet or cemented carbide) has a thermal impact resistance value of 1.5 times or more relative to the working circumstantial temperature, as well as has a bending strength of 500 MPa or more and a specific strength of $1.2 \times 10^7$ mm or more (at working circumstantial temperature).

With the constitution described above, even in a case where it is used in a high temperature circumstance or in a high temperature/corrosive circumstance, and temperature gradient is caused in the inside of the rolling device by heating and thermal stress is caused by the temperature gradient, micro-cracks less propagate on the surface of the movable member or the support, wear and cracks are less caused. Accordingly, the rolling device has a long life even in a high temperature circumstance or in a high temperature/corrosive circumstance.

The value of the thermal impact resistance is more preferably 2.0 times or more relative to the working circumstantial temperature and, the bending strength is more preferably 500 MPa or more.

In a case where the value of the thermal impact resistance is less than 1.5 times of the working circumstantial temperature of the rolling device, the bending strength is less than 500 MPa during use of the rolling device and the specific strength is less than $1.2 \times 10^7$ mm, a temperature gradient is formed in the inside of the rolling device by being used and heated in a high temperature circumstance or high temperature/corrosive circumstance, and micro-cracks propagate on the surface of the movable member or the support, the abrasion powder is generated in a great amount, or cracks penetrate the member upon occurrence of thermal stress by the temperature gradient, to result in cracking and sometimes shorten the life of the rolling device.

In a further preferred embodiment according to this invention, the material constituting the movable member, the support and the rolling element (ceramic material, cermet or cemented carbide) has the thermal impact resistance value of 1.5 times or more to a molten metal temperature and has a bending strength of 800 MPa or more and a specific strength of $1.2 \times 10^7$ mm or more (upon contact with molten metal).

When the thermal impact resistance value of the material is 1.5 times or more to the molten metal temperature, even when thermal stresses are generated by the heating of the rolling device upon immersion in the molten metal or upon cooling thereof when taken out from the molten metal, micro-cracks less propagate on the surface of the movable member and the support. Accordingly, it less suffers from generation of the abrasion powder in a great amount or micro-cracks less propagate on the surface of the movable member or the support.

Further, when the bending strength of the material is 800 MPa or more during use of the rolling device, even when a relatively high contact stress of 1–2.5 GPa is loaded repetitively between the movable member and the rolling element and between the support and the rolling element, micro-cracks less occur to the surface and lowering of the life can be suppressed.

Accordingly, the rolling device has a long life even when it is used in a high temperature circumstance such as upon contact with the molten metal.

When the thermal impact resistance value is less than 1.5 times relative to the molten metal temperature, the bending strength is less than 800 MPa during use or the specific strength is less than $1.2 \times 10^7$ mm, micro-cracks propagate on the surface of the movable member or the support by loading of thermal stress or repetitive stress, to form a great amount of abrasion powder or cause cracking to the movable member or the support to sometimes shorten the life of the rolling device.

The thermal impact resistance value referred to herein means a numerical value obtained by the following method. That is, after immersing a test specimen formed of a ceramic material, cermet or cemented carbide at high temperature ($T_1$) into water at normal temperature ($T_2$) and quenching the same, the bending strength of the test specimen is measured. In this case, the cooling temperature difference at which the bending strength lowers abruptly: $\Delta T = T_1 - T_2$ (° C.) is defined as a thermal impact resistance value.

In some existent rolling devices, at least one of the movable member, the support and the rolling element is formed of a metal material (bearing steel or stainless steel).

In this case, since the metal material may cause adhesion at the point of contact to possibly cause seizure, the life of the rolling device is sometimes shortened extremely. Further, the metal material is sometimes insufficient in the rigidity or the corrosion resistance.

However, when all of the movable member, the support and the rolling element are formed of the ceramic material as described above, there are no problems as described above and the device is light in weight and highly rigid, excellent in wear resistance, causing less adhesion and further excellent in corrosion resistance and heat resistance.

Further, when the rolling element is constituted with a ceramic material of high specific strength, the centrifugal force exerting on the rolling element during operation is decreased, higher speed operation is possible and the heat generation is lowered compared with the existent rolling device in which the rolling element is constituted with a metal material.

There is no particular restriction on the ceramic material usable in this invention and they can include, for example, silicon nitride ($Si_3N_4$) series, zirconia ($ZrO_2$) series, alumina ($Al_2O_3$) series, silicon carbide (SiC) series, aluminum nitride (AlN) series, boron carbide ($B_4C$) series, titanium boride ($TiB_2$) series, boron nitride (BN) series, titanium carbide (TiC) series, titanium nitride (TiN) series, or ceramic series composite materials formed by compositing two or more kinds of ceramic materials among them.

Further, in the ceramic material used in this invention, a fibrous filler can be blended in order to improve, for example, the specific strength, fracture toughness, and mechanical strength. There is no particular restriction on the kind of the fibrous filler and it can include, for example, silicon carbide whisker, silicon nitride whisker, alumina whisker and aluminum nitride whisker.

There is no particular restriction on the cermet and the cemented carbide usable in this invention. The cermet and the cemented carbide are alloys formed by sinter bonding the powder of carbide of nine kinds of metals belonging to the groups IVa, Va, VIa in the periodical table (W, Mo, Cr, Ta, Nb, V, Hf, Zr, Ti) by using iron group metals such as iron, cobalt and nickel.

The cermet can include, for example, TiC—Ni series, TiC—Mo—Ni series, TiC—Co series, TiC—Mo$_2$C—Ni series, TiC—Mo$_2$C—ZrC—Ni series, TiC—Mo$_2$C—Co series, Mo$_2$C—Ni series, Ti(C, N)—Mo$_2$C—Ni series, TiC—TiN—Mo$_2$C—Ni series, TiC—TiN—Mo$_2$C—Co series, TiC—TiN—Mo$_2$C—TaC—Ni series, TiC—TiN—Mo$_2$C—WC—TaC—Ni series, TiC—WC—Ni series, Ti(C, N)—WC—Ni series, TiC—Mo series, Ti(C, N)—Mo series, boride series (MoB—Ni series, $B_4$C/(W, Mo)$B_2$ series, etc.).

Ti(C, N)—MO$_2$C—Ni series, Ti(C, N)—WC—Ni series, Ti(C, N)—Mo series are alloys formed by sintering TiC—Mo$_2$C—Ni series, TiC—WC—Ni series, TiC—Mo series in a nitrogen gas.

A typical composition of the cermet is, for example, TiC-30% Mo$_2$C-20% Ni, TiC-19% Mo$_2$C-24% Ni, TiC-8% Mo$_2$C-15% Ni, Ti(C, N)-25% Mo$_2$C-15% Ni, TiC-14% TiN-19% Mo$_2$C-24% Ni, TiC$_{0.7}$N$_{0.3}$-11% Mo$_2$C-24% Ni, TiC$_{0.7}$N$_{0.3}$-19% Mo$_2$C-24% Ni, TiC$_{0.7}$N$_{0.3}$-27% MO$_2$C-24% Ni, TiC-20% Mo-15% Ni and TiC-30% Mo-15% Ni.

Further, the cemented carbide can include, for example, WC—Co series, WC—Cr$_3$C$_2$—Co series, WC—TaC—Co series, WC—TiC—Co series, WC—NbC—Co series, WC—TaC—NbC—Co series, WC—TiC—TaC—NbC—Co series, WC—TiC—TaC—Co series, WC—ZrC—Co series, WC—TiC—ZrC—Co series, WC—TaC—VC—Co series, WC—TiC—ZrC—Co series, WC—TiC—Cr$_3$C$_2$—Co series and WC—TiC—TaC series.

Further, the cemented carbide of non magnetic property and excellent corrosion resistance can include, for example, WC—Ni series, WC—Co—Ni series, WC—Cr$_3$C$_2$—MO$_2$C—Ni series, WC—Ti(C, N)—TaC series, WC—Ti(C, N) series, and Cr$_3$C$_2$—Ni series.

A typical composition for the WC—Co series is W:Co:C= 70.41-91.06:3.0-25.0:4.59-5.94. Further, a typical composition for WC—TaC—NbC—Co series is W:Co:Ta:Nb:C= 65.7-86.3:5.8-25.0:1.4-3.1:0.3-1.5:4.7-5.8. Further, a typical composition for WC—TiC—TaC—NbC—Co series is W:Co:Ta:Ti:Nb:C=65.0-75.3:6.0-10.7:5.2-7.2:3.2-11.0:1.6-2.4:6.2-7.6. Further, a typical composition for WC—TaC—Co series is W:Co:Ta=53.51-90.30:3.5-25.0:0.30-25.33. Further, a typical composition for WC—TiC—Co series is W:Co:Ti=57.27-78.86:4.0-13.0:3.20-25.59. Further, a typical composition for WC—TiC—TaC—Co series is W:Co:Ta:Ti:C=47.38-87.31:3.0-10.0:0.94-9.38:0.12-25.59:5.96-10.15.

In a preferred embodiment according to this invention, at least one of the movable member, the support and the rolling element is formed of a boride series cermet, has a bending strength of 850 MPa or more during use and has a fracture toughness of 10 MPa·m$^{1/2}$. Further, other members than described above are formed of the ceramic material, cermet or cemented carbide.

The boride series cermet is an alloy formed by bonding a hard phase of a boride having high melting point with a bonding phase of a heat resistant Ni-base alloy (hard phase is $M_2TB_2$ (M is mainly Mo and/or W and T is mainly Ni)). With the structure described above, lowering of hardness and bending strength is small from a room temperature to a high temperature region. Further, the boride series cermet is not only excellent in the wear resistance but also has an effect of reducing the wear of a mating material. Further, when it is present as a fine dispersed layer in the Ni-base alloy, the high temperature strength of the bonding phase can be improved without so much deterioration for the toughness.

In this invention, it is preferred that the boride series cermet has a bending strength of 850 MPa or more and a specific strength is $1.2 \times 10^7$ mm or more at a working circumstantial temperature. In view of the availability from the market, while the bending strength at the working circumstantial temperature is desirably 2600 MPa or less but it is not particularly restricted. Particularly, in a case where a relatively high contact stress of 1 GPa or more is loaded repetitively between the movable member and the rolling element and between the support and the rolling element, less micro-cracks occur to the surface of the rolling element and the rolling surface, which can suppress deterioration of life and acoustic characteristics.

It is preferred that the fracture toughness of the boride series cermet is 10 MPa·m$^{1/2}$ or more. In a case where the rolling device is heated by a working circumstance atmosphere or cooled to a normal temperature atmosphere, a large temperature gradient is formed in the inside to cause thermal stresses, but so long as the fracture toughness is 10 MPa·m$^{1/2}$ or more, less thermal stress-induced cracks are generated on the surface of the movable member and the support. For obtaining the above mentioned effect more sufficiently, it is more preferred that the fracture toughness of the boride series cermet is 12 MPa·m$^{1/2}$ or more.

Further, the thermal expansion coefficient of the boride series cermet is $8-9 \times 10^{-6}$/° C. which is closely approximate to that of metals. In a case where the thermal expansion coefficient of the boride series cermet is $8-9 \times 10^{-6}$/° C., when a roll used in a molten metal bath is, for instance, immersed in a molten metal or when it is taken out of the molten metal for maintenance, even when thermal stress generated due to the difference of the linear expansion coefficient between the shaft and the housing exerts on the bearing, since cracking and chipping do not occur for the bearing material, so that this can suppress the lowering of the life of the rolling bearing.

The rolling device according to this invention can include, for example, a rolling bearing, a linear motion guiding device, a ball screw and a linear motion bearing. In a case where the rolling device is a rolling bearing, a rotational ring corresponds to the movable member and a fixed ring corresponds to the support. Further, in a case where the rolling device is a linear motion guiding device, a slider corresponds to the movable member or the support while the guide rail corresponds to the support or the movable member. Further, in a case where the rolling device is a ball screw, a nut corresponds to the movable member and a screw shaft corresponds to the support. Then, in a case where the rolling device is a linear motion bearing, an outer cylinder corresponds to the movable member and a shaft corresponds to the support.

In a further embodiment according to this invention, the movable member, the support and the rolling element are formed of the ceramic material and the ceramic material is a ceramic material having a ratio of a fracture toughness value (MPa·m$^{1/2}$) and a Vickers hardness (GPa) (fracture toughness value/Vickers hardness) of 0.25 or more and a specific strength of $1.2 \times 10^7$ mm or more.

With the constitution described above, since cracks less propagate on the surface or in the inside of the ceramic material, flaking and wear less occur. Accordingly, the rolling device can operate even under a high load and has long life. That is, in the use under the high load, it is more important that the fracture toughness value and the specific strength are excellent with a view point of preventing cracks from propagation.

Each of the ceramic materials forming the movable member, the support and the rolling element may be of an identical kind of ceramic material, or may be of different kinds of ceramic materials so long as the ratio of the fracture toughness value and the Vickers hardness (fracture toughness value/Vickers hardness) is 0.25 or more and the specific strength is $1.2 \times 10^7$ mm or more. Naturally, two of the movable member, the support and the rolling element may be formed of an identical kind of ceramic material and remaining one of them may be formed of different kinds of ceramic materials.

In a further preferred embodiment according to this invention, the ceramic material is silicon nitride having a specific strength of $1.2 \times 10^7$ mm or more with a particle diameter of 1 μm or less.

Fine silicon carbide particles of nano-meter size with the particle diameter of 1 μm or less blended as a dispersion phase ingredient in silicon nitride have a pinning effect to the silicon nitride particles in the sintering process (effect of stopping the growing of the crystal grains to refine the structure), and moderate the grain boundary movement thereby suppressing the grain growth of silicon nitride and refine the micro-structure of the sintered product. Further, they are distributed within the grain and at the grain boundary of silicon nitride to strengthen the grain boundary and also act as bridges for crackings.

As the result described above, since flaking and detaching of particles from the sliding surface can be suppressed and prevented, the strength and the toughness are improved and the wear resistance is also enhanced, the rolling device can operate stably for a long time. Further, since fine silicon carbide particles distributed within the grain and at the grain boundary of the silicon nitride matrix increase the toughness of the silicon nitride matrix particles, suppress and prevent flaking and detaching of the particles from the sliding surface. In addition, since the wear coefficient of silicon carbide is smaller compared with that of silicon carbide (for example, silicon carbide: 0.2–0.4, silicon nitride: 0.5–0.6, for mating member of sintered tungsten carbide), favorable sliding property can be obtained as the effect of incorporation thereof even in a circumstance of insufficient lubrication.

Further, since silicon carbide is extremely hard compared with silicon nitride (silicon carbide: Hv 2200–2400, silicon nitride: Hv 1200–1400), dispersion of the fine particles contributes to the enhancement of the wear resistance of the sintered product. In addition, since the heat conductivity of silicon carbide is extremely larger compared with silicon nitride (silicon carbide: 60–270 W/m·K(25° C.), silicon nitride: 17–31 W/m·K(25° C.)), distribution of the silicon carbide particles can increase the heat conductivity of the sintered product, accelerate heat diffusion from the contact surface during actual use of the rolling device and suppress seizure caused by the temperature elevation at the contact surface.

In a further embodiment according to this invention, assuming the ratio of the fracture toughness value and the Vickers hardness of the ceramic material constituting the support as A1, the ratio of the fracture toughness value and the Vickers hardness of the ceramic material constituting the rolling element as A2, and ratio of the fracture toughness value and the Vickers hardness of the ceramic material constituting the movable element as A3, A1 and A2 are defined as: A2>A3, and the specific strength is $1.2 \times 10^7$ mm or more.

In a rolling bearing for supporting the radial load, since the load is concentrated to the load region of an outer ring, cracks tend to propagate easily in the load region of the outer ring to sometimes shorten the life of the rolling bearing extremely. However, in the rolling bearing of the constitution as described above, cracks less propagate on the surface or in the inside of the ceramic material in the outer ring having the load region in which the load is concentrated, and flaking and wear less occur. Accordingly, flaking or wear in the outer ring which is mainly attributable to the life of the rolling bearing for supporting the radial load can be suppressed effectively and, as a result, the life of the rolling bearing is long even in a case where a high radial load exerts.

The ceramic material constituting the outer ring and the ceramic material constituting the rolling element may be of an identical or different type. It is necessary that the ratio between the fracture toughness value and the Vickers hardness in the ceramic material constituting the movable member, the support and the rolling element is 0.25 or more and it is, more preferably, 0.35 or more and, further preferably, 0.40 or more. Then, since cracks less propagate on the surface or in the inside of the ceramic material, flaking and wear less occur. Accordingly, the rolling device and the rolling bearing can operate even under a high load condition and have longer life.

When the ratio between the fracture toughness value and the Vickers hardness of the ceramic material is less than 0.25 and the specific strength is less than $1.2 \times 10^7$ mm, since cracks tend to propagate easily starting from defects on the surface or in the inside, an abrasion powder is generated in a great amount or cracks are formed to sometimes shorten the life of the rolling device such as a rolling bearing.

There is no particular restriction on the ceramic material usable in this invention and it can include, for example, silicon nitride ($Si_3N_4$) series, zirconia ($ZrO_2$) series, alumina ($Al_2O_3$) series, silicon carbide (SiC) series, aluminum nitride (AlN) series, boron carbide ($B_4C$) series, titanium boride ($TiB_2$) series, boron nitride (BN) series, titanium carbide (TiC) series, titanium nitride (TiN) series, or ceramic type composite materials formed by compositing two or more of them.

Further, in the ceramic material used in this invention, a fibrous filler can be blended in order to improve, for example, the fracture toughness and the mechanical strength. There is no particular restriction on the kind of the fibrous filler and it can include, for example, silicon carbide whisker, silicon nitride whisker, alumina whisker and aluminum nitride whisker.

For the fracture toughness value of the ceramic material, a fracture toughness value calculated based on the IF method of JIS R1607 directed to the planar of the ceramic material is used. Further, for the Vickers hardness, a value measured according to JIS R1610 for the planar of the ceramic material is used.

Further, the rolling device according to this invention can include, for example, a linear motion guiding device, a ball screw and a linear motion bearing in addition to the rolling bearing. In a case where the rolling device is a rolling bearing, a rotational ring (usually, outer ring) corresponds to the movable member and, a fixed ring (usually, inner ring) corresponds to the support. Further, in a case where the rolling device is a linear motion guiding device, a slider or a guide rail corresponds to the movable member and a guide rail or a slider corresponds to the support. Further, in a case where the rolling device is a ball screw, a nut corresponds to the movable member and a screw shaft corresponds to the support. Then, in a case where the rolling device is a linear motion bearing, an outer cylinder corresponds to the movable member and a shaft corresponds to the support member.

In a further embodiment of this invention, the ratio of the linear expansion coefficient between the rolling element and the movable member at normal temperature is 0.45 or less and the ratio of the linear expansion coefficient between the rolling element and the support at normal temperature is 0.45 or less. Then, the normal temperature may be considered, for example, as 20° C.

In a further preferred embodiment according to this invention, the rolling element is formed of a ceramic material having a ratio between a fracture toughness value (MPa·m$^{1/2}$) and a Vickers hardness (GPa) of 0.40 or more, preferably, 0.425 or more and a specific strength of $1.2 \times 10^7$ mm or more.

The rolling element is formed of a cemented carbide (alloy formed by sinter bonding a carbide powder of tungsten (W) by using an iron group metal such as iron, cobalt or nickel) having a ratio between a fracture toughness value (MPa·m$^{1/2}$) and a Vickers hardness (GPa) of 0.40 or more and a specific strength of $1.2 \times 10^7$ mm or more.

When the ratio of the linear expansion coefficient between the rolling element and the movable element and between the rolling element and the support at the normal temperature is 0.45 or less in both of the cases, the thermal expansion amount of the rolling element is outstandingly smaller than the thermal expansion amount of the inner ring and the outer ring relatively even under the condition at a high speed rotation and great heat generation. Accordingly, increase of preload attributable to the temperature gradient can be moderated effectively to cause less seizure even under the condition of high speed rotation and increased heat generation, and the bearing can rotate under a high speed condition and can operate for a long time under high speed rotation (refer to FIG. 27).

Further, when the ratio of the thermal expansion coefficient of the rolling element to the linear thermal expansion coefficient of the support is 0.40 or less, the thermal expansion amount of the rolling element can be suppressed more effectively.

However, when the strength required for the rolling device such as a bearing is considered within a range capable of being industrially practiced, it may be considered that the lower limit for the ratio of the linear expansion coefficient is 0.2 but it is not restricted to 0.2 or more since smaller ratio is preferred in view of the prevention of decrease of the gap or the like.

On the other hand, when the ratio of the linear expansion coefficient of the rolling element to the linear expansion coefficient of the movable member at the normal temperature and the ratio of the linear expansion coefficient of the rolling element to the linear expansion coefficient of the support exceed 0.45, increase in the preload caused by the temperature gradient can no more be moderated sufficiently and in a case where heat generation increases under a high speed rotation condition, the gap is excessively decreased to sometimes cause seizure or extremely shorten the life.

The rolling element described above is preferably a ceramic material or a cemented carbide having a ratio of the fracture toughness value (MPa·m$^{1/2}$) to the Vickers hardness (GPa) of 0.40 or more and a specific strength of $1.2 \times 10^7$ mm or more. When the rolling element comprises a ceramic material or a cemented carbide having a ratio of a fracture toughness value to a Vickers hardness of 0.40 or more and a specific strength of $1.2 \times 10^7$ mm or more, since cracks less occur and less propagate on the surface or in the inside of the rolling element formed of the ceramic material or the cemented carbide, flaking and wear less occur and adhesion less occur, so that the rolling element can operate under higher speed rotational condition and can operate for a long time even under a high speed rotational condition (refer to FIG. 28).

In a further preferred embodiment according to this invention, the movable member or the support is a guide rail in a linear motion guiding device, and the guide rail is formed of at least one of materials of ceramic materials, cermets and cemented carbides and has a planar part finished to a surface roughness of 0.5 μmRa or less.

As described above, when the guide rail is formed of a ceramic material or a cermet or a cemented carbide, in a case where an electronic part suction head of a mounting apparatus is attached to one end of a guide rail for instance and the head moves vertically at a high speed of 0.2 sec or less for one cycle, or where the head revolves being attached to a drum, a guide rail having a sufficient strength to the inertia force generated by acceleration or head weight can be obtained. Further, when each of the planar parts of the guide rail is finished to a surface roughness of 0.5 μmRa or less, since stress concentration due to micro-unevenness on the surface of the guide rail is moderated, a guide rail having a sufficient strength to the inertia force generated, for example, by the rail own weight or head weight can be obtained.

In this case, the ceramic material constituting the guide rail preferably has a specific strength of $2 \times 10^7$ mm or more.

In a case of a cermet or cemented carbide, those having a specific strength of $1.7 \times 10^7$ mm or more are preferred. Since the cermet and the cemented carbide have a fracture toughness value greater than that of the ceramic material and are less fractured, the specific strength is defined as above. Further, the specific strength of the cermet or the cemented carbide is, more preferably, $1.95 \times 10^7$ mm or more and desirably $2.8 \times 10^7$ mm or less in view of the availability in the market, with no particular restriction. From the foregoings, a guide rail having a more sufficient strength can be obtained.

Further, when each of the planar parts of the guide rail is finished to a surface roughness of 0.5 μmRa or less, since stress concentration due to fine unevenness on the surface of the guide rail is moderated, a guide rail having a sufficient strength to the inertia force generated, for example, by the rail own weight or the head weight can be obtained. In this case, finish grinding to the planar parts of the guide rail is preferably conducted such that the grinding trace remain in the longitudinal direction of the guide rail, that is, in a direction perpendicular to the bending moment due to the inertia force. In a case where a recess or the like is formed in order to avoid interference with a part to be attached at an intermediate portion of the guide rail and the grinding traces are obliged to be in the lateral direction of the guide rail, it is preferred to finish the planar part of the guide rail to a surface roughness of 0.3 μmRa or less. When the planar part of the guide rail is finished to a surface roughness, for example, of 0.05 μmRa or less, the effect of the surface roughness of the planar part on the strength of the guide rail is at a substantially negligible level. Accordingly, since the surface roughness of 0.05 μmRa or less merely increases the cost, the range for the finished roughness in the planar part of the guide rail is desirably from 0.5 μmRa to 0.05 μmRa and, preferably, from 0.3 μmRa to 0.05 μmRa.

The ceramic material constituting the guide rail suitably has a fracture toughness of 5 MPa·m$^{0.5}$ or more and a heat conductivity of 46 W/m·K or more.

The ceramic material constituting the guide rail is, suitably, a ceramic material comprising silicon nitride as a main ingredient, in which the ratio of the crystalline phase in the grain boundary phase contained in the sintered product is 10% by volume or more.

When a ceramic material of high heat conductivity is used for the rail material, heat generated on the sliding surface can be released to the outside and increase of the temperature in the rail material can be suppressed effectively. Further, at the same time, temperature elevation can be suppressed also on the contact face between the surface of the rail groove and the rolling element. Accordingly, it is possible to solve the subject for the degradation of short time or long time positioning accuracy such as wear of a rolling element that brings about thermal expansion of the entire rail or decrease in the preload amount in the inside. Particularly, when the heat conductivity of the rail material is 46 W/m·K or more and, more preferably, 72 W/m·K or more, even in a case where the portion other than the rail (rolling element, slider or the like) is formed of a bearing steel (heat conductivity: 46 W/m·K), the rail itself does not constitute a heat insulation source and not hinder the heat conduction. However, only the rail has a particularly preferred heat conductivity, if the heat conductivity of other parts such as the rolling element or the slider is not so good, the effect is not remarkable, so that the upper limit value for the heat conductivity of the rail material is preferably up to 100 W/m·K, with no particular restriction.

In a case where the ceramics of such high heat conductivity are used for the material of the rail, the fracture toughness value of the rail material is preferably 5 MPa·m$^{0.5}$ or more. When the fracture toughness value of the rail material is 5 MPa·m$^{0.5}$ or more, it can be used with no fracture against repetitive load exerting on the guide rail during operation of a linear motion guiding device. Particularly, in a severe working circumstance, the fracture toughness value of the rail material is preferably 6 MPa·m$^{0.5}$ or more. Further, while the upper limit for the fracture toughness value is preferably up to 8 MPa·m$^{0.5}$ in view of the availability in the market and the bending strength, it is not limited particularly. Further, when silicon nitride having the specific strength of $2.0 \times 10^7$ mm or more is used for the rail material, it can be utilized suitably for the application described above.

For improving the heat conductivity of the silicon nitride sintered products, it is necessary to optimize the factors hindering the propagation of lattice vibrations in the sintered products, that is, grain boundary, defects, crystal structure, etc.

For example, Japanese Published Unexamined Patent Application No. 165265/1997 proposes a material in which silicon nitride crystal grains are oriented in one direction to improve the heat conductivity in a specified direction. In the same manner, Japanese Published Unexamined Patent Application No. 157030/1997 proposes a material in which the minor axis diameter is defined as 2 μm or more to decrease the grain boundary and, further, the crystal grains are oriented.

In this case, since extreme increase in the crystal grain size leads to deterioration for the strength of the rail material, it has to be within such a range as capable of keeping the strength required for the bearing material.

Further, for obtaining a further preferred ceramic material comprising silicon nitride of high heat conductivity as a main ingredient, it is desirable to decrease the internal defects or optimize the crystal structure thereof.

What is deleterious particularly as the internal defects is voids remaining in the inside of the sintered products upon sintering and if they are present in a great amount in the sintered body, the heat conductivity of the sintered body is remarkably lowered. Accordingly, in the silicon nitride used in the application as described above, an effect of increasing the heat conductivity can be obtained by reducing the porosity. Particularly, when the porosity in the sintered product is reduced to 2% or less, the bearing can be used suitably with no generation of vibrations. Further, the heat conductivity can also be increased effectively. In this case, for reducing the porosity, the ceramic material is sintered preferably by press sintering such as an HIP sintering process or a gas pressure sintering process.

As a factor for reducing the heat conductivity of silicon nitride, the effect of a sintering aid phase present in the crystal grain boundary may be considered and the sintering aid is generally selected from metal oxides such as $Al_2O_3$, MgO and CeO, as well as rare earth oxides such as $Y_2O_3$, $Yb_2O_3$, $La_2O_3$, and they are often added by 20% by volume, as the upper limit, based on the entire sintered product. Particularly, $Al_2O_3$—$Y_2O_3$ series or $Al_2O_3$—MgO series are often used and they are present in an amorphous state at the grain boundary of the sintered product. Generally, solids of the amorphous structure less propagate lattice vibrations and have low heat conductivity. Accordingly, silicon nitride containing a great amount of them in the grain boundary has lowered heat conductivity. On the other hand, heat conductivity at the portion of the sintering aids can be improved to obtain silicon nitride of high heat conductivity by increasing the degree of crystallization in the portion of the sintering aids. For increasing the degree of crystallization of the sintering aid, the cooling rate after sintering may be controlled. That is, when the cooling rate is high, atoms of the sintered aid ingredient cannot be in time for arrangement and a normal temperature phase is constituted in the form of succeeding the amorphous form at a high temperature state as it is. But, at a lowered cooling rate, it constitutes a normal temperature phase where crystallization is preceded. In this case, for improving the heat conductivity further, oxides selected from the lanthanoid series such as La, Ce, Pr, Nd and Ho may be added preferably.

Further, in a case where a recess is formed to the guide rail for attaching a head or the like, stress concentrated to a corner of the recess can be mitigated by forming the corner at the recess to a radius of curvature of 0.1 mm or more. Further, regarding the change of the cross sectional area of the recess necessary for attaching to a head or a tester and the rail, stress concentration to the corner by the inertia force can be decreased by making the shape factor, for example, to 5 or less without forming an acute angle as much as possible. In this case, as a method of reducing the shape factor, it is general to form the corner at the recess into an arcuate shape and it is preferred to form the corner at the recess with a radius of curvature of 0.1 mm or more, preferably, 0.3 mm or more in order to decrease the shape factor to 5 or less. When the radius of curvature of the corner is excessively large, it interferes with a part to be attached to the guide rail, so that the radius of curvature for the corner is preferably at 1 mm or less at the greatest in which the shape factor is about 1 to 2. Further, other methods of moderating the stress concentration can include a method of chamfering the bottom of the recess or a method of enlarging the angle of recess and any of the methods may be used so long as it does not cause problem for the attachment of the part.

Further, as the ceramic material for constituting the guide rail, silicon nitride, zirconia, alumina, silicon carbide, titanium boride, as well as a composite sintered product thereof can be used and, among all, silicon nitride is particularly preferred since it has high rigidity and high fracture toughness value. In this case, when the silicon nitride material has a fracture toughness value of 5 MPa·m$^{0.5}$ or more and a hardness of 12 GPa or more, it can be used further preferably in view of the fracture strength.

Silicon nitride is obtained by press sintering such as an HIP process or gas pressure sintering process, and a preferred material comprises columnar crystals grown into columns with a width of 3 μm or less and a length of 4 μm or more in average values contained in an amount of 70% or more, preferably, 90% or more in the entire silicon nitride grains. So long as the condition for the specific strength can be satisfied, materials obtained by an ambient pressure sintering may also be used. Further, the aid ingredient selected from metal oxides such as $Al_2O_3$, MgO or CeO, or rare earth oxides such as $Y_2O_3$, $Yb_2O_3$ or $La_2O_3$ and added by 20% by weight as an upper limit based on the entire sintered product can be used. Further, when the size of defects such as pores and obstacles in the inside of the material is 50 μm or less, preferably, 20 μm or less as an equivalent circle diameter, local deterioration for the strength of the material can be suppressed to improve the reliability of the material.

In a preferred embodiment according to this invention, the rolling element has a hard coating layer covering the surface of the rolling element and the coating layer has a thickness of from 0.1 μm to 5.0 μm.

When a hard layer having a thickness of 0.1 μm to 5.0 μm is formed on the surface of the rolling element to coat the surface of the rolling element with the hard coating layer, since the wear resistance of the rolling element is improved and the initially set preload of the linear motion guiding device is kept for a long time, required positioning accuracy can be ensured for a long time without lowering the rigidity of the guide rail.

The thickness of the hard coating layer is defined as 0.1 μm to 5.0 μm, because if the thickness of the coating layer is less than 0.1 μm, there is a great difference between the longitudinal modulus of elasticity (young's modulus) of the base metal and that of the hard coating layer constituting the rolling element and this results in easy flaking or detaching of the hard coating layer to possibly cause abnormal abrasion such as chipping on the rolling groove of rolling element or the surface of the rolling element. Further, when the thickness of the hard coating layer exceeds 5.0 μm, the internal stress of the hard coating layer increases. Thus, the hard coating layer tends to flake from the surface of the rolling element to possibly cause abnormal abrasion such as chipping to the rolling grooves of rolling element or on the surface of the rolling element by the flakes of the hard coating layer. Accordingly, the thickness of the hard coating layer formed on the surface of the rolling element is within a range from 0.1 μm to 5.0 μm, preferably, from 0.5 μm to 5.0 μm.

The hard coating layer comprises at least one material of TiN, TiC, TiAlN, TiCN, $Cr_7C_3$, $Cr_2O_3$, CrN, WC, $B_4C$, cBN, CN, TaC, TaN, ZrN, diamond-like carbon and diamond. Since the wear resistance of the hard coating layer is improved by constituting the hard coating layer with at lease one of materials of TiN, TiC, TiAlN, TiCN, $Cr_7C_3$, $Cr_2O_3$, CrN, WC, $B_4C$, cBN, CN, TaC, TaN, ZrN, diamond-like carbon and diamond, wear of the rolling element can be suppressed effectively.

In this case, as the method of forming the hard coating layer on the surface of the rolling element, various methods can be used, for example, various CVD methods such as plasma CVD, thermal CVD or optical CVD, ion plating method (hollow cathode and arc method), spattering, ion beam formation method and ionizing vapor deposition method. In a case of forming a hard coating layer on the surface of the rolling element by using the ion plating method, the hard coating layer can be deposited, for example, by evacuating the inside of the chamber to $10^{-4}$ Pa or lower, then cleaning the surface of the rolling element by ion bombardment, controlling the temperature on the surface of the rolling element to 400° C.–500° C., applying a bias voltage at −200 V to −300 V to a target (for example, Ti material in a case of Ti series coating, Cr material in a case of Cr series coating, and graphite in a case of diamond-like carbon coating or diamond coating), setting a discharging current at 80 A to 150 A and, optionally, introducing a process gas (for example, nitrogen gas in a case of nitride and methane gas such as $CH_4$ in a case of carbide).

Further, in a case of forming a diamond-like carbon deposition layer or a diamond layer on the surface of a rolling element by using a plasma CVD, the diamond-like carbon coating layer or the diamond coating layer can be formed on the surface of a rolling element by applying bombarding (dry cleaning) treatment to the surface of the rolling element by an argon gas, then converting a tetramethyl silane gas into plasmas by an ionic gas thereby forming an intermediate layer on the surface of the rolling element and, successively, introducing benzene into the chamber, converting benzene introduced into the chamber by an ionic gas into plasmas. In this case, other metal such as tungsten, titanium, chromium or silicon may be added to the diamond-like carbon coating layer or diamond coating layer.

In a preferred embodiment according to this invention, the rolling element has a surface hardness 0.6 times to 1.5 times the hardness of the guide rail.

Since the surface hardness of the rolling element is set within a range of 0.6 times to 1.5 times the hardness of the guide rail, wear of the rolling element is suppressed and injury to the surface of the guide rail is suppressed and an initially set preload for the rolling element can be kept for a long time, so that required positioning accuracy can be ensured for a long time without lowering the rigidity of the guide rail.

The surface hardness of the rolling element is made within a range from 0.6 times to 1.5 times the hardness of the guide rail by the following reason. That is, when the ratio between the surface hardness of the rolling element and the hardness of the guide rail is less than 0.6, the surface hardness of the rolling element is lowered compared with the surface hardness of the guide rail. Since this accelerates the wear of the surface of the rolling element and the preload is eliminated in a short time, the required positioning accuracy cannot sometimes be kept for a long period. On the contrary, when the ratio of the surface hardness between the rolling element and the hardness of the guide rail exceeds 1.5, since the surface hardness of the rolling element becomes excessively hard compared with the surface harness of the guide rail, wear or chipping of the guide rails is sometimes increased remarkably.

There is no particular restriction on the material for the rolling element so long as the surface hardness of the rolling element is within a range from 0.6 times to 1.5 times the hardness of the guide rail. For example, ceramic materials comprising silicon nitride, zirconia, alumina, silicon carbide, aluminum nitride, boron carbide, titanium boride, boron nitride, titanium carbide and titanium nitride as the main ingredient, composite ceramic materials formed by compositing them, or cemented carbides and cermets which are alloys formed by sinter bonding powder of carbides of nine types of metals belonging to one of the group IVa, group Va and group VIa in the periodical table (for example, W, Mo, Cr, Ta, Nb, V, Hf, Zr and Ti) by using an iron group metal such as iron, cobalt or nickel, and hard titanium series alloys (Ti—W—TiC series alloy) can be used suitably.

Further, in the ceramic material used in this invention, a fibrous filler may be blended in order to improve the fracture toughness value or the mechanical strength. The fibrous filler has no particular restriction and, for example, silicon carbide series whisker, silicon nitride series whisker, alumina series whisker and aluminum nitride series whisker can be used.

For the cemented carbides, there can be used, for example, WC—Co series alloy, WC—$Cr_3C_2$—Co series alloy, WC—TaC—Co series alloy, WC—TiC—Co series alloy, WC—NbC—Co series alloy, WC—TaC—NbC—Co series alloy, WC—TiC—TaC—NbC—Co series alloy, WC—TiC—TaC—Co series alloy, WC—ZrC—Co series alloy, WC—TiC—ZrC—Co series alloy, WC—TaC—VC—Co series alloy, WC—$Cr_3C_2$—Co series alloy, and WC—TiC—$Cr_3C_2$—Co series alloy. For the non magnetic and corrosion resistance-improved cemented carbide, WC—Ni series alloy, WC—Co—Ni series alloy, WC—$Cr_3C_2$—$Mo_2C$—Ni series alloy, WC—Ti(C, N)—TaC series alloy, WC—Ti(C, N) series alloy, and $Cr_3C_2$—Ni series alloy can be used.

A typical composition for the WC—Co series alloy is W:Co:C=70.41–91.06 wt %:3.0–25.0 wt %:4.59–5.94 wt % and a typical composition for WC—TaC—NbC—Co series alloy is W:Co:Ta:Nb:C=65.7–86.3 wt %:5.8–25.0 wt %:1.4–3.1 wt %:0.3–1.5 wt %:4.7–5.8 wt %. Further, a typical composition for the WC—TiC—TaC—NbC—Co series alloy is W:Co:Ta:Ti:Nb:C=65.0–75.3 wt %:6.0–10.7 wt %:5.2–7.2 wt %:3.2–11.0 wt %:1.6–2.4 wt %:6.2–7.6 wt % and a typical composition for WC—TaC—Co series alloy is W:Co:Ta=53.51–90.30 wt %:3.5–25.0 wt %:0.30–25.33 wt %. Further, a typical composition for WC—TiC—Co series alloy is W:Co:Ti=57.27–78.86 wt %:4.0–13.0 wt %:3.20–25.59 wt % and a typical composition for WC—TiC—TaC—Co series alloy is W:Co:Ta:Ti:C= 47.38–87.31 wt %:3.0–10.0 wt %:0.94–9.38 wt %:0.12–25.59 wt %:5.96–10.15 wt %.

For the cermet, there can be used, for example, TiC—Ni series alloy, TiC—Mo—Ni series alloy, TiC—Co series alloy, TiC—$Mo_2C$—Ni series alloy, TiC—$Mo_2C$—ZrC—Ni series alloy, TiC—$MO_2C$—Co series alloy, $Mo_2C$—Ni series alloy, Ti(C, N)—$MO_2C$—Ni series alloy, TiC—TiN—$MO_2C$—Ni series alloy, TiC—TiN—$Mo_2C$—Co series alloy, TiC—TiN—$Mo_2C$—TaC—Ni series alloy, TiC—TiN—$Mo_2C$—WC—TaC—Ni series alloy, TiC—WC—Ni series alloy, Ti(C, N)—WC—Ni series alloy, TiC—Mo series alloy, Ti(C, N)—Mo series alloy, and boride series (MoB—Ni series, $B_4C$/(W, Mo)$B_2$ series) alloy. In this case, Ti(C, N)—$MO_2C$—Ni series alloy, Ti(C, N)—WC—Ni series alloy and Ti(C, N)—Mo series alloy are metals formed by sintering TiC—$Mo_2C$—Ni series alloy, TiC—WC—Ni series alloy or TiC—Mo series alloy in a nitrogen gas ($N_2$).

The typical composition for the cermets can include TiC-30% $Mo_2C$-20% Ni, TiC-19% $Mo_2C$-24% Ni, TiC-8% $Mo_2C$-15% Ni, Ti(C, N)-25% $Mo_2C$-15% Ni, TiC-14% TiN-19% $Mo_2C$-24% Ni, $TiC_{0.7}N_{0.3}$-11% $Mo_2C$-24% Ni, $TiC_{0.7}N_{0.3}$-19% $Mo_2C$-24% Ni, $TiC_{0.7}N_{0.3}$-27% $Mo_2C$-24% Ni, TiC-20% Mo-15% Ni and TiC-30% Mo-15% Ni.

In a preferred embodiment according to this invention, the rolling element is coated with a nitride layer and the nitride layer has a hardness of Hv 800–Hv 1400. When the rolling element is coated with the nitride layer having the hardness of Hv 800–Hv 1400, since the difference between the hardness of the rail material and that of the surface of the rolling element is decreased, acceleration of wear can be suppressed. When materials of different hardness are worn (friction to each other), since a material of lower hardness tends to be plastically deformed easily and worn preferentially, it is preferred to decrease the difference of the hardness between both of them as less as possible. In a case where the hardness of the nitride layer is less than Hv 800, since the difference of the hardness with respect to the rail material increases, wear of the rolling element is sometimes accelerated. Further, when the hardness of the nitride layer exceeds Hv 1400, $Fe_2N$ is formed on the surface of the nitride layer making the surface of the rolling element brittle. This sometimes cause flaking of the nitride layer during use to lower the life. Accordingly, the hardness of the nitride layer is preferably within a range from Hv 800 to Hv 1400.

In a further preferred embodiment according to this invention, the rolling element is coated with a composite carbide layer containing Cr carbides and carbon, and the composite carbide layer has a hardness of Hv 1000 to Hv 1800. When the rolling element is coated with the composite carbide layer having the hardness of Hv 1000 to Hv 1800, since the difference between the hardness of the guide rail material and the hardness on the surface of the rolling member is reduced, acceleration of the wear on the surface of the rolling element and the surface of the rolling groove in the rolling element can be suppressed. When materials of different hardness are worn, since the material of lower hardness tends to be plastically deformed more and, as a result, worn preferentially, it is preferred to reduce the difference of hardness between both of them as less as possible.

In a case where the hardness of the composite carbide layer is less than Hv 1000, since the difference of hardness relative to the rail material increases, wear of the rolling element is sometimes accelerated. Further, when the hardness of the composite carbide layer exceeds Hv 1800, the composite carbide layer formed on the surface of the rolling element becomes extremely brittle to sometimes cause flaking during use thereby lowering the life. Accordingly, the hardness of the composite carbide layer is preferably within a range from Hv 1000 to Hv 1800.

In a further preferred embodiment according to this invention, the rolling element is coated with a boride layer and the boride layer has a hardness of Hv 1000 to Hv 1700. When the rolling element is coated with a boride layer having a hardness from Hv 1000 to Hv 1700, since the difference between the hardness of the guide rail member and the hardness of the surface of the rolling element can be decreased, accelerated wear for the rolling element or the guide rail can be suppressed. When materials of different hardness are caused to slide each other, a material of lower hardness tends to be plastically deformed more easily and, as a result, tends to be worn preferentially, so that the difference of the hardness between both of them is desirably as less as possible.

In this case, when the hardness of the boride layer is less than Hv 1000, since the difference of hardness relative to the rail material increases, wear of the rolling element is sometimes accelerated. Further, when the hardness of the boride layer exceeds Hv 1700, FeB of Hv 1700 or more is formed on the surface of the boride layer. This makes the surface layer of the rolling element extremely brittle to sometimes result in flaking during use thereby lowering the life. Accordingly, the hardness of the boride layer is preferably within a range from Hv 1000 to Hv 1700.

The hard coating layer, the nitride layer, the composite carbide layer and the boride layer preferably have a surface roughness of 0.05 μmRa or less. When the surface roughness exceeds 0.05 μmRa, fine unevenness on the surface of the rolling element tends to be in direct contact with the surface of the rolling groove of rolling element to injure the surface of the groove of rolling element or accelerate wear by the layer covering the surface of the rolling element. Accordingly, the preferred surface roughness for the layer coating the surface of the rolling element is 0.05 μmRa or less and it is more preferably 0.02 μmRa or less.

In a preferred embodiment according to this invention, the guide rail has a rolling groove of rolling element and the rolling groove of rolling element has a surface roughness along the lateral direction of 0.2 μmRa or less and a surface roughness along the longitudinal direction of 0.1 μmRa or less.

As described above, when the ceramic material, the cermet or cemented carbide is used for the rail material with an aim of improving the accuracy and increasing the speed of the direct motion guiding device, the wear of the rolling element is sometimes accelerated to lower the preload in the linear motion guiding device in a short time by the reasons, such as, ① the surface pressure in the contact face with the rolling element increases and ② the surface hardness of the rolling groove of the rolling element in contact with the rolling element is about twice or more compared with that of the rolling element. Then, as a result of examining the reduction for the wear of the rolling element described above, it has been found that the wear amount of the rolling element changes greatly depending on the surface roughness of the rolling groove of rolling element of the guide rail and, further, tendency for the wear differs extremely depending on the localization of convex/concave portions of the roughness.

That is, when the surface roughness in the lateral direction of the rolling groove for rolling element is set to 0.2 μmRa or less and the surface roughness in longitudinal direction of the rolling groove of the rolling element is 0.1 μmRa or less, injury to the surface of rolling element due to fine surface unevenness present on the surface of the rolling groove of the rolling element can be suppressed effectively. In this case, it is difficult to suppress injuries on the surface of the rolling element caused by minute vibrations in the lateral direction of the guide rail by noting on the surface roughness of the rolling groove of the rolling element merely on the surface roughness in the rolling direction of the rolling element (longitudinal direction). That is, the wear injury on the surface of the rolling element can be suppressed effectively only when both the surface roughness in the lateral direction and the surface roughness in the longitudinal direction of the rolling groove of rolling element satisfy the conditions described above. In this case, no particular lower limit is defined for the surface roughness in the lateral direction and the surface roughness in the longitudinal direction. When it is made smaller than the surface roughness of the rolling element, the effect of suppressing the wear of the rolling element becomes insufficient, and further surface finishing is not desirable since this leads to the increased cost for the rail material.

Further, in the linear motion guiding device used at a high speed as described above, it is difficult to form oil membranes on the surface of the rolling groove of rolling element. Particularly, when convex portions with an extremely large height are present on the surface of the rolling groove of rolling element, disconnection of the oil membranes tends to be formed there. Since such oil membrane disconnection gives a factor for accelerating the wear of the rolling element, for the linear motion guiding device used under such high speed condition as described above, it is desired that the extreme surface unevenness on the surface of the rolling groove of rolling element is as small as possible.

Then, the ratio between the surface convex portion and the surface concave portion relative to a mean roughness line is represented according to the definition of a so-called roughness skew (Sk) as:

$$Sk = \frac{1}{R_q^3} \times \frac{1}{n} \sum_{i=1}^{n} Y(i)^3$$

Rq is a mean square roughness (RMS), n is a positive integer and Y(i) represents the height for each crest ($i_{th}$) of the roughness with a portion above the mean line being as positive and a portion therebelow being as negative, respectively. That is, the skew Sk is negative when the sum for the height of convex portions for roughness (portions above the mean line) is smaller than the sum for the height of concave portions and Sk is positive in the case opposite thereto.

Accordingly, the oil membranes may be formed effectively on the surface of the rolling groove of rolling element by reducing such excessive surface convex portions as causing disconnection of lubricants, thereby making the lubricants prevailing over the surface of the rolling groove uniformly. In other words, the rolling groove is preferably formed such that Sk is negative and the lubricants prevail over the surface of the rolling groove. However, even when the Sk value is −3 or less, no further effect can be expected and this also increases the cost, so that the range for the Sk value is preferably within a range from −3 to 0.

DESCRIPTION OF THE INVENTION

[Embodiment 1]

Figure 1:
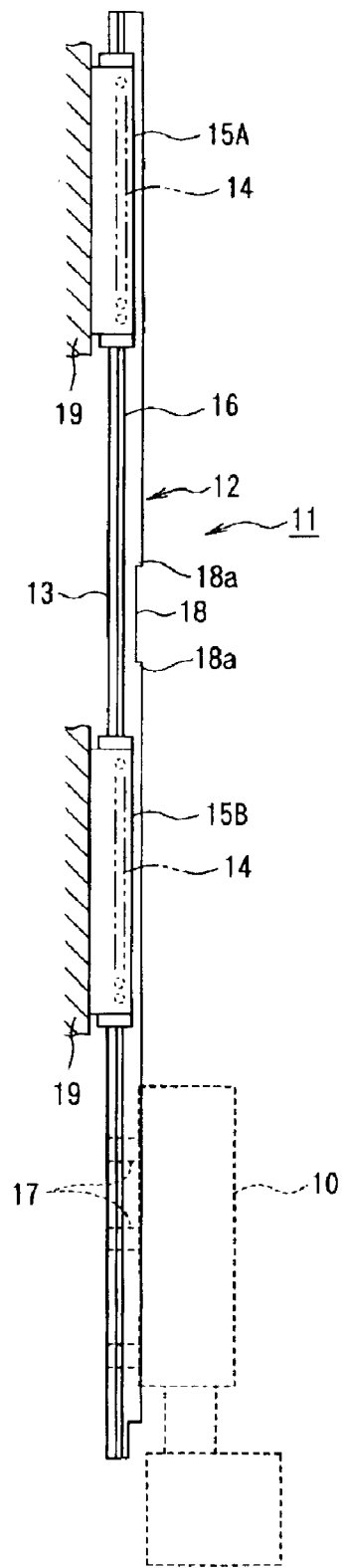
FIG. 1 is a view showing a linear motion guiding device as an embodiment of a rolling device according to this invention.

FIG. 1 is a view showing a linear motion guiding device as an embodiment of a rolling device according to this invention. In the drawing, reference numeral 10 denotes an electronic part suction head, and 11 denotes a head lifting mechanism for vertically reciprocating the electronic part suction head 10, in which the head lifting mechanism 11 comprises a driving device (not illustrated) and a plurality of linear motion guiding devices 12 disposed at the periphery of the driving device.

The linear motion guiding device 12 comprises a guide rail 13 as a support or a movable member, spherical rolling elements 14 and sliders 15A and 15B as a movable member or a support, and rolling grooves 16 of rolling element are formed on both lateral sides of the guide rail 13 along the longitudinal direction of the guide rail 13. The rolling groove 16 of rolling element is used for guiding the spherical rolling elements 14 in the longitudinal direction of the guide rail 13 and has a surface roughness of X μmRa or more and 0.2 μmRa or less, preferably, a surface roughness of X μmRa or more and 0.1 μmRa or less for the surface roughness of the spherical rolling element 14 being assumed as X μmRa.

The guide rail 13 is connected with the driving device by way of a rotational cam follower, and plural attaching holes 17 for attaching the electronic part suction head 10 to the guide rail 13 by means of setting screws (not illustrated) and a recess 18 are disposed to the guide rail 13.

Further, the guide rail 13 is formed of a ceramic material having a specific strength of $2 \times 10^7$ mm or more (for example, silicon nitride, zirconia, alumina, silicon carbide, titanium boride or composite sintered product formed by sintering such materials) or a cermet or a cemented carbide having a specific strength of $1.7 \times 10^7$ mm or more. The planar part of the guide rail 13 excepting for the rolling groove 16 of the rolling element is finished to a surface roughness of 0.5 μmRa to 0.05 μmRa, preferably, a surface roughness of 0.3 μmRa to 0.05 μmRa.

The recess 18 is used for avoiding interference with an attaching part to be attached to an electronic part mounting device and the corner 18a for the recess 18 is formed with a radius of curvature of 0.1 mm or more and 1 mm or less, preferably, a radius of curvature of 0.3 mm or more and 1 mm or less.

The spherical rolling element 14 is formed of iron and steel materials such as stainless steel, preferably, with martensitic stainless steel. Further, spherical rolling elements 14 are disposed each by plurality between the lateral sides of the guide rail 13 and both sides of the sliders 15A and 15B opposing to the sides (also referred to as sleeve portion).

Each of the sliders 15A and 15B has a gate-shaped cross section perpendicular to the longitudinal direction of the guide rail 13 and a rolling element circulation channel is formed in both of the sides for repetitively rolling the rolling elements 14 along the rolling groove 16 of rolling element of the guide rail 13. Further, in the sliders 15A and 15B, the slider 15A is secured to an upper portion of the electronic part mounting device main body 19, while the slider 15B is secured to a lower portion of the electronic part mounting device main body 19. Accordingly, when the cam follower mechanism as the driving device is rotationally driven by a motor not illustrated, the electronic part suction head 10 moves vertically together with the guide rail 13.

In this embodiment, any one of Examples 1 to 16 shown in Table 1 and Table 2 can be used as the rail material for the guide rail 13.

TABLE 1

| | Material | Specific strength ×10⁷ mm | Planar part roughness Ra, μm | Rolling surface roughness Ra, μm | Angle R mm |
|---|---|---|---|---|---|
| Example 1 | Silicon nitride 1 | 3.1 | 0.3 | 0.08 | 0.15 |
| Example 2 | Silicon nitride 2 | 2.5 | 0.3 | 0.08 | 0.15 |
| Example 3 | Silicon nitride 3 | 2.2 | 0.4 | 0.08 | 0.15 |
| Example 4 | Silicon nitride 4 | 1.8 | 0.3 | 0.08 | 0.15 |
| Comp. Example 1 | Silicon nitride 1 | 3.1 | 0.6 | 0.08 | 0.15 |
| Comp. Example 2 | Silicon nitride 3 | 2.2 | 0.8 | 0.08 | 0.08 |
| Comp. Example 3 | Silicon nitride 1 | 1.8 | 0.6 | 0.08 | 0.15 |
| Comp. Example 4 | Silicon nitride 4 | 1.8 | 0.6 | 0.25 | 0.15 |

TABLE 2

| | Rail | Specific strength × 10⁷ mm | planar part roughness | Surface roughness of rolling groove of rolling element in longitudinal direction (Constant at 0.15 μm in lateral direction) |
|---|---|---|---|---|
| Example 5 | Cemented carbide series 1 | 1.23 | 0.3 | 0.08 |
| Example 6 | Cemented carbide series 2 | 1.77 | 0.3 | 0.08 |
| Example 7 | Cemented carbide series 3 | 2.35 | 0.3 | 0.08 |
| Example 8 | Cemented carbide series 4 | 1.78 | 0.3 | 0.08 |
| Example 9 | Cemented carbide series 5 | 0.68 | 0.3 | 0.08 |
| Example 10 | Cemented carbide series 6 | 1.47 | 0.3 | 0.08 |
| Example 11 | Cemented carbide series 7 | 1.95 | 0.3 | 0.08 |
| Example 12 | Cermet series 1 | 2.73 | 0.3 | 0.08 |
| Example 13 | Cermet series 2 | 2.46 | 0.3 | 0.08 |
| Example 14 | Cermet series 3 | 2.23 | 0.3 | 0.08 |
| Example 15 | Cermet series 4 | 2.55 | 0.3 | 0.08 |
| Example 16 | Cemented carbide series 1 | 1.23 | 0.3 | 0.30 |
| Example 17 | Cermet series 1 | 2.73 | 0.3 | 0.25 |
| Comp. Example 5 | Cemented carbide series 1 | 1.23 | 0.6 | 0.08 |
| Comp. Example 6 | Cermet series 1 | 2.73 | 0.8 | 0.08 |

In Table 1 and Table 2, a guide rail of Example 1 used high strength silicon nitride obtained by press sintering at 1000 atm or higher (specific strength: $3.1 \times 10^7$ mm) as the rail material in which a surface roughness for the rail planar part was 0.3 μmRa, the surface roughness of the rolling groove 16 of rolling element was 0.08 μmRa and a radius of curvature at the corner 18a of the recess 18 as R=about 0.15 mm. Further, the guide rail of Example 2 used a silicon nitride obtained by press sintering at about 100 atm or higher (specific strength: $2.5 \times 10^7$ mm) as the rail material in which a surface roughness for the rail planar part was 0.3 μmRa, the surface roughness of the rolling groove 16 of rolling element was 0.08 μmRa and a radius of curvature at the corner 18a of the recess 18 was: R=0.15 mm.

The guide rail of Example 3 used a silicon nitride obtained by press sintering under sintering condition at 10 atm or lower (specific strength: $2.2 \times 10^7$ mm) as the rail material in which a surface roughness for the rail planar part was 0.4 μmRa, a surface roughness of the rolling groove 16 of rolling element was 0.08 μmRa and a radius of curvature at the corner 18a of the recess 18 was R=0.15 mm. Further, the guide rail of Comparative Example 1 used high strength silicon nitride (specific strength: $3.1 \times 10^7$ mm) as a rail material in which a surface roughness for the rail planar part was 0.6 μmRa, a surface roughness for the rolling groove 16 of rolling element was 0.08 μmRa and the radius of curvature at the corner 18a of the recess 18 was: R=0.15 mm.

The guide rail of Example 4 used silicon nitride sintered at 10 atm or lower (specific strength: $1.8 \times 10^7$ mm) as a rail material in which a surface roughness for the rail planar part was 0.3 μmRa, a surface roughness for the rolling groove 16 of rolling element was 0.08 μmRa and a radius of curvature for the corner 18a of the recess 18 was R=0.15 mm.

The guide rail of Comparative Example 2 used silicon nitride obtained under the sintering condition at 10 atm or lower (specific strength: $2.2 \times 10^7$ mm) as a rail material in which a surface roughness for the rail planar part was 0.8 μmRa, a surface roughness for the rolling groove 16 of rolling element was 0.08 μmRa and a radius of curvature at the corner 18a of the recess 18 was R=0.08 mm. The recess 18 in this case had a shape factor of about 6. Further, the guide rail of Comparative Example 3 used silicon nitride sintered at 10 atm or lower (specific strength: $1.8 \times 10^7$ mm) as a rail material in which a surface roughness for the planar part was 0.6 μmRa, a surface roughness for the rolling groove 16 of rolling element was 0.08 μmRa and a radius of curvature at the corner 18a of the recess 18 was R=0.15 mm. The guide rail of Comparative Example 4 used silicon nitride sintered at 10 atm or lower (specific strength: $1.8 \times 10^7$ mm) as a rail material in which a surface roughness for the planar part was 0.6 μmRa, a surface roughness for the rolling groove 16 of rolling element was 0.25 μmRa and a radius of curvature at the corner 18a of the recess 18 was R=0.15 mm. While the guide rail of Comparative Example 4 used the silicon nitride sintered at 10 atm or lower as the rail material in the same manner as the guide rail of Comparative Example 3, since the sintering temperature and time are different, the strength is relatively low as about $1.8 \times 10^7$ mm of specific strength.

Further, starting materials used for Examples 5 to 17 and Comparative Examples 5 and 6 are collectively shown as below.

(1) cemented carbide series (WC—Co series G1, manufactured by Nippon Tungsten Co., specific strength; $1.23 \times 10^7$ mm)

(2) cemented carbide series 2 (WC—Co series G3, manufactured by Nippon Tungsten Co., specific strength; $1.77 \times 10^7$ mm)

(3) cemented carbide series 3 (WC—Ni—Cr series NM15, manufactured by Nippon Tungsten Co., specific strength; $2.35 \times 10^7$ mm)

(4) cemented carbide series 4 (WC—Ni—Cr—Mo series NR11, manufactured by Nippon Tungsten Co., specific strength; $1.78 \times 10^7$ mm)

(5) cemented carbide series 5 (WC—TiC—TaC series RCCL, manufactured by Nippon Tungsten Co., specific strength; $0.68 \times 10^7$ mm)

(6) cemented carbide series 6 (WC—Ni series DN, manufactured by Diejet Industry Co., specific strength; $1.47 \times 10^7$ mm)

(7) cemented carbide series 7 (WC—Ni—Cr series M61U, manufactured by Sumitomo Electrical Industry Co., specific strength; $1.95 \times 10^7$ mm)

(8) cermet series 1 (TiC—TaN—Ni—Mo series DUX40, manufactured by Nippon Tungsten Co., specific strength; $2.73 \times 10^7$ mm)

(9) cermet series 2 (TiC—TaN—Ni—Mo series DUX30, manufactured by Nippon Tungsten Co., specific strength; $2.46 \times 10^7$ mm)

(10) cermet series 3 (boride series UD-II35T, manufactured by Asahi Glass Co., specific strength; $2.23 \times 10^7$ mm)

(11) cermet series 4 (boride series UD-II50T, manufactured by Asahi Glass Co., specific strength; $2.55 \times 10^7$ mm)

The flexion resistance force is a value measured according to JIS R1601.

Figure 2:
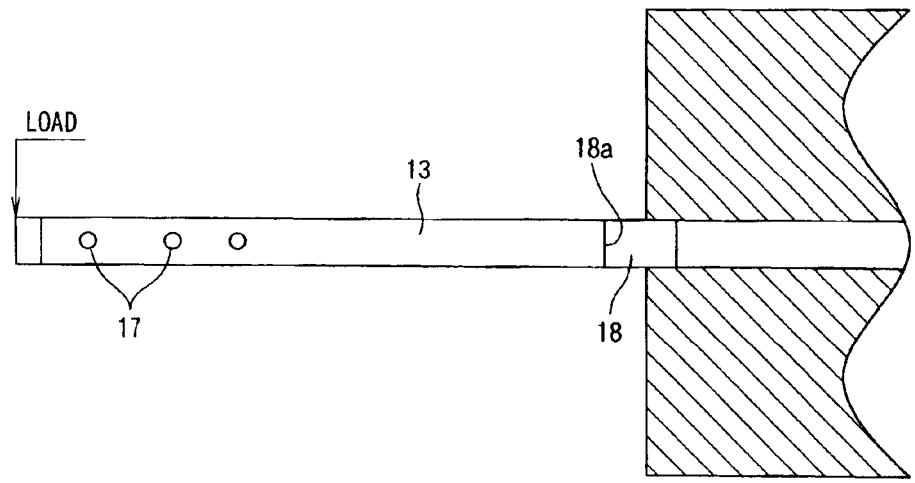
FIG. 2 is a view for explaining a bending strength test for the guide rail shown in FIG. 1.
Figure 3:
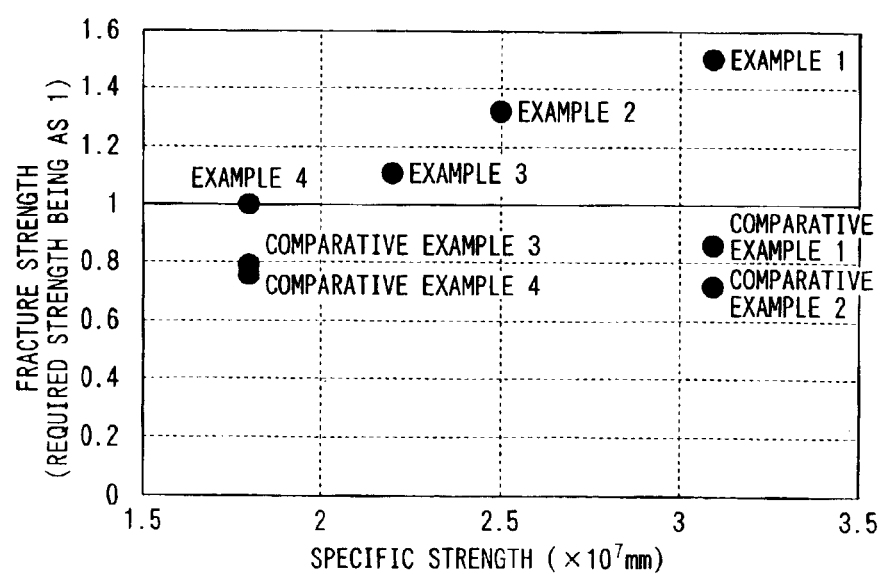
FIG. 3 is a view showing a test result of a bending strength test for examples and comparative examples shown in Table 1.
Figure 4:
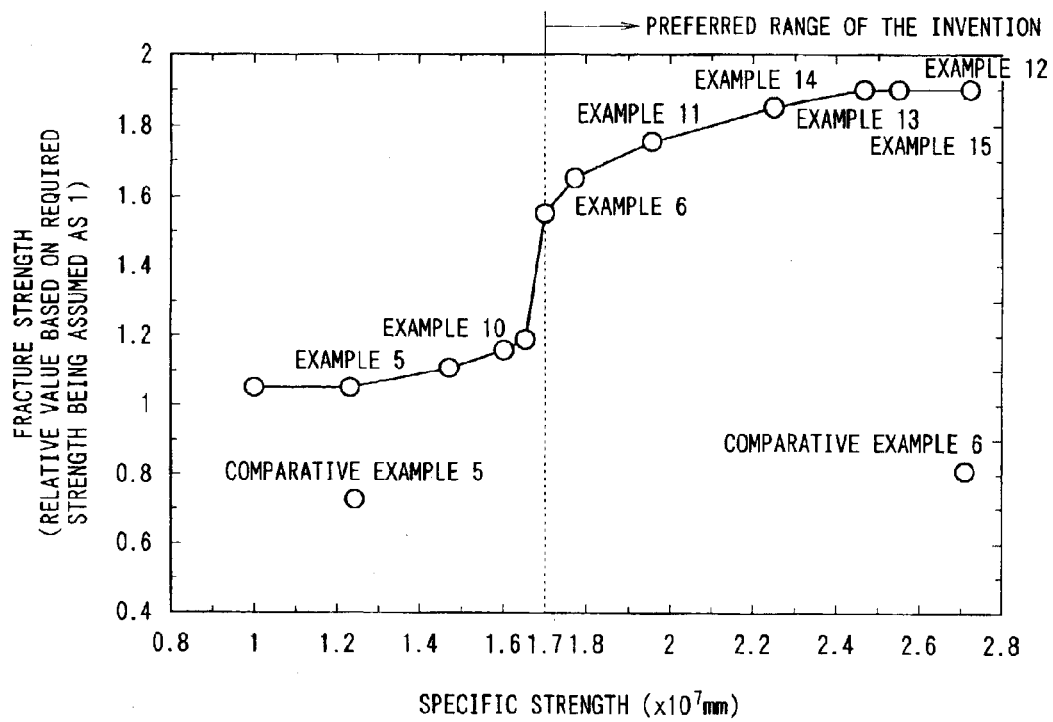
FIG. 4 is a view showing a test result of a bending strength test for examples and comparative examples shown in Table 2.

The present inventors have made a weight loading test as shown in FIG. 2 for guide rails of Examples 1 to 17 and Comparative Examples 1 to 6 shown in Table 1 and Table 2. That is, a weight simulating a head weight is loaded to the other end of a guide rail fixed at one end and the stress value when the rail material was broken by the loaded weight was measured. FIG. 3 and FIG. 4 shows the result of the measurement. The result of the measurement shown in FIG. 3 and FIG. 4 was standardized while assuming a case of driving an actual machine gun type electronic part mounting apparatus at a maximum speed of 0.2 sec for 1 cycle and defining a value obtained by multiplying a maximum stress to the rail calculated by a numerical calculation with a safety factor as 1.

As shown in FIG. 3 and FIG. 4, the guide rails of the examples have a strength about 1.1 to 1.8 times relative to the comparative examples and the strength is above the standard strength described above.

Figure 5:
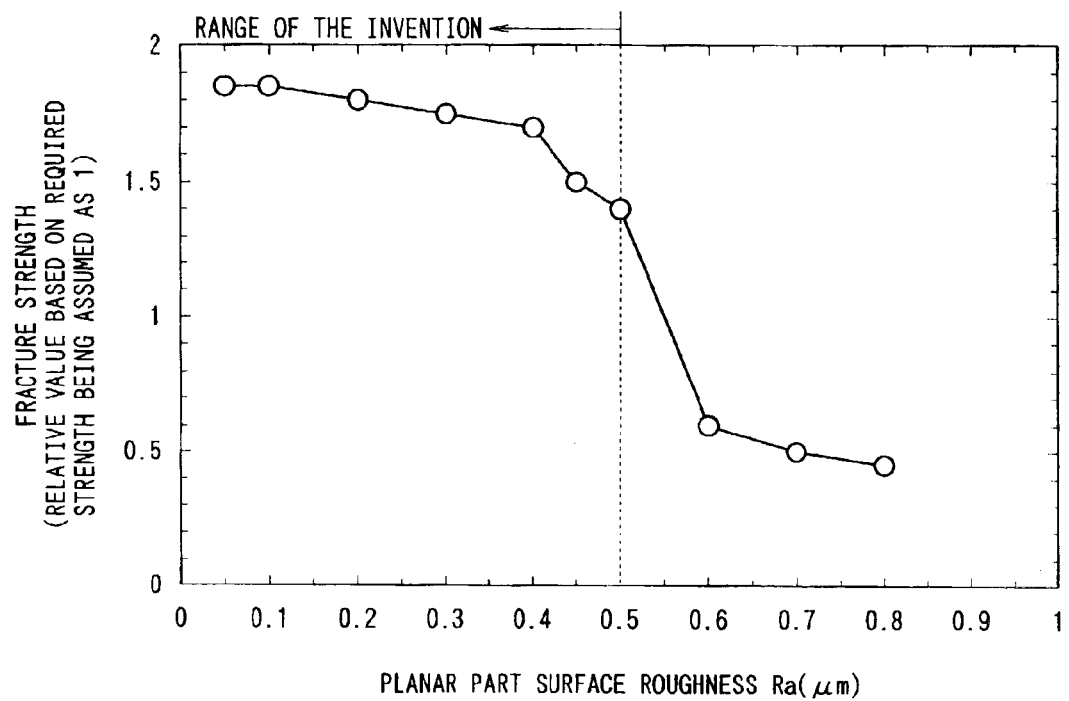
FIG. 5 is a view showing a relation between the surface roughness and a fracture strength of a guide rail planar part formed of a cermet.

Further, the weight loading test was conducted for the guide rail 13 prepared by using the material of the cermet series 1 and varying the surface roughness for the planar part. The result of the measurement is shown in FIG. 5. As shown in FIG. 5, when the surface roughness for the planar part is within the range of this invention, it is above the standard stress.

Further, the present inventors conducted a linear motion test for 10 hours continuously while setting 1 cycle for 0.2 sec, and a rolling element preload of 60 N in a state of loading a bending moment in a simulative manner by way of springs to two rails for the guide rails of Example 1 and Comparative Example 4, and the amount of the preload loss for each of the rails was measured after the test. The test result is shown in Table 3. The test result in Table 3 shows the amount of the preload loss of Comparative Example 4 being assumed as 1.

TABLE 3

| | Change of preload (Comp Example 4 as 1) |
|---|---|
| Example 1 | 0.12 |
| Comp. Example 4 | 1 |

TABLE 4

|  | Rail material | Planar part roughness Ra, μm | Rolling element | Change of preload (Value for Comp. Example 1 as 1) |
|---|---|---|---|---|
| Example 18 | Cemented carbide series 4 | 0.3 | SUS440C | 0.12 |
| Example 19 | Cermet series 1 | 0.3 | Silicon nitride | 0.10 |
| Example 20 | Cermet series 1 | 0.3 | SUS440C | 0.10 |
| Comp. Example 7 | Cemented carbide series 1 | 0.6 | SUS440C | 1 |
| Comp. Example 8 | Cemented carbide series 6 | 0.6 | Silicon nitride | 0.6 |

Figure 15:
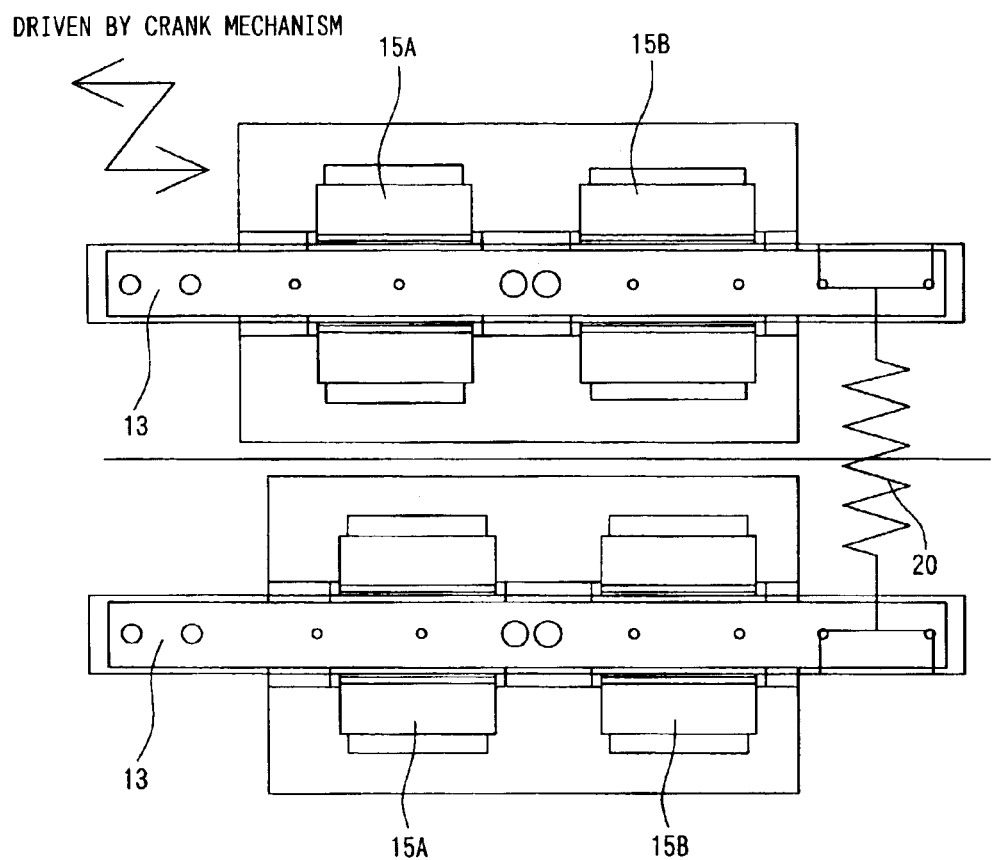
FIG. 15 is a plain view of a tester used for testing the durability of the linear motion guiding device shown in FIG. 15.

FIG. 15 shows a testing equipment simulating a part mounting apparatus. A linear motion test for continuous 20 hours was conducted to Examples 18 to 20 and Comparative Examples 7 and 8 by using the testing equipment at 80 mm of stroke and 0.2 sec for 1 cycle in a state of loading a simulative bending moment to two guide rails 13 by way of a spring (spring load: 100 N), and the amount of preload loss was measured for each of the examples and the comparative examples after the test. Table 4 shows the result of the test. The result of the test in Table 4 is indicated as a relative value based on the amount of preload loss in Comparative Example 7 being assumed as 1. Silicon nitride ball used for the rolling element in this embodiment was formed of EC141 silicon nitride manufactured by Nippon Tokushu Tokogyo Co.

As shown in Table 3, the guide rail of Example 1 with the surface roughness for the rolling groove 16 of rolling element of 0.08 μmRa showed less change for the amount of preload on the rolling element 14 and less injury to the rolling element 14 compared with Comparative Example 4 with the surface roughness for the rolling groove 16 of rolling element of 0.25 μmRa. Change of the preload is caused by the wear of the rolling element 14 (decrease in the diameter).

As has been described above, in this embodiment, when the guide rail 13 is formed of a ceramic material having a specific strength of $2 \times 10^7$ mm or more, or a cermet or a cemented carbide having a specific strength of $1.7 \times 10^7$ mm or more, a guide rail having a sufficient strength to inertia force generated by acceleration or the head weight can be obtained also in a case that the electronic part suction head 10 moves vertically at a high speed of 0.2 sec or less for 1 cycle, or in a case where it is revolved being attached to a drum.

Further, in this embodiment, since the planar part of the guide rail 13 is finished to a surface roughness of 0.5 μmRa to 0.05 μmRa and, preferably, a surface roughness of 0.3 μmRa to 0.05 μmRa, stress concentration due to the surface unevenness of the guide rail 13 is moderated. Accordingly, a guide rail having a sufficient strength to the inertia force generated, for example, by the own weight of the guide rail 13 or the weight of the head 10 can be obtained, and distortion or vibration caused to the guide rail 13 when the electronic part suction head 10 is moved vertically at a high speed can be suppressed.

Further, in this embodiment, when the corner 18a at the recess 18 formed in the guide rail 13 is formed with a radius of curvature of 0.1 mm or more and 1 mm or less, preferably, at a radius of curvature of 0.3 mm or more and 1 mm or less, stress concentration to the corner 18a by the inertia force can be moderated. Accordingly, even in a case where the recess 18 is disposed to the guide rail 13 for avoiding interference with a part, the electronic part suction head 10 can be moved vertically with a higher accuracy and at a higher speed.

Further, in this embodiment, when the surface roughness of the rolling groove 16 of rolling element is 0.2 μmRa or less, preferably, 0.1 μmRa or less, the surface roughening and wear of the rolling element 14 can be prevented more effectively even in a case where the guide rail 13 is formed of a ceramic material such as silicon nitride.

Further, there is no particular restriction on the cermet or the cemented carbide used for the rail of this invention and materials described above can be used.

Next, Examples A1–A4 according to this invention and Comparative Examples a1–a3 are shown in Table 5.

TABLE 5

|  | Rail | Planar part roughness Ra, μm | Rolling element | Durability |
|---|---|---|---|---|
| Example A1 | Silicon nitride 1 (Specific strength $3.2 \times 10^7$ mm) | 0.3 | SUS440C + Diamond-like carbon deposition layer (thickness 2 μm, surface roughness 0.01 Ra) | 15 |
| Example A2 | Silicon nitride 2 (Specific strength $2.6 \times 10^7$ mm) | 0.3 | SUS440C + TiAlN deposition layer (thickness 2 μm, surface roughness 0.05 Ra) | 10 |
| Example A3 | Silicon nitride 3 (Specific strength $2.1 \times 10^7$ mm) | 0.3 | SUS440C + CrN deposition layer (thickness 3 μ, surface roughness 0.03 Ra) | 5 |
| Example A4 | Silicon nitride 4 (Specific strength $1.5 \times 10^7$ mm) | 0.3 | SUS440C + Diamond-like carbon deposition layer (thickness 2 μm, surface roughness 0.01 Ra) | 2.5 |
| Comp. Example a1 | Silicon nitride 4 (Specific strength $1.5 \times 10^7$ mm) | 0.6 | SUS440C | 0.1 |
| Comp. Example a2 | Silicon nitride 3 (Specific strength $2.1 \times 10^7$ mm) | 0.6 | SUS440C + TiN deposition coating layer (thickness 3 μm, surface roughness 0.01 Ra) | 1 |
| Comp. Example a3 | Silicon nitride 3 (Specific strength $2.1 \times 10^7$ mm) | 0.6 | SUS440C + CrN deposition coating layer (thickness 10 μm, surface roughness 0.05 Ra) | 0.6 |

In Table 5, Example A1 is a linear motion guiding device in which the guide rail 13 of FIG. 1 was formed of a high strength silicon carbide obtained by press-sintering at about 1000 atm. (specific strength: $3.2 \times 10^7$ mm, planar part roughness Ra: 0.3 μm) a diamond-like carbon layer (hereinafter simply referred to as DLC coating layer) with a thickness of 2 μm and a surface roughness of 0.01 μmRa was formed to the surface of the rolling element 14 formed of SUS440C, and the surface of the rolling element 14 was coated with the DLC coating layer. Further, Example A2 is a linear motion guiding device in which the guide rail 13 was formed of silicon nitride (specific strength: $2.6 \times 10^7$ mm and planar part roughness Ra: 0.3 μm) obtained by press-sintering at about 1000 atm., a TiAlN coating layer (thickness: 2 μm, surface roughness: 0.05 μmRa) was formed on the surface of the rolling element 14 formed of SUS440C and the surface of the rolling element 14 was coated with the TiAlN coating layer, and Example A3 is a linear motion guiding device in which the guide rail 13 was formed of silicon nitride obtained under sintering condition at about 8 atm. (specific strength: $2.1\times10^7$ mm, planar part roughness Ra: 0.3 μm), a CrN coating layer (layer thickness: 3 μm, surface roughness: 0.03 μmRa) was formed on the surface of a rolling element 14 formed of SUS440C and the surface of the rolling element 14 was coated with the CrN coating layer. Example A4 is a linear motion guiding device in which the guide rail 13 was formed of silicon nitride obtained under the sintering condition at about 8 atm. (specific strength: $1.5\times10^7$ mm, planar part roughness Ra: 0.3 μm), a diamond-like carbon coating layer of 2 μm layer thickness and 0.01 μmRa of surface roughness was formed, and the surface of the rolling element 14 formed of SUS440C was coated with the DLC layer.

On the other hand, Comparative Example a1 is a linear motion guiding device in which the guide rail 13 was formed of silicon nitride obtained under the sintering condition at about 8 atm. (specific strength: $1.5\times10^7$ mm, planar part roughness Ra: 0.6 μm), and a hard coating layer such as of a DLC coating layer was not formed on the surface of the rolling element of Comparative Example a1. Further, Comparative Example a2 is a linear motion guiding device in which the guide rail 13 was formed of silicon nitride obtained under the sintering condition at about 8 atm. (specific strength: $2.1\times10^7$ mm, planar part roughness Ra: 0.6 μm), a TiN coating layer (thickness: 3 μm, surface roughness: 0.1 μmRa) was formed and the surface of the rolling element 14 formed of SUS440C was coated with the TiN coating layer. Comparative Example a3 is a linear motion guiding device in which the guide rail 13 was formed of silicon nitride obtained under the sintering condition at about 8 atm. (specific strength: $2.1\times10^7$ mm, planar part roughness Ra: 0.6 μm), a CrN coating layer (thickness: 10 μm, surface roughness: 0.05 μmRa) was formed and the surface of the rolling element 14 formed of SUS440C was coated with the CrN coating layer. In the rail material of Comparative Example a1, the internal structure is not uniform.

For Examples A1–A4 and Comparative Examples a1–a3 shown in Table 5, a continuous operation for 50 hours was conducted in 0.1 sec for 1 cycle and at 60 N of preload, in a state of loading a simulative bending moment to two guide rails by way of a spring. After the test, the amount of preload loss in each of the rails was measured and the wear amount on the surface of the rolling element was estimated based on the measured value to evaluate the durability of Examples A1–A4 and Comparative Examples a1–a3. Table 5 also shows the result of the evaluation together. The durability in Table 5 is indicated as a relative value based on the amount of preload loss in Comparative Example a2 being assumed as 1.

As shown in Table 5, each of the linear motion guiding devices of Examples A1–A3 shows higher values of durability of about 50 to 150 times compared with those of Comparative Example a1. This is because the guide rail of the Comparative Example a1 was formed of silicon nitride of low specific strength and the planar part roughness was large, whereas the guide rails of Examples A1–A3 were formed of silicon nitride having high specific strength of $2\times10^7$ mm or more and the planar part roughness was small and wear resistance of the rolling element was improved by the hard coating layer.

Further, each of the linear motion guiding devices of Examples A1–A3 shows higher value of durability of about 5 to 15 times compared with those of Comparative Example a2. This is because the surface roughness of the hard coating layer such as TiN formed on the surface of the rolling element in Comparative Example a2 is 0.1 μmRa, whereas the surface roughness of the hard coating layer of DLC and CrN formed on the surface of Examples A1–A3 is 0.05 μmRa or less.

Further, the linear motion guiding device of Example A4 shows relatively higher value of durability of 2.5 times compared with that of Comparative Example a1. This is because the planar part roughness of the guide rail was small, the stress concentration caused to fine unevenness on the surface of the guide rail was decreased, and the wear resistance was improved since DLC (diamond-like carbon) was formed on the surface of the rolling element.

Figure 6:
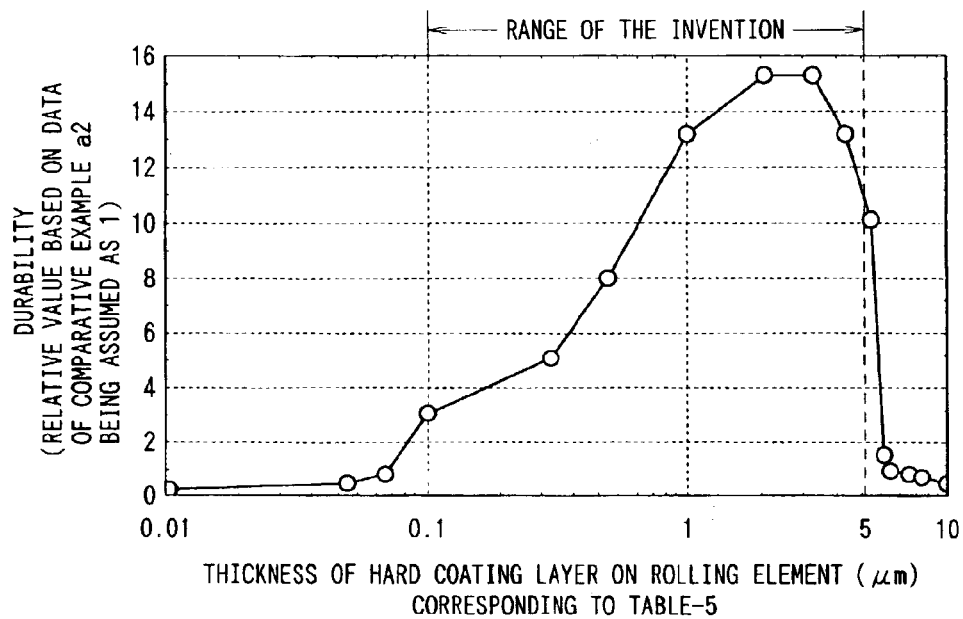
FIG. 6 is a graph showing a relation between the thickness of a DLC coating layer and the durability of the linear motion guiding device in a case of forming the guide rail shown in FIG. 1, with a ceramic material having a specific strength of $2.0 \times 10^7$ mm or more and coating the surface of a rolling element with a DLC coating.

FIG. 6 shows the result of examination for the correlation between the thickness of the hard coating layer, for example, of DLC (surface roughness: 0.01 μmRa) formed on the surface of the rolling element and the durability of the linear motion guiding device. The guide rail of the linear motion guiding device used herein was formed of silicon nitride obtained by press sintering at about 100 atm. (specific strength: $2.6\times10^7$ mm, planar part roughness: 0.3 μm). Further, the durability on the ordinate in the graph is indicated as a relative value based on the amount of preload loss in Comparative Example a2 being assumed as 1.

As shown in FIG. 6, when the thickness of the hard coating layer formed on the surface of the rolling element is out of the range from 0.1 to 5 μm, durability of the linear motion guiding device is lowered abruptly. This is considered that when the thickness of the hard coating layer formed on the surface of the rolling element is out of the range from 0.1 μm to 5 μm, flaking or detachment of the hard coating layer tends to occur and abnormal wear such as chipping is caused to the rolling groove of rolling element or the surface of the rolling element by the flaked pieces of the hard coating layer. Accordingly, in a case of forming a hard coating layer such as of DLC on the surface of the rolling element and coating the surface of the rolling element with the hard coating layer, it is desirable that the thickness of the hard coating layer is within a range from 0.1 μm to 5 μm and, preferably, from 0.2 μm to 5 μm.

Figure 7:
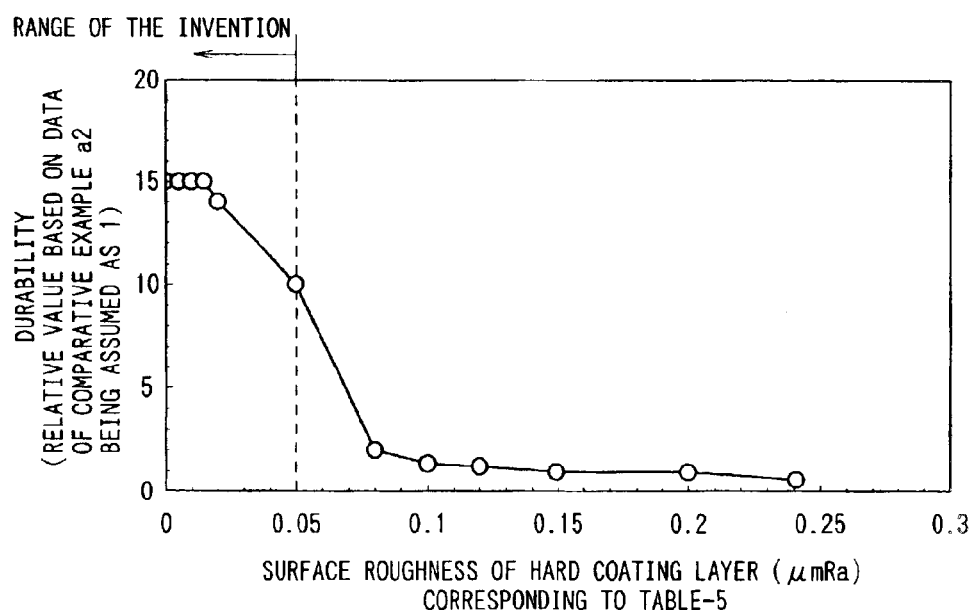
FIG. 7 is a graph showing a relation between the surface roughness of a DLC coating layer and the durability of the linear motion guiding device in a case of forming the guide rail shown in FIG. 1 with a ceramic material having a specific strength of $2.0 \times 10^7$ mm or more and coating the surface of a rolling element with a DLC coating.

Then, FIG. 7 shows the result of examination on the correlation between the surface roughness of the hard coating layer (thickness: 2 μm) formed on the surface of the rolling element and the durability of the linear motion guiding device. The guide rail of the linear motion guiding device used herein was formed of silicon nitride obtained by press-sintering at about 100 atm. (specific strength: $2.6\times10^7$ mm, planar part roughness Ra: 0.3 μm).

As shown in FIG. 7, when the surface roughness of the hard coating layer formed on the surface of the rolling element exceeds 0.05 μmRa, the durability of the linear motion guiding device is lowered abruptly. This is considered that when the surface roughness of the hard coating layer formed on the surface of the rolling element exceeds 0.05 μmRa, the surface of the hard coating layer is locally in contact with the rolling groove of rolling element of the guide rail and the contact stress increases at that portion to cause chipping or the like on the surface of the rolling groove of rolling element, by which the rolling groove of rolling element of the guide rail is worn at an early stage. Accordingly, in a case of forming a hard coating layer such as of DLC or CrN on the surface of the rolling element and coating the surface of the rolling element with the hard coating layer, it is desirable that the surface roughness of the hard coating layer is 0.05 μmRa or less and, preferably, 0.02 μmRa or less.

Then, Table 6 shows Examples B1–B15 of this invention and Comparative Examples b1–b6.

TABLE 6

| | Rail | Specific strength ×10⁷ mm | Planar part roughness Ra, μm | Rolling element | Hardness ratio (rolling element/rail) | Durability |
|---|---|---|---|---|---|---|
| Example B1 | Silicon nitride 1 | 3.2 | 0.3 | Silicon nitride series 1b | 1.00 | 13 |
| Example B2 | Silicon nitride 2 | 2.6 | 0.3 | Silicon nitride series 2b | 1.00 | 12 |
| Example B3 | Silicon nitride 3 | 2.1 | 0.3 | Zirconia series 1b | 0.89 | 7 |
| Example B4 | Silicon nitride 2 | 2.6 | 0.3 | Zirconia series 2b | 0.87 | 8 |
| Example B5 | Silicon nitride 2 | 2.6 | 0.3 | Zirconia series 3b | 0.90 | 9 |
| Example B6 | Silicon nitride 2 | 2.6 | 0.3 | Zirconia series 4b | 1.10 | 10 |
| Example B7 | Silicon nitride 2 | 2.6 | 0.3 | Alumina series 1b | 1.07 | 10 |
| Example B8 | Silicon nitride 2 | 2.6 | 0.3 | Alumina series 2b | 1.33 | 13 |
| Example B9 | Silicon nitride 2 | 2.6 | 0.3 | Cemented carbide series 1b | 0.7 | 5 |
| Example B10 | Silicon nitride 2 | 2.6 | 0.3 | Cemented carbide series 2b | 1.03 | 10 |
| Example B11 | Silicon nitride 2 | 2.6 | 0.3 | Cemented carbide series 3b | 1.13 | 13 |
| Example B12 | Silicon nitride 2 | 2.6 | 0.3 | Cemented carbide series 4b | 1.00 | 12 |
| Example B13 | Silicon nitride 2 | 2.6 | 0.3 | Cermet series 1b | 1.13 | 15 |
| Example B14 | Silicon nitride 2 | 2.6 | 0.3 | Ti series sintered alloy 1b | 0.67 | 7 |
| Example B15 | Silicon nitride 3 | 2.1 | 0.3 | Cemented carbide series 6b | 0.59 | 3 |
| Comp. Example b1 | Silicon nitride 4 | 1.5 | 0.6 | SUS440C | 0.56 | 1 |
| Comp. Example b2 | Silicon nitride 2 | 2.6 | 0.6 | SKH4 | 0.54 | 1.5 |
| Comp. Example b3 | Silicon nitride 3 | 2.1 | 0.6 | Cemented carbide series 5b | 0.51 | 1.6 |
| Comp. Example b4 | Silicon nitride 2 | 2.6 | 0.6 | Cemented carbide series 6b | 0.59 | 1.7 |
| Comp. Example b5 | Silicon nitride 2 | 2.6 | 0.6 | Silicon carbide series 1b | 1.6 | 0.8 |
| Comp. Example b6 | Silicon nitride 3 | 2.1 | 0.6 | Silicon carbide series 2b | 2.04 | 0.5 |

In Table 6, materials for the rolling elements used in Examples B1–B15 and Comparative Examples b1–b6 are collectively shown as below.

(1) silicon nitride series 1b (NPN-3, manufactured by Nippon Tungsten Co.; Hv=1850)

(2) silicon nitride series 2b (SAN^P, manufactured by Shinagawa Shirorenga Co.; Hv=1700)

(3) zirconia series 1b (NPZ-1, manufactured by Nippon Tungsten Co.; Hv=1250)

(4) zirconia series 2b (KGS20, manufactured by Nippon Tokushu Togyo Co.; Hv=1300)

(5) zirconia series 3b (Z703N, manufactured by Kyocera Corp.; Hv=1350)

(6) zirconia series 4b (NPZ-2, manufactured by Nippon Tungsten Co.; Hv=1650)

(7) alumina series 1b (AZ-93, manufactured by Sangoban Norton Co.; Hv=1600)

(8) alumina series 2b (NPA-2, manufactured by Nippon Tungsten Co.; Hv=2000)

(9) cemented carbide series 1b (WC—Ni—Cr series alloy (NM18, manufactured by Nippon Tungsten Co.); Hv=1050)

(10) cemented carbide series 2b (WC—Co series alloy (GTi05, manufactured by Mitsubishi Material Corp.); Hv=1550)

(11) cemented carbide series 3b (WC—TiC—TaC—Co series alloy (SN10, manufactured by Nippon Tungsten Co.); Hv=1700)

(12) cemented carbide series 4b (WC—Co series alloy (UF30, manufactured by Nippon Tungsten Co.); Hv=1500)

(13) cermet series 1b (TiC—TaN—Ni—Mo series alloy (DUX30, manufactured by Nippon Tungsten Co.); Hv=1700)

(14) titanium series sintered alloy 1b (Ti—W—Co series alloy (TW-3, manufactured by Nippon Tungsten Co.; Hv=1000)

(15) SUS440C (Hv=1000)

(16) SKH4 (Hv=750)

(17) cemented carbide series 5b (GTi40C, manufactured by Mitsubishi Material Corp.; Hv=760)

(18) cemented carbide series 6b (Ti30C, manufactured by Mitsubishi Material Corp.; Hv=880)

(19) silicon carbide series 1b (TSC-1, manufactured by Toshiba Co.; Hv=2400)

(20) silicon carbide series 2b (SC-20, manufactured by Nippon Glass Co.; Hv=2860)

For evaluating the durability as the linear motion guiding device, rolling elements were prepared from the raw materials described above to manufacture a linear motion guiding device shown in FIG. 1. In each of the cases, the surface roughness of the rolling elements is 0.25 μmRa. Further, for the rail material, four types of silicon nitride 1–4 shown in Table 6 were used. In this case, silicon nitride 1 is high strength silicon nitride obtained by press-sintering at about 1000 atm. (specific strength: $3.2 \times 10^7$ mm, hardness: Hv 1700), silicon nitride 2 is silicon nitride obtained by press-sintering at about 100 atm. (specific strength: $2.6 \times 10^7$ mm, hardness: Hv 1500), silicon nitride 3 is silicon nitride obtained by press-sintering at about 8 atm. (specific strength: $2.1 \times 10^7$ mm, hardness: Hv 1400). Further, silicon nitride 4 is silicon nitride with not uniform internal structure and with low strength, and having a specific strength of $1.5 \times 10^7$ mm and a hardness of Hv 1200.

For Examples B1–B15 (planar part roughness Ra of 0.3 μm) and Comparative Examples b1–b6 (planar part roughness Ra of 0.6 μm), continuous operation for 50 hours was conducted in 0.2 sec for 1 cycle with 60 N of preload in a state of loading a simulative bending moment to two guide rails by way of a spring. After the test, the amount of preload loss was measured for each of the guide rails, and the wear amount on the surface of the rolling element was estimated based on the measured value to evaluate the durability for Examples B1–B14 and Comparative Examples b1–b6. The result of evaluation is also shown in Table 6 together. Further, durability in Table 6 is indicated as a relative value based on the amount of preload loss in Comparative Example b1 being assumed as 1.

As shown in Table 6, each of the linear motion guiding devices of Examples B1–B14 shows higher value of durability at about 5 to 15 times compared with those of Comparative Example b1. This is because the guide rail of Comparative Example b1 is formed of silicon nitride of low specific strength and has high planar part roughness Ra, whereas the guide rail of Examples A1 to A3 are formed of silicon nitride having high specific strength of $2 \times 10^7$ mm or more and have a low roughness Ra at the planar part.

Further, each of the linear motion guiding devices of Examples B1–B14 shows higher durability value of about 3 to 10 times compared with that of Comparative Example b2. This is because the hardness ratio between the rolling element and the guide rail (rolling element/guide rail) is 0.54 in Comparative Example b2, whereas the hardness ratio between the rolling element and the guide rail is 0.6 or more in Examples A1–A3.

Further, each of the linear motion guiding devices of Examples B1–B14 shows higher value of durability of about 6 to 18 times compared with that of Comparative Example b5. This is because the hardness ratio between the rolling element and the guide rail is 1.6 in Comparative Example b5, whereas the hardness ratio between the rolling element and the guide rail is 1.5 or less in Examples A1–A3.

The linear motion guiding device of Example B15 shows a relatively high value of durability of three times compared with that of Comparative Example b3. This is because the planar part roughness of the guide rail is low, stress concentration caused to fine unevenness on the surface of the guide rail is moderated and the rail has a strength capable of ensuring the inertia force.

Figure 8:
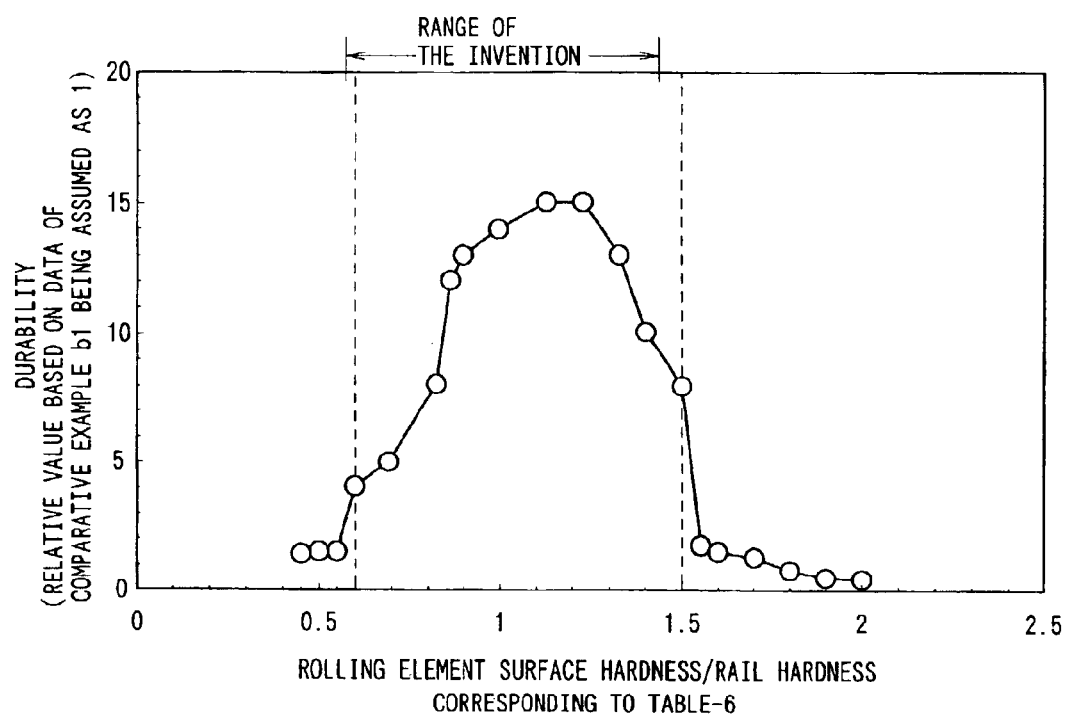
FIG. 8 is a graph showing the durability of a linear motion guiding device in a case of constituting rolling elements with materials of different hardness.

FIG. 8 shows a result of investigation on the correlation between the hardness ratio of the rolling element to the guide rail and the durability of the linear motion guiding device. In this case, the durability of the linear motion guiding device was tested by using a guide rail formed of silicon nitride obtained by press-sintering at about 100 atm. (specific strength: $2.6 \times 10^7$ mm). The planar part roughness of the guide rail is 0.3 μm in each of the cases. Further, the durability expressed on the ordinate in the graph is indicated as a relative value based on the amount of preload loss in Comparative Example 1 being assumed as 1.

As shown in FIG. 8, when the ratio between the surface hardness of the rolling element and the surface hardness of the guide rail is out of the range from 0.6 to 1.5, the durability of the linear motion guiding device lowers abruptly. This is considered to be attributable to the acceleration of the wear of the guide rail or the rolling element when the ratio between the surface hardness of the rolling element and the surface hardness of the guide rail is out of the range from 0.6 to 1.5. Accordingly, in order to prevent lowering of the durability of the linear motion guiding device, the surface hardness of the rolling element may be within a range from 0.6 times to 1.5 times relative to the hardness of the guide rail.

Then, Table 7 shows Examples C1–C3 of this invention and Comparative Examples c1–c3.

TABLE 7

| | Material | Specific strength (mm) | Planar part roughness Ra, μm | Rolling element | Heat treatment | Finished surface hardness (Hv) | Rolling element surface roughness (μm) |
|---|---|---|---|---|---|---|---|
| Example C1 | Silicon nitride 1 | $3.3 \times 10^7$ | 0.3 | SUS440C | Nitridation (condition 1) | 1100 | 0.04 |
| Example C2 | Silicon nitride 2 | $2.7 \times 10^7$ | 0.3 | SUS440C | Nitridation (condition 2) | 1360 | 0.05 |
| Example C3 | Silicon nitride 3 | $2.2 \times 10^7$ | 0.3 | SUS440C | Nitridation (condition 3) | 950 | 0.03 |
| Comp. Example c1 | Silicon nitride 4 | $1.5 \times 10^7$ | 0.6 | SUS440C | Not-treated | 700 | 0.05 |
| Comp. Example c2 | Silicon nitride 2 | $2.7 \times 10^7$ | 0.6 | SUS440C | Not-treated | 710 | 0.06 |

TABLE 7-continued

| | Material | Specific strength (mm) | Planar part roughness Ra, μm | Rolling element | Heat treatment | Finished surface hardness (Hv) | Rolling element surface roughness (μm) |
|---|---|---|---|---|---|---|---|
| Comp. Example c3 | Silicon nitride 3 | $2.2 \times 10^7$ | 0.6 | SUS440C | Nitridation (condition 2) | 1430 | 0.07 |

In Table 7, dense nitride films at Hv 800–Hv 1400 were formed on the entire surface of rolling elements by the following heat treatment methods in Examples C1–C3. So long as the surface hardness of the nitride film is Hv 800 or more, there is no particular restriction on the method of forming the nitride film and a method, for example, soft gas nitridation, ion nitridation, salt bath sulfonitridation and gas sulfonitridation can be used in addition to the heat treatment conditions 1, 2 and 3. Further, in Examples C1–C3, dense nitride films such as $(Fe, Cr)_{2-3 \text{ or } 4}N$, $Cr_2N$, $Mo_2N$, VN, etc. were formed on the entire area of the N-diffusion layer by diffusing and penetrating nitrogen (N) on the surface of rolling elements formed of SUS440S.

The heat treatment conditions 1–3 in Table 7 are as shown below.

<Heat Treatment Condition 1>
480° C.–560° C.×3–8 hr nitridation treatment (50% $N_2$-50% $NH_3$ gas mixture)

<Heat Treatment Condition 2>
300° C.–380° C.×1 hr fluoridation treatment (90% $N_2$-10% $NF_3$ gas mixture) and then 400° C.–480° C.×24–48 hr nitridation treatment (50% $N_2$-50% $NH_3$ gas mixture)

<Heat Treatment Condition 3>
480° C.–560° C.×3–8 hr, soft nitridation treatment (salt bath nitridation comprising cyanate (KCNO and NaCNO) as a main ingredient)

The heat treatment condition 1 is an example of gas nitridation. The heat treatment condition 2 is an example of applying fluoridation treatment as a pretreatment. Since the surface oxide layer inhibiting nitridation is removed by the cleaning effect of the fluoric gas, a uniform nitride film can be formed at a lower temperature which is a particularly effective method for high alloy series. The heat treatment condition 3 is an example of soft nitridation.

Example C1 is a linear motion guiding device in which a guide rail 13 in FIG. 1 is formed of a high strength silicon nitride (specific strength: $3.3 \times 10^7$ mm) obtained by press-sintering at about 1200 atm., and a nitride film (surface hardness: Hv 1100, surface roughness: 0.04 μmRa) is formed on the surface of a rolling element 14 formed of SUS440C, to coat the surface of the rolling element 14 with the nitride film. Further, Example C2 is a linear motion guiding device in which a guide rail 13 is formed of a high strength silicon nitride (specific strength: $2.7 \times 10^7$ mm) obtained by press-sintering at about 150 atm., and a nitride film (surface hardness: Hv 1360, surface roughness: 0.05 μmRa) is formed on the surface of a rolling element 14 formed of SUS440C, to coat the surface of the rolling element 14 with the nitride film. Example C3 is a linear motion guiding device in which a guide rail 13 is formed of silicon nitride (specific strength: $2.2 \times 10^7$ mm) obtained by press-sintering at about 150 atm., and a nitride film (surface hardness: Hv 950, surface roughness: 0.03 μmRa) is formed on the surface of a rolling element 14 formed of SUS440C, to coat the surface of the rolling element 14 with the nitride film. The planar part roughness Ra of the guide rail 13 used in Examples C1, C2 and C3 is 0.3 μm.

On the other hand, Comparative Example c1 is a linear motion guiding device in which a guide rail is formed of silicon nitride at a specific strength of $1.5 \times 10^7$ mm in which a nitride film is not formed on the surface of the rolling element (surface hardness: Hv 700, surface roughness: 0.05 μmRa). Further, Comparative Example c2 is a linear motion guiding device in which the guide rail is formed of silicon nitride with a specific strength of $2.7 \times 10^7$ mm, and the nitride film is neither formed on the surface of the rolling element (surface hardness: Hv 710, surface roughness: 0.06 μmRa) of Comparative Example c2. Further, Comparative Example c3 is a linear motion guiding device in which the guide rail is formed of silicon nitride with a specific strength of $2.2 \times 10^7$ mm. A nitride film with a surface roughness of 0.07 μmRa (surface hardness: Hv 1430) is formed on the surface of the rolling element in Comparative Example c3. The planar part roughness Ra of the guide rail 13 used in Comparative Examples c1, c2 and c3 is 0.6 μm.

For Examples C1–C3 and Comparative Examples c1–c3, continuous operation was conducted for 8 hours, in 0.2 sec for 1 cycle, at a preload of 55 N in a state of simulately loading a bending moment by way of a spring to two rails. After the test, the reduction amount of the friction resistance for each rail was measured to evaluate the wear amount of the rolling element. Table 8 shows the result of evaluation. The reduction amount of the friction resistance shown in Table 8 is indicated as a relative value based on the reduction amount of the friction resistance of Comparative Example c1 being assumed as 1.

TABLE 8

| | Reduction of friction resistance (Comp. Example as 1) |
|---|---|
| Example C1 | 0.025 |
| Example C2 | 0.014 |
| Example C3 | 0.029 |
| Comp. Example c1 | 1 |
| Comp. Example c2 | 0.2 |
| Comp. Example c3 | 0.16 |

As shown in Table 8, the reduction amount of the friction resistance before and after the test was small and injury of the rolling element was also slight in Examples C1–C3 compared with Comparative Examples c1–c3. Reduction of the friction resistance is caused by the wear of the rolling element or the rail.

Further, each of the linear motion guiding devices in Examples C1–C3 shows an extremely low value of about 14/1000–29/1000 for the wear amount of the rolling element compared with Comparative Example c1. This is because the guide rail was formed of silicon nitride of low specific strength and the planar part surface roughness Ra was large in Comparative Example c1, whereas the guide rail was formed of silicon nitride having high specific strength of $2 \times 10^7$ mm or more, the planar part roughness Ra was small and the wear resistance of the rolling element was improved by the nitride film in Examples C1–C3.

Further, each of linear motion guiding devices in Examples C1–C3 shows a low value for the wear amount of the rolling element at about 7/100–145/1000 compared with Comparative Example c2. This is because the nitride film was not formed on the surface of the rolling element in Comparative Example c2, whereas a nitride film was formed on the surface of the rolling element in Examples C1–C3 and the wear resistance was improved.

Further, each of linear motion guiding devices in Examples C1–C3 shows a lower value for the wear amount of the rolling element compared with Comparative Example c3. This is because the surface hardness and the surface roughness of the nitride film formed on the surface of the rolling element are Hv 1430 and 0.07 μmRa in Comparative Example c3, whereas the surface hardness of the nitride film formed on the surface of the rolling element is within a range of Hv 800–Hv 1400, and the surface roughness of the nitride film is 0.05 μmRa or less in Examples C1–C3.

Figure 9:
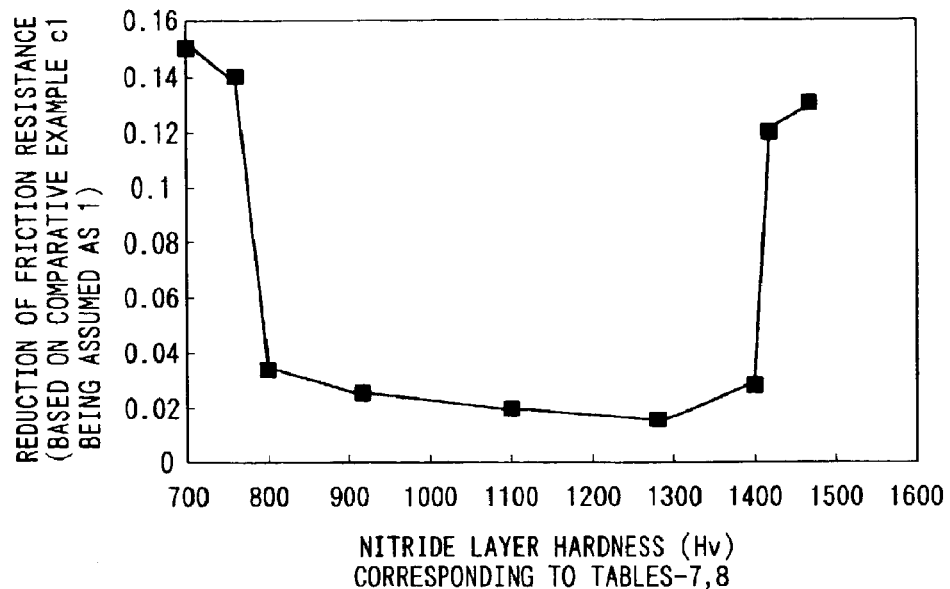
FIG. 9 is a graph showing a relation between the hardness of a nitride layer and the durability of the linear motion guiding device in a case of forming the guide rail shown in FIG. 1 with a ceramic material having a specific strength of $2.0 \times 10^7$ mm or more and coating the surface of a rolling element with a nitride layer.

FIG. 9 shows the result of investigating the correlation between the surface hardness of the nitride film formed on the surface of the rolling element (surface roughness: 0.03 μmRa) and the reduction amount of the wear resistance of the guide rail. The guide rail for the linear motion guiding device used herein is formed of silicon nitride obtained by press-sintering at about 1200 atm. (specific strength: 3.3×$10^7$ mm) and the planar part roughness Ra is 0.3 μm.

As shown in FIG. 9, it can be seen that wear of the rolling element or the rail is accelerated abruptly when the surface hardness of the nitride film formed on the surface of the rolling element is out of the range of Hv 800–Hv 1400. This is because wear of the rolling element is accelerated due to increase in the difference of the hardness to the rail material when the surface hardness of the nitride film is less than Hv 800, whereas $Fe_2N$ is formed on the surface of the nitride film to embrittle the surface of the rolling element when the surface hardness of the nitride film exceeds Hv 1400.

Figure 10:
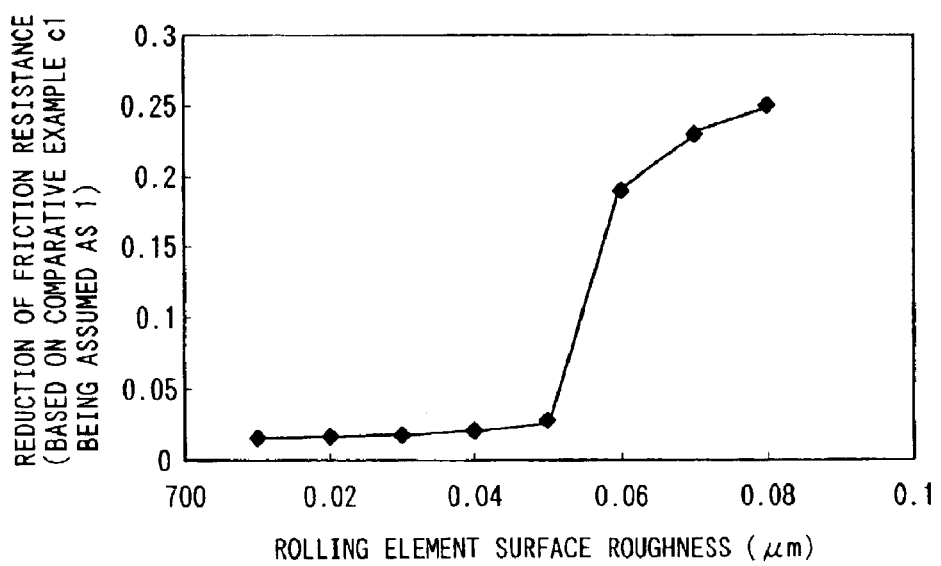
FIG. 10 is a graph showing a relation between the surface roughness of a nitride layer and the durability of the linear motion guiding device in a case of forming the guide rail shown in FIG. 1 with a ceramic material having a specific strength of $2.0 \times 10^7$ mm or more and coating the surface of a rolling element with a nitride layer.

Then, FIG. 10 shows the result of investigating the correlation between the surface roughness of the nitride film formed on the surface of the rolling element (surface hardness: Hv 1350) and the reduction amount of the wear resistance of the guide rail. The guide rail for the linear motion guiding device used herein is formed of silicon nitride obtained by press-sintering at about 1200 atm. (specific strength: 3.3×$10^7$ mm) and the planar part roughness Ra is 0.3 μm.

As shown in FIG. 10, it can be seen that the rolling element and the guide rail are worn abruptly when the surface roughness of the nitride film formed on the surface of the rolling element exceeds 0.05 μmRa. This is because the fine unevenness on the surface of the rolling element tends to be in direct contact with the surface of the rolling groove of the rolling element when the surface roughness of the nitride film exceeds 0.05 μmRa, by which the surface of the rolling groove of rolling element is injured by the fine unevenness on the surface of the rolling element, or wear on the surface of the rolling groove of rolling element is accelerated.

The ceramic for the guide rail, silicon nitride, zirconia, alumina, silicon carbide, titanium boride, etc. can be used and composite sintering products thereof can also be used. Among them, silicon nitride is particularly preferred having high rigidity and high fracture toughness value. In this case, the silicon nitride material can be used further preferably also in view of fractural strength when the fracture toughness value of the material is 5 MPa·m$^{0.5}$ or more and the hardness of the silicon nitride material is 14 GPa or more.

Silicon nitride can be obtained, for example, by an HIP method or a press-sintering such as a gas pressure sintering method and the material having columnar crystals grown to a columnar shape at an average value of 3 μm width or less and 4 μm length or more by 70% or more and, preferably, 90% or more of the entire silicon particles are desirable. The material obtained by atmospheric pressure sintering may also be used so long as the material can satisfy the condition for the specific strength. Further, the auxiliary ingredient can be selected from metal oxides such as $Al_2O_3$, MgO, CeO, or rare earth oxides such as $Y_2O_3$, $Yb_2O_3$ or $La_2O_3$. Those which are added by 20 wt % as the upper limit for the entire sintering product can be used. Further, when defects in the inside of the material such as pores and obstacles are 50 μm or less, preferably, 20 μm or less corresponding to the circle equivalent diameter, since local degradation of the material strength can be suppressed, the reliability of the material can be improved.

Then, Table 9 shows Examples D1–D3 of this invention and Comparative Examples d1–d3.

TABLE 9

| | Rail | Specific strength (mm) | Planar part roughness Ra, μm | Rolling element | Heat treatment | Finished surface hardness (Hv) | Rolling element surface roughness |
|---|---|---|---|---|---|---|---|
| Example D1 | Silicon nitride 1 | 3.3 × $10^7$ | 0.3 | SUS440C | Cr Pack cementation | 1640 | 0.03 |
| Example D2 | Silicon nitride 2 | 2.7 × $10^7$ | 0.3 | SUS440C | Cr Pack cementation | 1560 | 0.05 |
| Example D3 | Silicon nitride 3 | 2.2 × $10^7$ | 0.3 | SUS440C | Cr Pack cementation | 1720 | 0.04 |
| Comp. Example d1 | Silicon nitride 4 | 1.5 × $10^7$ | 0.6 | SUS440C | Not treated | 700 | 0.05 |
| Comp. Example d2 | Silicon 2 | 2.7 × $10^7$ | 0.6 | SUS440C | Not treated | 710 | 0.05 |
| Comp. Example d3 | Silicon nitride 3 | 2.2 × $10^7$ | 0.6 | SUS440C | Cr Pack cementation | 1750 | 0.1 |

In Table 9, Example D1 is a linear motion guiding device in which a guide rail 13 of FIG. 1 is formed of high strength silicon nitride (specific strength: $3.3\times10^7$ mm) obtained by press-sintering at about 1200 atm. and a composite carbide layer containing Cr carbide and C (surface hardness: Hv 1640, surface roughness: 0.03 μmRa) is formed on the surface of the rolling element 14 formed of SUS440C, to coat the surface of the rolling element 14 with the composite carbide layer. Further, Example D2 is a linear motion guiding device in which a guide rail 13 is formed of high strength silicon nitride (specific strength: $2.7\times10^7$ mm) obtained by press-sintering at about 150 atm., a composite carbide layer containing Cr carbide and C (surface hardness: Hv 1560, surface roughness: 0.05 μmRa) is formed on the surface of the rolling element 14 comprising SUS440C, and the surface of the rolling element 14 is coated with the composite carbide layer. Example D3 is a linear motion guiding device in which a guide rail 13 is formed of high strength silicon nitride (specific strength: $2.2\times10^7$ mm) obtained by press-sintering at about 10 atm., a composite carbide layer containing Cr carbide and C (surface hardness: Hv 1720, surface roughness: 0.04 μmRa) is formed on the surface of the rolling element 14 formed of SUS440C, to coat the surface of the rolling element 14 with the composite carbide layer. The planar part roughness Ra of the guide rail 13 used in Examples D1, D2 and D3 is 0.3 μm.

On the other hand, Comparative Example d1 is a linear motion guiding device in which the guide rail is formed of silicon nitride with a specific strength of $1.5\times10^7$ mm and a composite carbide layer is not formed on the surface of the rolling element (surface hardness: Hv 700, surface roughness: 0.05 μmRa) of Comparative Example d1. Further, Comparative Example d2 is a linear motion guiding device in which the guide rail is formed of silicon nitride with a specific strength of $2.7\times10^7$ mm and a composite carbide layer is neither formed on the surface of the rolling element (surface hardness: Hv 710, surface roughness: 0.05 μmRa) of Comparative Example d2. Further, Comparative Example d3 is a linear motion guiding device in which the guide rail is formed of silicon nitride with a specific strength of $2.2\times10^7$ mm and a composite carbide layer with a surface roughness of 0.1 μmRa (surface hardness: Hv 1750) is formed on the surface of the rolling element of Comparative Example d3. The planar part surface roughness Ra of the guide rail used in Comparative Examples d1, d2 and d3 is 0.6 μm. A composite carbide layer comprising Fe, Cr and C can be formed uniformly over the entire area of the Cr diffusion layer by diffusing and penetrating Cr to the surface of the rolling element. The Cr diffusing and penetrating treatment is not restricted particularly. An example of Cr diffusion.carburization can includes a method of using a semi-sealed container formed of steel plates, burying a product to be treated in a powder mixture comprising 65 wt %–80 wt % of a metal Cr powder, 19 wt %–34 wt % of an $Al_2O_3$ powder and 0.5 wt % to 1.0 wt % of $NH_4C$ and heating them at 950° C.–1150° C. for 5–15 hours while flowing an $H_2$ gas. According to the method, Cr carbide at high hardness ($Cr_{23}C_6$, $Cr_7C_6$, $Cr_2C$) contained in the chromium diffusion hard layer can provide not flaking stable surface hardened layer to the product to be treated. Further, the base metal is preferably iron and steel materials having a strength after tempering of HRC58 or more (for example, stainless steel SUJ2).

For Examples D1–D3 and Comparative Examples d1–d3, continuous operation for 8 hours was conducted in 0.2 sec for one cycle at a preload of 55 N in a state of loading a simulative bending moment by way of a spring to two rails. After the test, reduction amount of the friction resistance for each rail was measured to evaluate the wear amount of the rolling element. The results of evaluation are shown in Table 10. The reduction amount of the friction resistance shown in Table 10 is indicated as a relative value based on the reduction amount of the friction resistance of Comparative Example d1 being assumed as 1.

TABLE 10

|  | Reduction of friction resistance (Comp. Example as 1) |
| --- | --- |
| Example D1 | 0.004 |
| Example D2 | 0.008 |
| Example D3 | 0.006 |
| Comp. Example d1 | 1 |
| Comp. Example d2 | 0.11 |
| Comp. Example d3 | 0.13 |

As shown in Table 10, each of the linear motion guiding devices in Examples D1–D3 shows an extremely low value for the wear amount of the rolling element of about 1/250–2/250 compared with Comparative Example d1. This is because the guide rail of Comparative Example d1 was formed of silicon nitride with low specific strength and the planar part roughness RA was large, whereas the guide rail in Examples D1–D3 were formed of high silicon nitride with high specific strength of $2\times10^7$ mm or more, the planar part roughness Ra was small and the wear resistance was improved by the composite carbide layer.

Further, each of the linear motion guiding devices in Examples D1–D3 shows a low value for the wear amount of the rolling element compared with Comparative Example d2. This is because the composite carbide layer was not formed on the surface of the rolling element in Comparative Example D2, whereas the composite carbide layer was formed on the surface of the rolling element in Examples D1–D3.

Further, each of the linear motion guiding devices in Examples D1–D3 shows a low value for the wear amount of the rolling element compared with Comparative Example d3. This is because the surface hardness and the surface roughness of the composite carbide layer formed on the surface of the rolling element in Comparative Example d3 were Hv 1750 and 0.1 μmRa, whereas the surface hardness of the composite carbide layer formed on the surface of the rolling element was within a range of Hv 1000 to Hv 1800 and the surface roughness of the composite carbide layer was 0.05 μmRa or less in Examples C1–C3.

Figure 11:
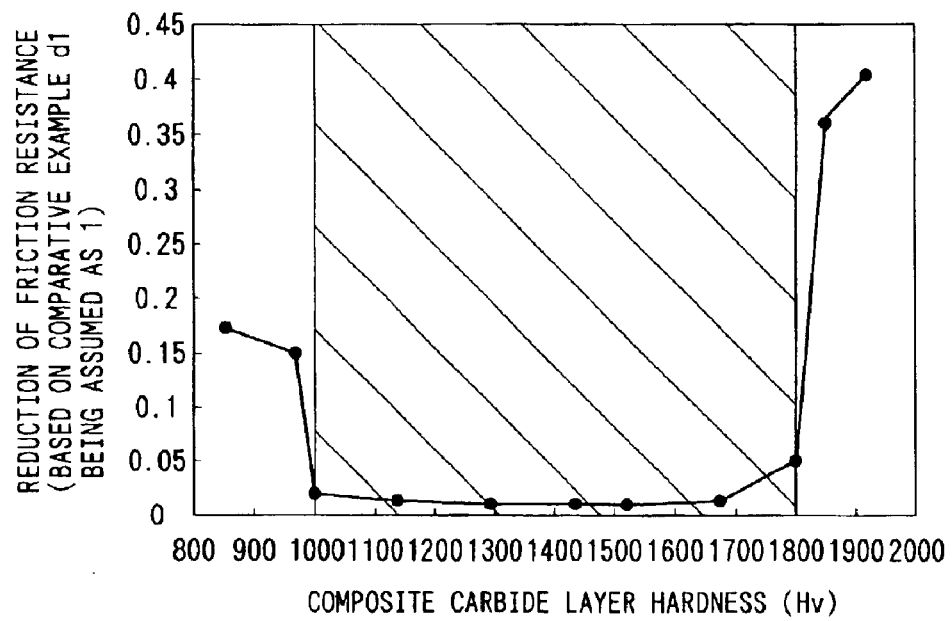
FIG. 11 is a graph showing a relation between the hardness of a composite carbide layer and the durability of a linear motion guiding device in a case of forming the guide rail shown in FIG. 1 with a ceramic material having a specific strength of $2.0 \times 10^7$ mm or more and coating the surface of a rolling element with a composite carbide layer.

FIG. 11 shows a result of investigation on the correlation between the surface hardness of the composite carbide layer formed on the surface of the rolling element and the reduction amount of the friction resistance of the guide rail. The guide rail of the linear motion guiding device used herein was formed of silicon nitride (specific strength: $3.3\times10^7$ mm) obtained by press-sintering at about 1200 atm.

As shown in FIG. 11, when the surface hardness of the composite carbide layer formed on the surface of the rolling element is out of the range from Hv 1000 to Hv 1800, the wear amount of the guide rail or the rolling element increases abruptly. This is because the wear of the rolling element is accelerated by increased difference of the hardness relative to the rail material in a case where the surface hardness of the composite carbide layer is less than Hv 1000, while the carbide layer formed on the surface of the rolling element is embrittled in a case where the surface hardness of the composite carbide layer exceeds Hv 1800.

Figure 12:
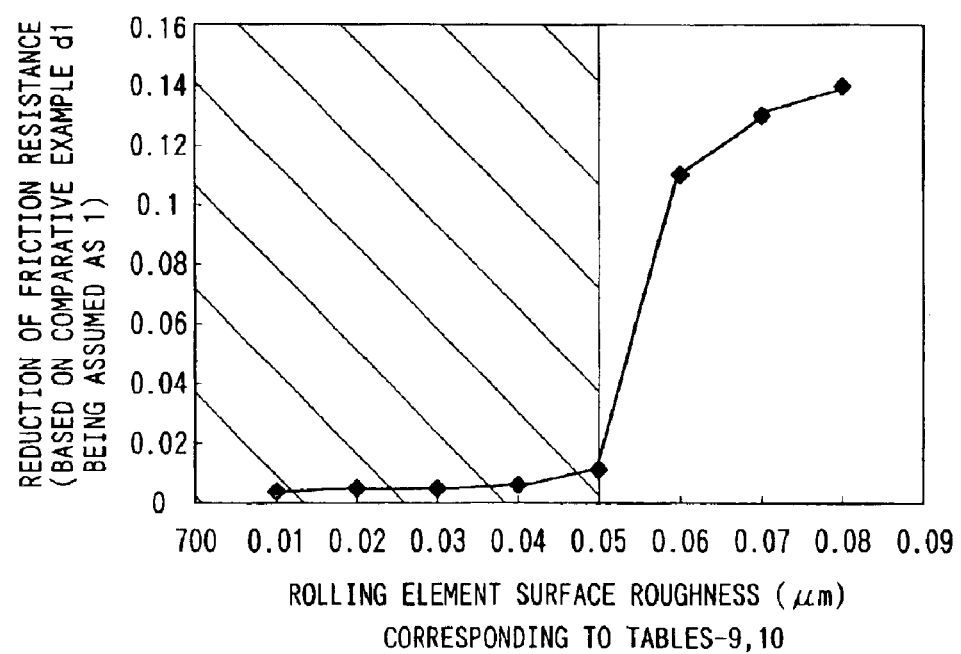
FIG. 12 is a graph showing a relation between the surface roughness of a composite carbide layer and the durability of the linear motion guiding device in a case of forming the guide rail shown in FIG. 1 with a ceramic material having a specific strength of $2.0 \times 10^7$ mm or more and coating the surface of a rolling element with a composite carbide layer.

Then, FIG. 12 shows the result of investigation on the correlation between the surface roughness of the composite carbide layer formed on the surface of the rolling element and the reduction amount of the friction resistance of the guide rail. The guide rail of the linear motion guiding device used herein is formed of silicon nitride (specific strength: $3.3 \times 10^7$ mm) obtained by press-sintering at about 1200 atm.

As shown in FIG. 12, when the surface roughness of the composite carbide layer formed on the surface of the rolling element exceeds 0.05 μmRa, the wear amount of the guide rail or the rolling element increases abruptly. This is because fine unevenness on the surface of the rolling element tends to be in direct contact with the surface of the rolling groove of rolling element in a case where the surface roughness of the composite carbide layer exceeds 0.05 μmRa, and the surface of the rolling groove of rolling element is injured by the composite carbide layer or wear is accelerated in a case where the surface roughness of the composite carbide layer exceeds 0.05 μmRa.

As the ceramics for the guide rails, silicon nitride, zirconia, alumina, silicon carbide, titanium boride and the like can be used, and composite sintered products thereof can be used. Among them silicon nitride is particularly preferred having high rigidity and high fracture toughness. In this case, when the fracture toughness value of the silicon nitride material is 5 MPa·m$^{0.5}$ or more and the hardness of the silicon nitride material is 15 GPa or more, it can be used further preferably also in view of the fractural strength.

Then, Examples E1–E3 according to this invention and Comparative Examples e1–e3 are shown in Table 11.

under the sintering condition at about 10 atm and a boride layer (surface hardness: Hv 1640, surface roughness: 0.03 μmRa) is formed on the surface of the rolling element 14 formed of SUS440C, to coat the surface of the rolling element 14 with the boride layer. The planar part roughness Ra of the guide rail 13 used in Examples E1–E3 is 0.3 μm.

On the other hand, Comparative Example e1 is a linear motion guiding device in which the guide rail is formed of silicon nitride with a specific strength of $1.5 \times 10^7$ mm, and the boride film is not formed on the surface of the rolling element (surface hardness: Hv 700, surface roughness: 0.05 μmRa) of Comparative Example e1. Further, Comparative Example e2 is a linear motion guiding device in which the guide rail was formed of silicon nitride with a specific strength of $2.7 \times 10^7$ mm, and the boride film was neither formed on the surface of the rolling element (surface hardness: Hv 710, surface roughness: 0.05 μmRa) of Comparative Example e2. Further, Comparative Example e3 is a linear motion guiding device in which the guide rail was formed of silicon nitride with a specific strength of $2.2 \times 10^7$ mm, and a boride layer with the surface roughness of 0.08 μmRa (surface hardness: Hv 1650) was formed on the surface of the rolling element of Comparative Example e3. The planar part roughness Ra of the guide rail 13 used in Comparative Examples e1–e3 is 0.6 μm.

In a case of forming the boride layer on the surface of the rolling element, the boride layer can be formed uniformly on the surface of the rolling element, for example, by diffusing

TABLE 11

|  | Rail | Specific strength (mm) | Planar part roughness Ra, μm | Rolling element | Heat treatment | Finished surface hardness (Hv) | Rolling element surface roughness (μm) |
|---|---|---|---|---|---|---|---|
| Example E1 | Silicon nitride 1 | $3.3 \times 10^7$ | 0.3 | SUJ2 | Boridation | 1530 | 0.04 |
| Example E2 | Silicon nitride 2 | $2.7 \times 10^7$ | 0.3 | SUJ2 | Boridation | 1460 | 0.05 |
| Example E3 | Silicon nitride 3 | $2.2 \times 10^7$ | 0.3 | SUJ2 | Boridation | 1640 | 0.03 |
| Comp. Example e1 | Silicon nitride 4 | $1.5 \times 10^7$ | 0.6 | SUS440C | Not treated | 700 | 0.05 |
| Comp. Example e2 | Silicon nitride 3 | $2.2 \times 10^7$ | 0.6 | SUS440C | Not treated | 710 | 0.05 |
| Comp. Example e3 | Silicon nitride 2 | $2.7 \times 10^7$ | 0.6 | SUJ2 | Boridation | 1650 | 0.08 |

In Table 11, Example E1 is a linear motion guiding device in which the guide rail 13 in FIG. 1 is formed of high strength silicon nitride (specific strength: $3.3 \times 10^7$ mm) obtained by press-sintering at about 1200 atm, and a boride layer (surface hardness: Hv 1530, surface roughness: 0.04 μmRa) is formed on the surface of the rolling element 14 formed of SUS440C, to coat the surface of the rolling element 14 with the boride layer. Further, Example E2 is a linear motion guiding device in which the guide rail 13 is formed of high strength silicon nitride (specific strength: $2.7 \times 10^7$ mm) obtained by press-sintering at about 150 atm and a boride layer (surface hardness: Hv 1460, surface roughness: 0.05 μmRa) is formed on the surface of the rolling element 14 formed of SUS440C, to coat the surface of the rolling element 14 with the boride layer. Further, Example E3 is a linear motion guiding device in which the guide rail 13 is formed of high strength silicon nitride (specific strength: $2.2 \times 10^7$ mm) obtained by press-sintering and penetrating boron to the surface of the rolling element and, successively, applying quenching and tempering thereto. The method of diffusing and penetrating boron to the surface of the rolling element can include, for example, a gas method of diffusing and penetrating boron by using diborane or a gas mixture comprising boron trichloride and hydrogen as a treating agent. A powder method of diffusing and penetrating boron by using a powder mixture of boron or ferro-boron and alumina and ammon chloride, and an immersion method of diffusing and penetrating boron by using borax, sodium oxide and potassium oxide as a treating agent. The methods described above involve problems such that the processing gas in the gas method is toxic and the processing cost is expensive in the powder method. Further, since the boride layer generally comprises two layers of an Fe$_2$B layer and an FeB layer in which the hardness of the Fe$_2$B layer on the side of the surface reaches as high as Hv 1700–Hv 2000 and the layer is extremely brittle, it is preferred that the surface layer of the boride layer is the Fe$_2$B layer. Accordingly, in a case of forming the boride layer on the surface of the rolling element, a boride layer having the Fe$_2$B layer on the surface (hardness: Hv 1000–Hv 1700) can be obtained by using the immersion method described above and conducting the diffusing and penetrating treatment under the conditions at a treatment temperature of 900° C.–1000° C. and for a treating time of 3 hours to 6 hours.

Further, since the boriding treatment is followed by gradual cooling, the underlayer for the boride layer generally comprises a ferrite, pearlite or mixed phase of ferrite and pearlite which is sometimes insufficient in the strength required for the rolling element and can not endure large contact stress. Therefore, the element in a state applied with boridation as it is may be used as sliding parts but is not applicable to a rolling element such as of a rolling bearing. In view of the above, strength capable of enduring the stress caused by contact with the guide rail can be ensured by using a material that is hardened by quenching and by applying quenching and tempering after the boriding treatment as the base metal for the rolling element.

For providing the base metal of the rolling element with sufficient quench hardness, while a sufficient quench hardness can be provided by using a steel of high carbon content, boron atoms having the atom radius larger than that of the carbon atom intrude from the surface of the base metal upon boriding treatment. Therefore, when the carbon content in the base metal is 1.0% or more, the boriding property is hindered and the boride film is less formed, the boride layer is sometimes lost after pressing the rolling element. On the other hand, if the carbon content in the base metal is 0.3% or less, no sufficient core strength to support the underlying layer of the boride layer can be obtained. Accordingly, in order to satisfy the thickness, hardness and core strength of the boride layer together, it is preferred to use a steel with the total carbon content of 0.3 wt % to 1.0 wt % and, preferably, 0.4 wt % to 0.9 wt % as the base metal for the rolling element.

For Examples E1–E3 and Comparative Examples e1–e3, a continuous operation for 8 hours was conducted in 0.2 sec for 1 cycle at a preload of 55 N, in a state of loading simulative bending moment by way of a spring to two rails. After the test, the reduction amount of the friction resistance for each of the rails was measured to evaluate the wear amount of the rolling element. The results of evaluation are shown in Table 12. The reduction amount of the friction resistance shown in Table 12 is indicated as a relative value based on the reduction amount of the friction resistance of Comparative Example e1 being assumed as 1.

TABLE 12

|  | Reduction of friction resistance (Comp. Example as 1) |
| --- | --- |
| Example E1 | 0.006 |
| Example E2 | 0.008 |
| Example E3 | 0.005 |
| Comp. Example e1 | 1 |
| Comp. Example e2 | 0.13 |
| Comp. Example e3 | 0.1 |

As shown in Table 12, each of the linear motion guiding devices in Examples E1–E3 shows an extremely low value of about 1/200–1/125 for the wear amount of the rolling element compared with Comparative Example e1. This is because the guide rail of Comparative Example e1 was formed of silicon nitride with low specific strength and the planar part roughness Ra was large, whereas guide rail of Examples E1–E3 was formed of high silicon nitride having a high specific strength of 2×10$^7$ mm or more, the planar part roughness Ra was small and the wear resistance was improved by the boride layer.

Further, each of the linear motion guiding devices in Examples E1–E3, shows a low value for the wear amount of the rolling element compared with Comparative Example e2. This is because the boride layer was not formed on the surface of the rolling element in Comparative Example e2, whereas the boride layer was formed on the surface of the rolling element in Examples E1–E3.

Further, each of the linear motion guiding devices in Examples E1–E3 shows a low value for the wear amount of the rolling element compared with Comparative Example e3. This is because the surface hardness and the surface roughness of the boride layer formed on the surface of the rolling element are Hv 1650 and 0.08 μmRa in Comparative Example e3, whereas the surface hardness of the boride film formed on the surface of the rolling element is within the range of Hv 1000–Hv 1700 and the surface roughness of the nitride layer was 0.05 μmRa or less in Examples E1–E3.

Figure 13:
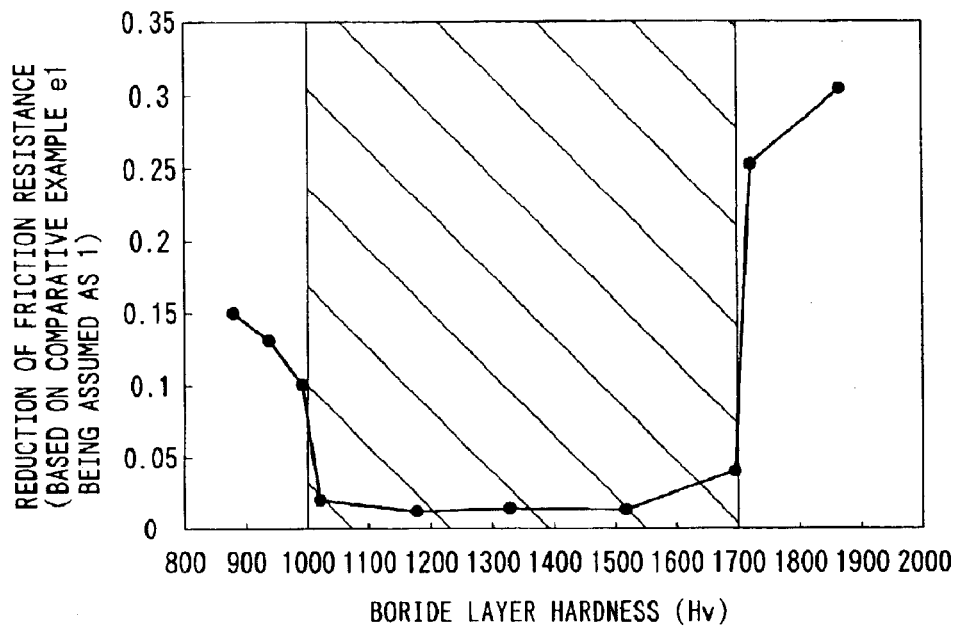
FIG. 13 is a graph showing a relation between the hardness of a boride layer and the durability of the linear motion guiding device in a case of forming the guide rail shown in FIG. 1 with a ceramic material having a specific strength of $2.0 \times 10^7$ mm or more and coating the surface of a rolling element with a boride layer.

FIG. 13 shows the result of investigation on the correlation between the surface hardness of the boride layer formed on the surface of the rolling element and the durability of the linear motion guiding device. The guide rail of the linear motion guiding device used herein is formed of silicon nitride (specific strength: 2.6×10$^7$ mm) obtained by press-sintering at about 100 atm. Further, the durability expressed on the abscissa of the graph is indicated as a relative value based on the amount of preload loss in Comparative Example e1 being assumed as 1.

As shown in FIG. 13, when the surface hardness of the boride layer formed on the surface of the rolling element is out of the range of Hv 1000–Hv 1700, durability of the linear motion guiding device lowers abruptly. This is because the wear of the rolling element is accelerated by the increased difference of the hardness relative to the rail material in a case where the surface hardness of the boride layer formed on the surface of the rolling element is less than Hv 1000, and the boride layer becomes extremely brittle in a case where the surface hardness of the boride layer exceeds Hv 1700. Accordingly, the surface hardness of the boride layer formed on the surface of the rolling element is preferably within a range from Hv 1000 to Hv 1700.

Figure 14:
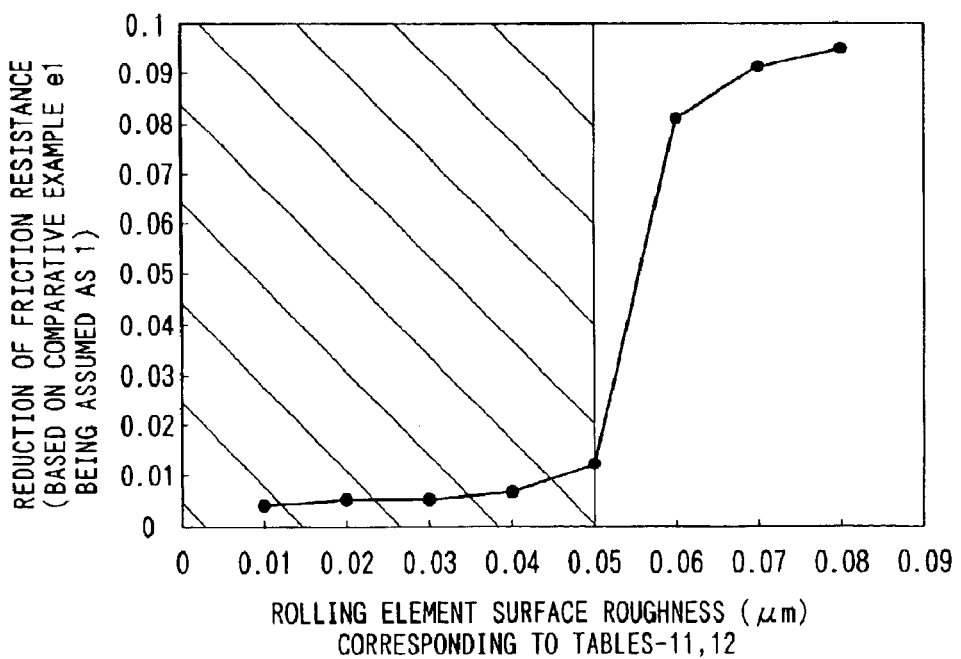
FIG. 14 is a graph showing a relation between the surface roughness of a boride layer and the durability of the linear motion guiding device in a case of forming the guide rail shown in FIG. 1 with a ceramic material having a specific strength of $2.0 \times 10^7$ mm or more and coating the surface of a rolling element with a boride layer.

Then, FIG. 14 shows results of investigation on the correlation between the surface roughness of the boride layer formed on the surface of the rolling element and the durability of the linear motion guiding device. The guide rail of the linear motion guiding device used herein is formed of silicon nitride obtained by press-sintering at about 100 atm (specific strength: 2.6×10$^7$ mm). Further, durability expressed on the ordinate of the graph is indicated as a relative value based on the amount of preload loss in Comparative Example e1 being assumed as 1.

As shown in FIG. 14, when the surface roughness of the boride layer formed on the surface of the rolling element exceeds 0.05 μmRa, durability of the linear motion guiding device lowers abruptly. This is because fine unevenness on the surface of the rolling element tends to be in direct contact with the surface of the rolling groove of rolling element when the surface roughness of the boride layer exceeds 0.05 μmRa, and the surface of the rolling groove of rolling element is injured or the wear on the surface of the rolling groove of rolling element is accelerated by the boride layer. Accordingly, the surface roughness of the boride layer formed on the surface of the rolling element is preferably 0.05 μmRa or less.

Then, Table 13 shows Examples F1–F9 of the invention and Comparative Examples f1–f4.

TABLE 13

| | Lateral mean roughness μm | Longitudinal mean roughness μm | Skew rate (Sk) | Planar part roughness μm |
|---|---|---|---|---|
| Example F1 | 0.04 | 0.06 | −1.8 | 0.3 |
| Example F2 | 0.1 | 0.06 | −1.4 | 0.3 |
| Example F3 | 0.15 | 0.06 | −0.5 | 0.3 |
| Example F4 | 0.15 | 0.02 | −2.4 | 0.3 |
| Example F5 | 0.15 | 0.1 | −2 | 0.3 |
| Example F1 | 0.2 | 0.06 | −2 | 0.3 |
| Example F7 | 0.2 | 0.06 | −0.1 | 0.3 |
| Example F8 | 0.2 | 0.06 | 0.5 | 0.3 |
| Example F9 | 0.2 | 0.06 | 1 | 0.3 |
| Comp. Example f1 | 0.25 | 0.06 | −1.2 | 0.6 |
| Comp. Example f2 | 0.2 | 0.15 | −1.4 | 0.6 |
| Comp. Example f3 | 0.25 | 0.15 | −1.2 | 0.6 |
| Comp. Example f4 | 0.25 | 0.15 | 1 | 0.6 |

In Table 13, Examples F1–F9 are linear motion guiding devices in which the surface roughness in the lateral direction is 0.04 to 0.2 μm, the surface roughness in the longitudinal direction is 0.02 to 0.1 μm and the degree of skew (SK value) is −0.1 to +1 for the rolling groove 16 of rolling element of the guide rail 13.

On the contrary, Comparative Examples f1–f4 are linear motion guiding devices in which the surface roughness in the lateral direction is 0.2 to 0.25 μm, the surface roughness in the longitudinal direction is 0.15 μm and the degree of skew (SK value) is −1.4 for the rolling groove 16 of rolling element of the guide rail 13.

Further, in Examples F1–F9 and Comparative Examples f1–f4, silicon nitride obtained by press sintering (specific strength: $3.1\times10^7$ mm) are used as the rail material and $NF_2$ is used as grease. Further, the rolling element in each of the examples is formed of martensitic stainless steel.

FIG. 15 shows a testing equipment simulating a part mounting apparatus and a duration test was conducted on Examples F1–F9 and Comparative Examples f1–f4 using the test equipment. In the testing equipment, two guide rails 13 as the specimen are arranged in parallel on the testing equipment and one end for each of the guide rails 13 is connected by a spring 20, so that load generated upon high speed motion of the guide rail 16 can be loaded to the test specimen. The rails 13 are reciprocated at a high speed by a not illustrated external driving source to enable a test under the conditions similar with those of actual apparatus equipments. Further, the initially set preload loaded on each of the sliders 15A, 15B assembled to a test specimen are 1.5 N and 0.8 N, respectively.

The test was conducted up to $10\times10^6$ cycles under a spring load of 100 N, for a stroke of 90 mm and in a reciprocal period of 0.15 sec and then the test specimen was detached and the amount of preload loss was measured.

Figure 16:
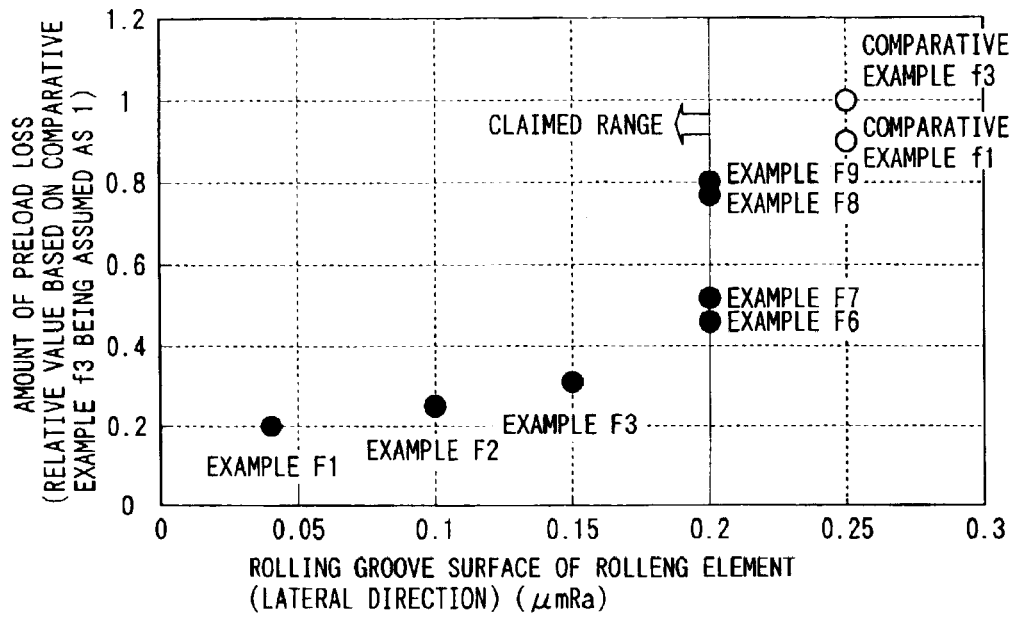
FIG. 16 is a graph showing a relation between the surface roughness in the lateral direction of a rolling groove of a rolling element and a reduction amount of preload.
Figure 17:
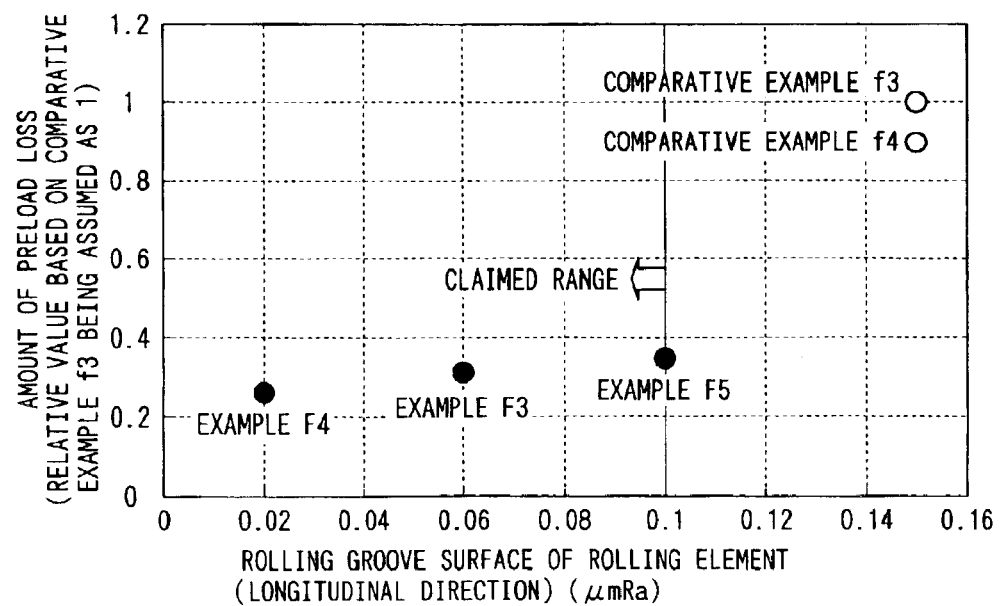
FIG. 17 is a graph showing a relation between the surface roughness in the longitudinal direction of a rolling groove of a rolling element and a reduction amount of preload.
Figure 18:
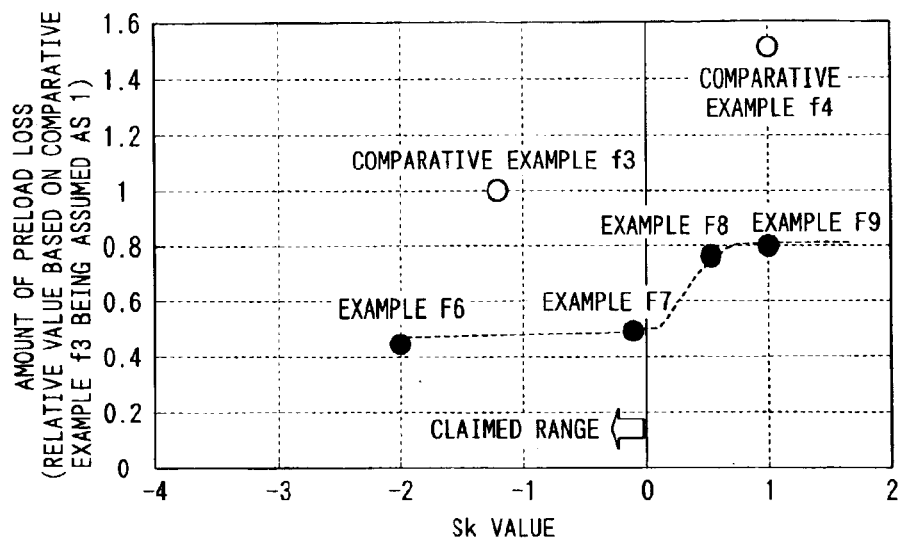
FIG. 18 is a graph showing a relation between the Sk value on the surface of a rolling groove of a rolling element and a reduction amount of preload.

FIG. 16, FIG. 17 and FIG. 18 show the result of the test conducted on the durability of Examples F1–F9 and Comparative Examples f1–f4.

In FIG. 16, the abscissa represents the surface roughness in the lateral direction of the rolling groove of rolling element formed to the guide rail and the ordinate represents the amount of preload loss after the duration test. As apparent from FIG. 16, it can be seen that the amount of preload loss is decreased extremely by setting the surface roughness in the lateral direction of the rolling groove of rolling element to 0.02 μmRa or less.

In FIG. 17, the abscissa represents the surface roughness in the longitudinal direction of the rolling groove of rolling element formed to the guide rail and the ordinate represents the amount of preload loss after the duration test. As apparent from FIG. 17, it can be seen that the preload loss can be suppressed effectively by setting the surface roughness in the longitudinal direction of the rolling groove of rolling element to 0.1 μmRa or less.

For Examples F1–F9 and Comparative Examples f3 and f4, FIG. 18 shows a relation between the degree of skew of the surface roughness of the rolling groove of rolling element and the durability. As apparent from the figure, it can be seen that the preload loss can be suppressed more effectively by setting the degree of skew (SK value) negative for the surface roughness of the rolling groove of rolling element.

From the foregoings, wear of the guide rail formed of ceramics and the rolling element can be suppressed by setting the surface roughness to 0.02 μmRa or less in the lateral direction and surface roughness to 0.1 μmRa or less in the longitudinal direction of the rolling groove of rolling element. Further, wear of the guide rail formed of ceramics and the rolling element can be suppressed more effectively by setting the degree of skew (SK value) to negative.

Further, Table 14 collectively shows the silicon nitride material used in Examples G1–G4 of this invention and Comparative Examples g1–g4.

TABLE 14

| | Crystallinity (%) | Porosity (%) | Heat conductivity W/m · K | Fracture toughness MPa · $m^{0.5}$ | Specific strength × $10^7$ mm |
|---|---|---|---|---|---|
| Silicon nitride 1 | 2 | 0.2 | 20 | 5.8 | 3.2 |
| Silicon nitride 2 | 5 | 0.2 | 40 | 5.8 | 3.2 |
| Silicon nitride 3 | 10 | 0.1 | 46 | 5.6 | 2.9 |
| Silicon nitride 4 | 24 | 0.4 | 60 | 5.4 | 2.9 |
| Silicon nitride 5 | 33 | 0.2 | 72 | 5.5 | 2.6 |
| Silicon nitride 6 | 50 | 0.4 | 90 | 5.0 | 2.1 |
| Silicon nitride 7 | 50 | 1.2 | 50 | 4.8 | 1.8 |
| Silicon nitride 8 | 50 | 0.4 | 90 | 4.5 | 2.0 |

TABLE 15

| | Rail material | Planar part roughness μm, Ra |
|---|---|---|
| Example G1 | Silicon nitride 3 | 0.3 |
| Example G2 | Silicon nitride 4 | 0.3 |
| Example G3 | Silicon nitride 5 | 0.3 |
| Example G4 | Silicon nitride 6 | 0.3 |
| Comp. Example g1 | Silicon nitride 1 | 0.6 |
| Comp. Example g2 | Silicon nitride 2 | 0.6 |
| Comp. Example g3 | Silicon nitride 7 | 0.6 |
| Comp. Example g4 | Silicon nitride 8 | 0.6 |

The silicon nitride materials contain $Al_2O_3$ and $Y_2O_3$ by 10 wt % in total and are sintered at a sintering temperature of 2000° C. In this case, the cooling rate after sintering was changed at 25–150° C./hr thereby changing the rate of crystallization of the auxiliary ingredients respectively to change the heat conductivity of the material.

Examples and comparative examples as shown in FIG. 15 were prepared by using the silicon nitride described above as the rail material for the guide rail 13.

In Table 15, the guide rails 13 were constituted with silicon nitride in Examples G1–G4 respectively. The planar part roughness, the strength and the heat conductivity in each of them are within the recommended range of the invention. On the contrary, in Comparative Example g1 and Comparative Example g2, silicon nitride 1, 2 having a heat conductivity of 20 W/m·K and 40 W/m·K respectively which are out of the recommended range of the invention are used as the rail material. Further, Comparative Example g3 is an example of using, as the rail material, silicon nitride 7 having a specific strength as low as of $1.8 \times 10^7$ mm, although having the heat conductivity 50 W/m·K that can satisfy the recommended range of the invention. Further, Comparative Example g4 is an example of using, as the rail material, silicon nitride 8 with the fracture toughness value of less than 5 Mpa·m$^{0.5}$ although it can satisfy the recommended range for the heat conductivity and the bending strength. Further, the planar part roughness of the guide rail is 0.3 μm in a case of Examples G1–G4, whereas it is 0.6 μmRa in a case of Comparative Examples g1–g4.

For the Examples G1–G4 and Comparative Examples g1–g4, operation characteristics were evaluated by the linear motion testing equipment shown in FIG. 15. Further, a vibration pick-up is attached to the linear motion guiding device for each of the examples and the comparative examples, and change of the value of vibrations generated during operation can be measured by a vibration gage not illustrated.

Guide rails each of 330 mm length: 14 mm with, 8 mm thickness were used. The load weight by a tension spring was 120 N, the operation frequency was 8 Hz and the operation stroke was 90 mm. Grease in which a urea type compound was added as the viscosity improver to a synthetic hydrocarbon type base oil was used.

The life test for the linear motion guiding device was conducted by vibration increment (=final vibration value/ initial vibration value) at the instance the number of accumulated reciprocation after starting the test reached $1 \times 10^7$ cycles. Further, after the life test, a bending strength test for the guide rail was conducted and the strength of the guide rail was evaluated by loading a stress formed by multiplying a safety factor to a bending strength loaded on an actual apparatus on a portion of the guide rail with the lowest strength (recess). Further, for each of the examples and each of the comparative examples shown in Table 15, the same repetitive bending stress as described above was loaded to measure the cycles of repetition till rupture.

Figure 19:
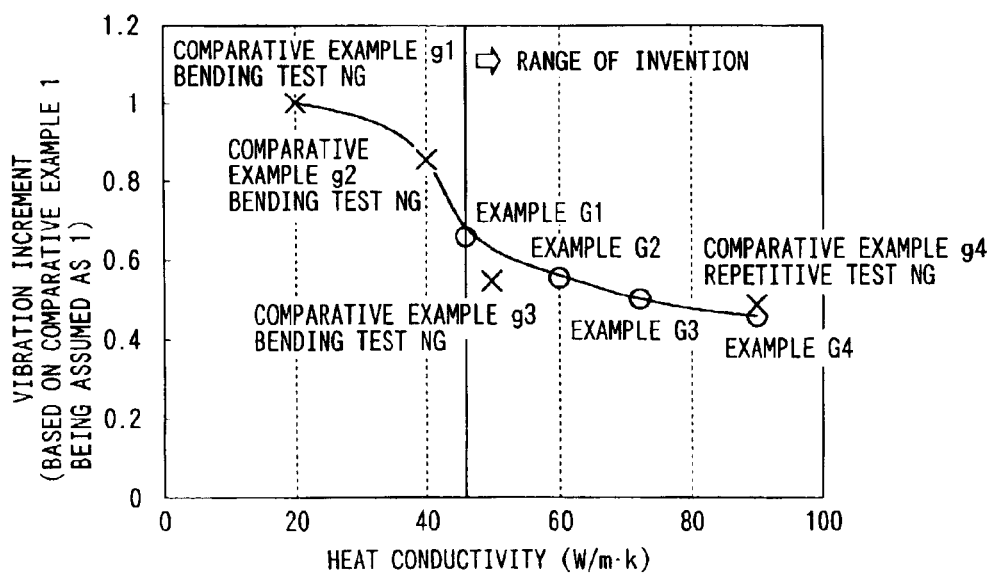
FIG. 19 is a graph showing the result of a life test for the linear motion guiding device shown in FIG. 1.

FIG. 19 shows the result for each of the examples and comparative examples shown in Table 15 which are arranged based on the heat conductivity of the material for the guide rail. In the graph, the vibration increment expressed on the ordinate is indicated as a relative value based on the value of Comparative Example g1 being assumed as 1 for easy indication of the test result. Further, the mark for the result of each evaluation is shown by "○" for those not generating cracks and "×" for those generation of cracks were observed in the bending stress test. As can be seen from FIG. 19, by forming the guide rail with silicon nitride of high heat conductivity with the heat conductivity of 46 W/m·K or more, temperature elevation on the rolling surface can be suppressed effectively, thereby restricting the degradation of the lubrication condition by the lowering of the grease viscosity to maintain a stable operation state for a long period of time. However, occurrence of cracks was observed in Comparative Example g4 since the fracture toughness value was 5 MPa·m$^{0.5}$ or less. Further, in a case of Comparative Example g3 where the specific strength of silicon nitride is $2.0 \times 10^7$ mm or less, while the temperature elevation was suppressed, the recessed part was fractured under a prescribed load and it can not be used as the material for the guide rail by the restriction in view of the strength.

Figure 20:
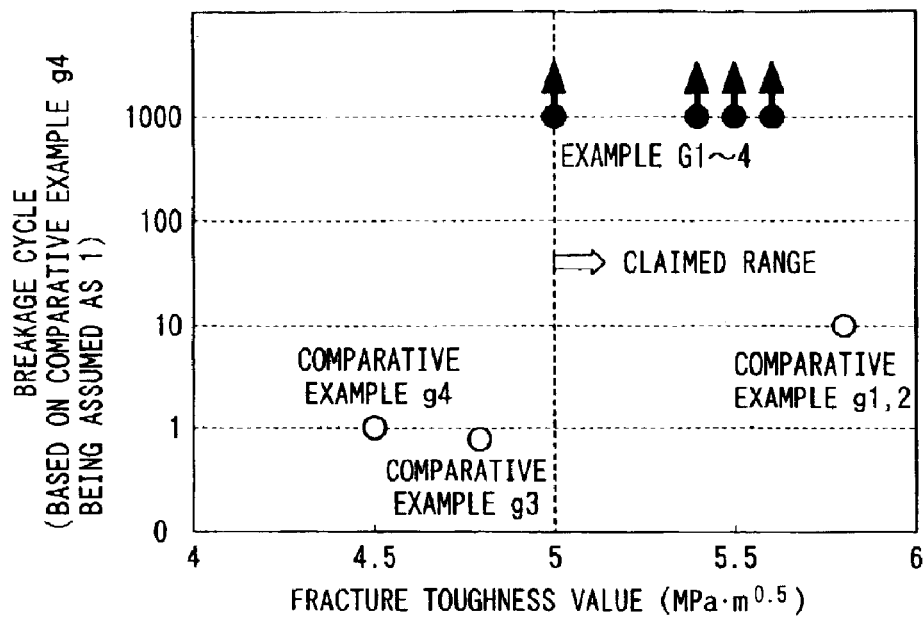
FIG. 20 is a graph showing the result of a repetitive bending stress loading test for the linear motion guiding device shown in FIG. 1.

FIG. 20 shows the result of the repetitive bending evaluation test which is arranged based on the fracture toughness value of the rail material. Comparative Example g4 in which the planar part roughness was 0.5 μm or more and the fracture toughness value was less than 5 MPa·m$^{0.5}$ although the specific strength of the rail was $2.0 \times 10^7$ mm or more was fractured in the course of test by the loading of the repetitive bending stress of the prescribed load. On the contrary, other examples in which the planar part roughness was 0.3 μm, the specific strength was $2.0 \times 10^7$ mm or more and the fracture toughness value was 5 MPa·m$^{0.5}$ or more were not fractured even under the application of cycles 100 times the rupture cycle of Comparative Example g4.

This invention is not restricted to the embodiments described above. For example, while this invention has been explained to a case of applying to a head lifting mechanism of an electronic part mounting apparatus in this embodiment, this invention is not restricted to the embodiment described above but the invention is naturally applicable, for example, also to a bonding head lifting mechanism of a wire bonding apparatus.

[Embodiment 2]

Figure 21:
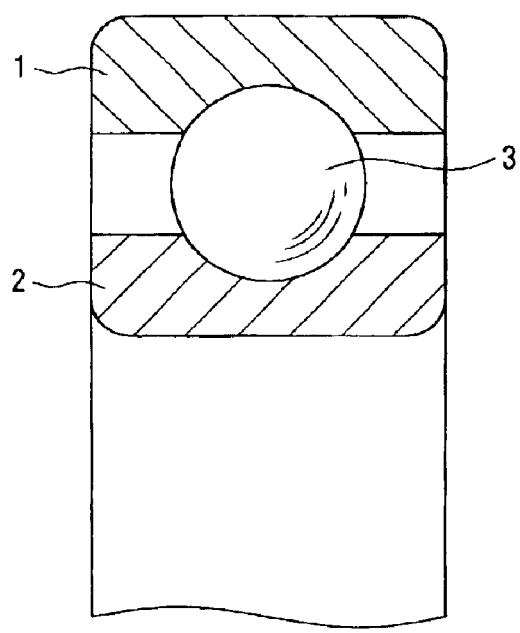
FIG. 21 is a fragmentary longitudinal cross sectional view showing the structure of a ball bearing as an embodiment of a rolling device according to this invention.

FIG. 21 is a fragmentary vertical cross sectional view showing the structure of a deep groove ball bearing as an embodiment of a rolling device according to this invention.

The ball bearing comprises an outer ring 1, an inner ring 2, a plurality of balls 3 disposed rotationally between the outer ring 1 and the inner ring 2, and a snap cage formed of resin (not illustrated) for holding a plurality of balls. In this case, the outer ring 1 corresponds to the support as a constituent factor of the invention and the inner ring 2 corresponds to the movable member as a constituent factor of the invention.

All of the outer ring 1, the inner ring 2 and the ball 3 are constituted with ceramic material, cermet or cemented carbide. The specific strength of the ceramic material, the cermets and the cemented carbide is $1.2 \times 10^7$ mm or more. Further, the thermal impact resistance value of the ceramic material, the cermet and the cemented carbide is 1.5 times or more of the working circumstantial temperature of the bearing, and the bending strength of the ceramic material, the cermet or the cemented carbide in the working circumstantial temperature is 500 MPa or more.

When the ball bearing of the embodiment described above is constituted with the ceramic material, it is light in weight, of high rigidity and excellent in corrosion resistance, wear resistance and heat resistance. Further, the centrifugal force exerting on the ball 3 upon rotation can be reduced to enable operation at higher speed, and heat generation is also lowered. Further, since the specific gravity is small, the energy for driving the ball bearing, that is, the amount of electric power used can be reduced even in a case where the rotational speed is high. Accordingly, the energy consumption can be decreased to save energy. Further, even under a high speed rotation, it has no worry of causing adhesion at the point of contact to result in seizure as in the metal material. Further, the cermet and the cemented carbide have a feature that the bending strength is relatively high, fabrication is easy and the cost is inexpensive compared wit the ceramic material.

Further, since the specific strength of the ceramic material, the cermet or the super high alloy is $1.2 \times 10^7$ or more, cracks less propagate on the surface or in the inside of the ceramic material, the cermet or the cemented carbide to cause less flaking or wear, so that the ball bearing has a long life even under operation at high speed.

Further, since the thermal impact resistance value of the ceramic material, the cermet or the cemented carbide is 1.5 times or more of the working circumstantial temperature of the ball bearing and the bending strength of the ceramic material, the cermet or the cemented carbide at the working circumstantial temperature is 500 MPa or more, even when it is used in a high temperature circumstance or in a high temperature.corrosive circumstance and heated to cause temperature gradient in the inside of the ball bearing thereby causing thermal stress by the temperature gradient, microcracks less propagate on the surface of the outer ring 1 or the inner ring 2 and wear or cracking is less caused. Accordingly, the ball bearing has a long life even in a high temperature atmosphere or high temperature.corrosive circumstance.

Then, ball bearings of substantially the same constitution as described above in which the ceramic material, the cermet or the cemented carbide constituting the outer ring, the inner ring and the ball were variously changed were provided and various types of evaluation were conducted by a rotational test.

For the ball bearings of Example H1–H24 and Comparative Examples h1–h3, ball bearings manufactured by Nippon Seiko Co. (bearing No. 6206, inner diameter 30 mm, outer diameter 62 mm, width 16 mm) were used.

The outer ring and the inner ring were constituted with the ceramic material, the cermet or the cemented carbide as shown in Table 16 and Table 17. The ball was constituted with silicon nitride (EC-141 manufactured by Nippon Tokushu Togyo Co., specific strength: $2.94 \times 10^7$ mm, thermal impact resistance value: 880° C. and bending strength: 1000 MPa) for Examples H1–H12, H18–H24 and Comparative Example h3, and they were constituted with the same kind of ceramic materials as that for the inner ring. Further, a snap cage formed of fluoric resin was used for the cage. Further, Table 16 and Table 17 also show the specific strength ([bending strength]/[density]) of the ceramic material, the cermet and the cemented carbide collectively.

TABLE 16

| | Inner ring | | | Outer ring | | Limit | |
|---|---|---|---|---|---|---|---|
| | Material | 1) Specific strength | Bending strength | Material | 1) Specific strength | Bending strength | rotational speed | Durability |
| Example H1 | Silicon nitride series 1 h | 2.9 | 980 | Silicon nitride series 1 h | 2.9 | 980 | 12 | 17 |
| Example H2 | Silicon nitride series 2 h | 3.9 | 1300 | Silicon nitride series 2 h | 3.9 | 1300 | 14 | 20 |
| Example H3 | Silicon nitride series 3 h | 3.1 | 980 | Silicon nitride series 3 h | 3.1 | 980 | 13 | 18 |
| Example H4 | Silicon nitride series 4 h | 3.6 | 1180 | Silicon nitride series 4 h | 3.6 | 1180 | 14 | 19 |
| Example H5 | Zirconia series 1 h | 3.6 | 1960 | Zirconia series 1 h | 3.6 | 1960 | 13 | 18 |
| Example H6 | Zirconia series 2 h | 2.9 | 1800 | Zirconia series 2 h | 2.9 | 1800 | 12 | 16 |
| Example H7 | Zirconia series 3 h | 1.7 | 1700 | Zirconia series 3 h | 1.7 | 1700 | 7 | 12 |
| Example H8 | Zirconia series 4 h | 1.4 | 784 | Zirconia series 4 h | 1.4 | 784 | 6 | 10 |
| Example H9 | Silicon carbonate 1 h | 1.8 | 560 | Silicon carbide series 1 h | 1.8 | 560 | 7 | 9 |
| Example H10 | Alumina series 1 h | 2.5 | 1180 | Alumina series 1 h | 2.5 | 1180 | 8 | 12 |
| Example H11 | Alumina series 2 h | 1.9 | 835 | Alumina series 2 h | 1.9 | 835 | 6 | 8 |
| Example H12 | Silicon nitride series 2 h | 3.9 | 1300 | Silicon nitride series 1 h | 2.9 | 980 | 13 | 18 |
| Example H13 | Silicon nitride series 2 h | 3.9 | 1300 | Zirconia series 3 h | 1.7 | 1700 | 12 | 16 |
| Example H14 | Silicon nitride series 1 h | 2.9 | 980 | Alumina 1 h | 2.5 | 1180 | 10 | 14 |

1) $\times 10^7$ mm
2) unit: MPa

TABLE 17

|  | Inner ring | | | Outer ring | | | Limit | |
|---|---|---|---|---|---|---|---|---|
|  | Material | 1) Specific strength | Bending strength | Material | 1) Specific strength | Bending strength | rotational speed | Durability |
| Example H15 | Zirconia series 1 h | 3.6 | 1960 | Silicon nitride series 1 h | 2.9 | 980 | 12 | 17 |
| Example H16 | Zirconia series 2 h | 2.9 | 1800 | Alumina series 2 h | 1.9 | 835 | 9 | 11 |
| Example H17 | Alumina series 1 h | 2.5 | 1180 | Silicon Carbide 1 h | 1.8 | 560 | 8 | 10 |
| Example H18 | Cemented carbide 1 h | 1.77 | 1800 | Cemented carbide 1 h | 1.77 | 1800 | 3 | 4 |
| Example H19 | Cemented carbide 2 h | 1.78 | 2400 | Cemented carbide 2 h | 1.78 | 2400 | 3.5 | 4.5 |
| Example H20 | Cemented carbide 4 h | 1.95 | 2500 | Cemented carbide 4 h | 1.95 | 2500 | 4 | 5 |
| Example H21 | Cermet 1 h | 2.73 | 1800 | Cermet 1 h | 2.73 | 1800 | 8.5 | 11 |
| Example H22 | Cermet 2 h | 2.46 | 1600 | Cermet 2 h | 2.46 | 1600 | 8 | 10 |
| Example H23 | Cermet 3 h | 2.23 | 2000 | Cermet 3 h | 2.23 | 2000 | 6.5 | 7 |
| Example H24 | Cermet 4 h | 2.55 | 2350 | Cermet 4 h | 2.55 | 2350 | 7 | 8 |
| Comp. Example h1 | Alumina series 3 h | 1.0 | 400 | Alumina series 3 h | 1.0 | 400 | 1 | 1 |
| Comp. Example h1 | Alumina series 4 h | 0.8 | 320 | Alumina series 4 h | 0.8 | 320 | 0.5 | 0.3 |
| Comp. Example h1 | Cemented carbide 3 h | 0.68 | 1000 | Cemented carbide 3 h | 0.68 | 1000 | 0.3 | 0.2 |

1) ×10$^7$ mm
2) unit: MPa

The ceramic material, the cermet and the cemented carbide used are as shown below.

Silicon nitride series 1h (NBD 200, manufactured by Sangoban Norton Co., specific strength: 2.9×10$^7$, bending strength: 980 MPa Silicon nitride series 2h (NPN-3, manufactured by Nippon Tungsten Co., specific strength: 3.9×10$^7$, bending strength: 1300 MPa, Silicon nitride series 3h (SN 733, manufactured by Kyocera Corp., specific strength: 3.1×10$^7$ bending strength: 980 MPa, Silicon nitride series 4h (SL10H, manufactured by Shin Nippon Seitetsu Co., specific.strength: 3.6×10$^7$, bending strength: 1180 MPa.

Zirconia series 1h: Z 703 manufactured by Kyocera Corp., specific strength 3.6×10$^7$, bending strength, 1960 MPa, Zirconia series 2h: NPZ-1, manufactured by Nippon Tungsten Co., specific strength 2.9×10$^7$, bending strength, 1800 MPa.

Zirconia series 3h: NPZ-3, manufactured by Nippon Tungsten Co., specific strength 1.7×10$^7$, bending strength, 1700 MPa.

Zirconia series 4h: Z21H0, manufactured by Kyocera Corp., specific strength 1.4×10$^7$, bending strength, 784 MPa.

Silicon carbide series 1h: NPS-1, manufactured by Nippon tungsten Co., specific strength 1.8×10$^7$, bending strength, 560 MPa.

Alumina series 1h: AZ-93, manufactured by Sangoban Norton specific strength 2.5×10$^7$, bending strength, 1180 MPa.

Alumina series 2h: NPA-2, manufactured by Nippon Tungsten Co., specific strength 1.9×10$^7$, bending strength, 835 MPa.

Alumina series 3: A-601D, manufactured by Kyocera Corp., specific strength 1.9×10$^7$, bending strength, 400 MPa.

Alumina series 4h: A1–16, manufactured by Toshiba Co., specific strength 0.8×10$^7$, bending strength, 320 MPa.

Cemented carbide 1h: WC—Co. series G3, manufactured by Nippon Tungsten Co. specific strength 1.77×10$^7$, thermal impact resistance value 800° C., bending strength, 1800 MPa.

Cemented carbide 2h: WC—Ni—Cr—Mo series, NR 11, manufactured by Nippon Tungsten Co. specific strength 1.78×10$^7$, thermal impact resistance value 700° C., bending strength, 2400 MPa.

Cemented carbide 3h: WC—TiC—TaC series, RCCL, manufactured by Nippon Tungsten Co. specific strength 0.68×10$^7$, thermal impact resistance value 550° C., bending strength, 1000 MPa.

Cemented carbide 4h: WC—Ni—Cr series, M-61U, manufactured by Sumitomo Electric Industry Co., specific strength 1.95×10$^7$, thermal impact resistance value 500° C., bending strength, 2500 MPa.

Cermet 1h: TiC—TaN—Ni—Mo series DUX 40, manufactured by Nippon Tungsten Co., specific strength 2.73×10$^7$, thermal impact resistance value 550° C., bending strength, 1800 MPa.

Cermet 2h: TiC—TaN—Ni—Mo series DUX 30, manufactured by Nippon Tungsten Co. specific strength $2.46\times10^7$, thermal impact resistance value 550° C., bending strength, 1600 MPa.

Cermet 3h: Boride series UD-II-35T, manufactured by Asahi Glass Co., specific strength $2.23\times10^7$, thermal impact resistance value 800° C., bending strength, 2000 MPa.

Cermet 4h: Boride series UD-II-50T, manufactured by Asahi Glass Co., specific strength $2.55\times10^7$, thermal impact resistance value 1000° C., bending strength, 2350 MPa.

Then, the content of evaluation and the condition for the rotational test are explained.

At first, high speed rotational performance is to be described below. The ball bearing was attached to a bearing rotation testing equipment manufactured by Nippon Seiko Co. and rotated at a rotational speed of 1000 min$^{-1}$ (inner ring rotated) at a initial radial load of 490N at a normal temperature in water. Then, the rotational speed was increased each by 1000 min$^{-1}$ on every 1 hour and the rotational speed at the instance the vibration value increased abruptly was defined as the limit rotational speed, to evaluate the high speed rotational performance. The results are collectively shown in Table 16 and Table 17. The limit rotational speed of the ball bearing in each of the examples and the comparative examples is indicated as a relative value based on the limit rotational speed of Comparative Example h1 being assumed as 1.

Then, durability (life) is to be described.

The ball bearing was attached to the same bearing rotation testing equipment manufactured by Nippon Seiko Co. as described above and rotated at a rotational speed of 10,000 min 10$^{-1}$ (inner ring rotated) under a radial load of 490 N, at a normal temperature in water. Then, the instance the vibration value increased three times the initial value was defined as the life of the ball bearing. The results are collectively shown in Table 16 and Table 17. The durability (life) of the ball bearing in each of the examples is indicated as a relative value based on the durability (life) of Comparative Example 1h being assumed as 1.

Examples H1–H12, H18–H24 are ball bearings in which an outer ring and an inner ring are constituted with an identical kind of ceramic material, cermet or cemented carbide. Then, Examples H13–H17 are ball bearings in which an outer ring and an inner ring are constituted with different kinds of ceramic materials (that is, of different specific strength), and the specific strength of the ceramic material constituting the inner ring as the movable member is made larger than the specific strength of the ceramic material constituting the outer ring as the support.

It can be seen from Table 16 and Table 17 that since the inner ring, the outer ring and the ball of the ball bearings in Examples H1–H24 are constituted with ceramic material, cermet or cemented carbide with a specific strength of $1.2\times10^7$ or more, they are excellent in the limit rotational speed and the durability (excellent in high speed rotation performance and having long life) compared with the ball bearings of Comparative Examples h1–h3 in which the inner ring, the outer ring and the ball are constituted with a ceramic material, cermet or cemented carbide with the specific strength of less than $1.2\times10^7$ mm. Further, it can be seen that as the specific strength is higher, the limit rotational speed and the durability of the ball bearing tend to be more excellent.

Figure 22:
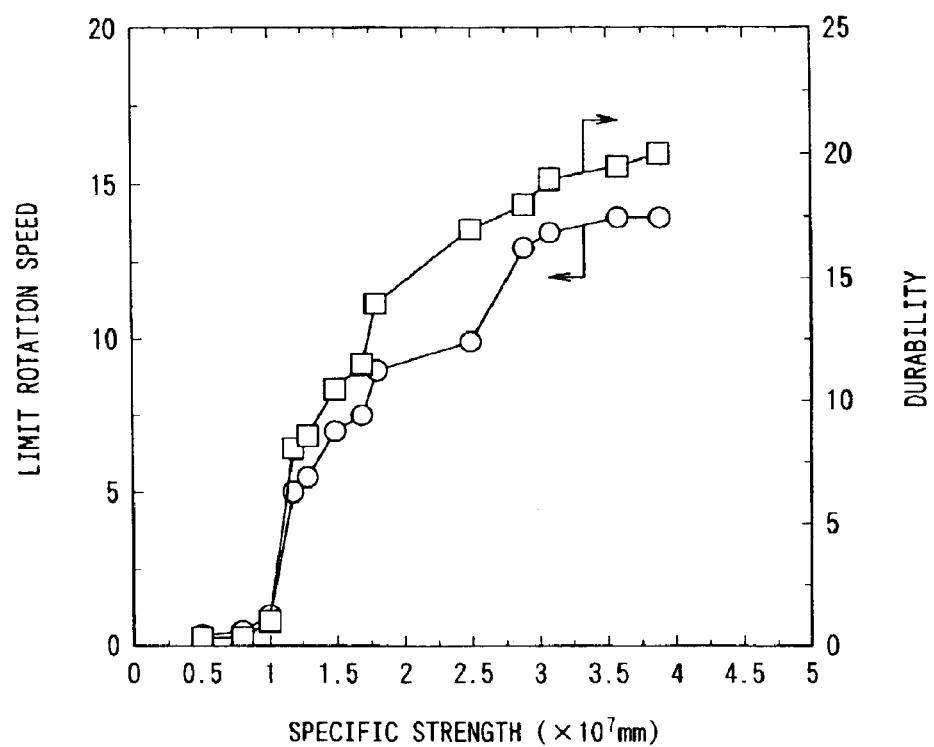
FIG. 22 is a graph showing a correlation between the specific strength of a ceramic material, and a limit rotational speed and durability of a ball bearing.

Further, FIG. 22 shows, in graphic form, the result of evaluation for a portion of the result shown in Table 16 and other ball bearings (ball bearings in which outer ring and inner ring are constituted with an identical kind of ceramic material) collectively. In FIG. 22, the abscissa of FIG. 2 expresses the specific strength of the ceramic material, the ordinate on the left expresses the limit rotational speed and the ordinate on the right indicates the durability. Further, in FIG. 22, data relevant to the limit rotational speed is expresses by symbol "○" and data relevant to the durability is indicated by symbol "□".

As can be seen from the graph in FIG. 22, when the specific strength is $1.2\times10^7$ mm or more, the ball bearing is provided with excellent limit rotational speed and durability. Further, when it is $1.5\times10^7$ mm or more, excellent limit rotational speed and the durability of the ball bearing are made more reliable and, when it is $1.8\times10^7$ mm or more, the limit rotational speed and the durability of the ball bearing are further excellent.

Then, the result for the evaluation of the high temperature durability of the ball bearing having substantially the same constitution as described above is to be described. The ball bearing used for the test (Examples H25–H40 and comparative examples h4–h7) are ball bearings manufactured by Nippon Seiko Co. (bearing No. 1206, inner diameter 30 mm, outer diameter 62 mm, width 6 mm), in which the ceramic material, the cermet and the cemented carbide constituting the outer ring, the inner ring and the ball were changed variously as shown in Table 18 and Table 19.

Further, the ball was constituted with silicon nitride (EC-141, manufactured by Nippon Tokushu Togyo Co.) and a ribbon cage formed of SUS 304 was used for the cage. Further, Table 18 and Table 19 show the ratio of the thermal impact resistance values of the ceramic material, the cermet and the cemented carbide and the working circumstantial temperature (200° C.) of ball bearings (value of [thermal impact resistance value of ceramic material, cermet or cemented carbide]/[working circumstantial temperature of ball bearing]), the specific strength and the bending strength (MPa) in the working circumstantial temperature (200° C.).

TABLE 18

|  | Inner ring | | Outer ring | | Specific strength ($\times10^7$ mm) | Bending strength (MPa) | High temperature durability | |
|---|---|---|---|---|---|---|---|---|
|  | Material | ΔT/T *) | Material | ΔT/T *) |  |  | 200° C. | 300° C. |
| Example H25 | Silicon nitride series 2 h | 4.0 | Silicon nitride series 2 h | 4.0 | 3.93 | 1300 | 25 | 40 |

TABLE 18-continued

|  | Inner ring | | Outer ring | | Specific strength | Bending strength | High temperature durability | |
|---|---|---|---|---|---|---|---|---|
|  | Material | Δ T/T *) | Material | Δ T/T *) | (×10⁷ mm) | (MPa) | 200° C. | 300° C. |
| Example H26 | Silicon nitride series 5 h | 3.25 | Silicon nitride series 5 h | 3.25 | 3.34 | 1080 | 20 | 30 |
| Example H27 | Zirconia series 6 h | 1.5 | Zirconia series 6 h | 1.5 | 2.13 | 1800 | 8 | 2.7 |
| Example H28 | Zirconia series 7 h | 1.75 | Zirconia series 7 h | 1.75 | 3.33 | 1800 | 15 | 3.2 |
| Example H29 | Alumina series 5 h | 1.5 | Alumina series 5 h | 1.5 | 1.86 | 800 | 6 | 2.5 |
| Example H30 | Silicon nitride series 1 h | 3.0 | Silicon nitride series 1 h | 3.0 | 1.81 | 560 | 10 | 10 |
| Example H31 | Silicon nitride series 1 h | 3.0 | Silicon nitride series 2 h | 4.0 | — | — | 20 | 20 |
| Example H32 | Silicon nitride series 2 h | 1.75 | Silicon nitride series 2 h | 1.75 | 1.81 | 500 | 5 | 1.5 |
| Comparative Example h4 | Alumina series 4 h | 1.15 | Alumina series 4 h | 1.15 | 0.84 | 320 | 1 | 1 |
| Comparative Example h5 | Alumina series 6 h | 0.8 | Alumina series 6 h | 0.8 | 1.28 | 500 | 0.5 | 0.2 |

*) Δ T/T: [Thermal impact resistant value of material (° C.)]/[Working circumstantial temperature for ball bearing (° C.)]

TABLE 19

|  | Inner ring | | Outer ring | | Specific strength | Bending strength | High temperature durability | |
|---|---|---|---|---|---|---|---|---|
|  | Material | Δ T/T *) | Material | Δ T/T *) | (×10⁷ mm) | (MPa) | 200° C. | 300° C. |
| Example H33 | Cemented carbide 1 h | 4.0 | Cemented carbide 1 h | 4.0 | 1.77 | 1800 | 20 | 22 |
| Example H34 | Cemented carbide 2 h | 3.5 | Cemented carbide 2 h | 3.5 | 1.78 | 2400 | 18 | 16 |
| Example H35 | Cemented carbide 3 h | 2.75 | Silicon nitride 2 h | 4.0 | — | — | 14 | 16 |
| Example H36 | Cemented carbide 4 h | 2.5 | Cermet 4 h | 5.0 | — | — | 13 | 15 |
| Example H37 | Cermet 1 h | 2.75 | Cemented carbide 2 h | 3.5 | — | — | 15 | 14 |
| Example H38 | Cermet 2 h | 2.75 | Cermet 2 h | 2.75 | 2.46 | 1600 | 17 | 15 |
| Example H39 | Cermet 3 h | 4.0 | Silicon nitride 2 h | 4.0 | — | — | 27 | 42 |
| Example H40 | Cermet 4 h | 5.0 | Cermet 4 h | 5.0 | 2.55 | 2350 | 30 | 45 |
| Comp. Example h6 | Cemented carbide 4 h | 2.5 | Alumina series 4 h | 1.15 | — | — | 1.5 | 1.3 |
| Comp. Example h7 | Cermet 2 h | 2.75 | Alumina series 6 h | 0.8 | — | — | 0.9 | 0.7 |

*) Δ T/T: [Thermal impact resistant value of material (° C.)]/[Working circumstantial temperature for ball bearing (° C.)]

The ceramic materials used are as shown below.

Silicon nitride series 2h: NPN-3, manufactured by Nippon Tungsten Co., thermal impact resistance value 800° C., (4.0), bending strength 1300 MPa, specific strength $3.93 \times 10^7$ mm Silicon nitride series 5h: SAN-p, manufactured by Shinagawa Shirorenga Co. thermal impact resistance value 650° C., (3.25), bending strength 1080 MPa, specific strength $3.34 \times 10^7$ mm Zirconia series 6h: UTZ 33H, manufactured by Nippon Gaishi Co., thermal impact resistance value 300° C. (1.5), bending strength 1800 Mpa, specific strength $2.13 \times 10^7$ mm.

Zirconia series 7h: NPZ-5, manufactured by Nippon Tungsten Co., thermal impact resistance value 350° C. (1.75), bending strength 1800 Mpa, specific strength $3.33 \times 10^7$ mm.

Alumina series 4h: A1–16, manufactured by Toshiba Co., thermal impact resistance value 230° C. (1.15), bending strength 320 MPa, specific strength $0.84 \times 10^7$ mm.

Alumina series 5h: HC-2, manufactured by Nippon Tokushu Togyo Co., thermal impact resistance value 300° C. (1.5), bending strength 800 MPa, specific strength $1.86 \times 10^7$ mm.

Alumina series 6h: KP-990, manufactured by Nippon Tokushu Togyo Co., thermal impact resistance value 160° C. (0.8), bending strength 500 MPa, specific strength 1.28×10⁷ mm.

Silicon carbide series 1h: NPS-1, manufactured by Nippon Tungsten Co., thermal impact resistance value 600° C. (3.0), bending strength 560 MPa, specific strength 1.81×10⁷ mm.

Silicon carbide series 2h: TSC-1, manufactured by Toshiba Co., thermal impact resistance value 350° C. (1.75), bending strength 500 MPa, specific strength 1.81×10⁷ mm.

Numerical value in each of blankets after the thermal impact resistance values described above is a ratio between the thermal impact resistance value for each of the ceramic materials and the working circumstantial temperature (200° C.) of the ball bearing (value of [thermal impact resistance value of ceramic material]/[working circumstantial temperature of ball bearing]). Further, the bending strength and the specific strength are bending strength and specific strength at 200° C. which is the working circumstantial temperature of the ball bearing.

For the cermet and the cemented carbide, those described previously were used.

Then, the test method and the test condition for the high temperature durability are to be explained.

Ball bearings were attached to a ball bearing rotational test equipment manufactured by Nippon Seiko Co. and rotated without lubrication at a rotational speed of 1,000 min⁻¹ under a radial load of 980 N, at a high temperature in atmospheric air (inner ring rotated). The ball bearings were heated by a heater wound around a housing containing the outer ring and the test was started from the instance that the outer diametrical surface of the outer ring reached a predetermined temperature. Then, the instance that the vibration value during rotation increased abruptly was judged as life to evaluate the high temperature durability. The results are collectively shown in Table 18 and Table 19. Further, the high temperature durability (life) of the ball bearings in each of the examples and the comparative examples is indicated as a relative value based on the high temperature durability (life) of Comparative Example h4 at each temperature being assumed as 1.

As can be seen from Table 18 and Table 19, the ball bearings of Examples H25–H40 were excellent in the high temperature durability (life) compared with the ball bearings of Comparative Examples h4–h7 either at 200° C. or 300° C. of heating temperature. The numerical value for the high temperature durability at 200° C. is sometimes smaller than the numerical value for the high temperature durability at 300° C. as in Example H25, but this does not means that the high temperature durability at 200° C. is inferior to the high temperature durability at 300° C. This is always a relative value to Comparative Example h4.

Figure 23:
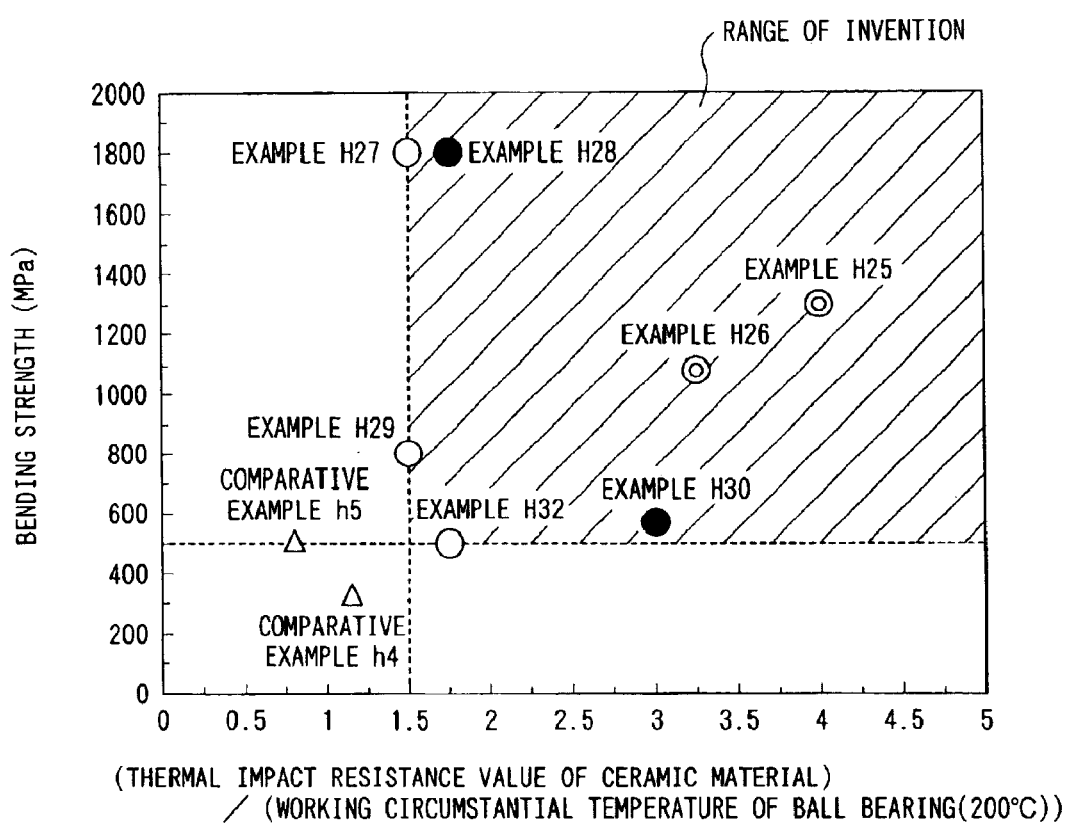
FIG. 23 is a view showing a relation between the thermal impact resistance value and the bending strength of ceramic materials at 200° C. and the high temperature durability of the ball bearings.

FIG. 23 is a view showing the result in a case where the heating temperature in Table 18 is 200° C. collectively, which shows a relation for the value of [thermal impact resistance value of ceramic material]/[working circumstantial temperature of ball bearing (200° C.)] and the bending strength at 200° C. which is the working circumstantial temperature of the ball bearing, and the high temperature durability (life) of the ball bearing for each of the ceramic materials.

Among the plots in FIG. 23, symbol "Δ" shows the case in which the high temperature durability (life) described above is less than 5. Further, symbol "○" shows a case where it is 5 or more and less than 10, symbol "●" shows a case where it is 10 or more and less than 20, and symbol "◎" shows a case where it is 20 or more, respectively.

Also in view of FIG. 23, it can be seen that the ball bearings in Examples H25–H32 are excellent in the high temperature durability (life) compared with the ball bearings of Comparative Examples h4, h5.

Then, description is to be made for a deep groove ball bearing as an another embodiment of a rolling device according to this invention. All of the outer ring, the inner ring and the ball are constituted with the ceramic material, the cermet or the cemented carbide in the ball bearing, which is used suitably in a high temperature circumstance in contact with a molten metal. The ceramic material, the cermet or the cemented carbide has a thermal impact resistance value of 1.5 times or more the temperature of the molten metal, a bending strength at the temperature of the molten metal of 800 MPa or more and a specific strength of 1.2×10⁷ mm or more. Since other constitutions are identical with those of the ball bearing described above (shown in FIG. 21), description therefor is to be omitted.

In the ball bearing of this embodiment described above, since the thermal impact resistance value of the ceramic material, the cermet or the cemented carbide is 1.5 times or more the temperature of the molten metal, even when thermal stresses formed by heating upon immersion into the molten metal or cooled upon recovery from the molten metal, micro-cracks less propagate on the surface of the outer ring or the inner ring as the constituent number of ball bearing. Accordingly, it less occurs that an abrasion powder is formed in a great amount or cracks penetrate through the outer ring or the inner ring to cause breakage.

Further, since the bending strength of the ceramic material, the cermet or the cemented carbide at the temperature of the molten metal is 800 MPa or more, even when a relatively high contact stress of 1 to 2.5 GPa is loaded repetitively between the outer ring and the inner ring, and the ball during use of the ball bearing, micro-cracks are less formed on the surface to suppress deterioration of the life.

Accordingly, the ball bearing of this embodiment has a long life even when it is used in a high temperature circumstance in contact with the molten metal. Accordingly, it is used suitably, for example, to a molten metal plating apparatus.

Then, the result of evaluation for the high temperature durability on the ball bearing having substantially the same constitution as described above is to be explained. The ball bearing used for the test (Examples H41–H51 and comparative Examples h8–h15) are ball bearings manufactured by Nippon Seiko Co. (bearing No. 6206, inner diameter 30 mm, outer diameter 62 mm, width 16 mm) in which the ceramic material, the cermet or the cemented carbide constituting the outer ring, the inner ring and the ball were changed variously as shown in Table 20 and Table 21.

Further, the ball was constituted with silicon carbide (EC-141 manufactured by Nippon Tokushu Togyo Co.) and a machined cage formed of Ta was used for the cage. Further, Table 20 and Table 21 show the ratio between the thermal impact resistance value and the molten metal temperature (460° C.) of the ceramic material, the cermet or the cemented carbide (value of [thermal impact resistance value of ceramic material, cermet or cemented carbide]/[molten metal temperature]), and the specific strength (×10⁷ mm) and the bending strength (MPa) at the molten metal temperature (460° C.) collectively.

TABLE 20

| | Inner · outer ring | | | Specific | High |
|---|---|---|---|---|---|
| Material | | 1) ΔT/T | 2) Bending strength | strength (×10⁷ mm) | temperature durability |
| Example H41 | Silicon nitride series 2 h | 1.7 | 1390 | 3.93 | 35 |
| Example H42 | Silicon nitride series 6 h | 1.6 | 870 | 3.6 | 10 |
| Example H43 | Silicon nitride series 7 h | 1.5 | 870 | 2.75 | 9 |
| Example H44 | Silicon nitride series 8 h | 1.9 | 990 | 2.94 | 30 |
| Example H45 | Silicon nitride series 9 h | 1.7 | 800 | 2.66 | 7 |
| Example H46 | Silicon nitride series 10 h | 2.2 | 1140 | 3.59 | 33 |
| Example H47 | Silicon nitride series 11 h | 2.2 | 850 | 2.69 | 15 |
| Comp. Example h8 | Silicon nitride series 12 h | 1.3 | 690 | 2.19 | 1 |
| Comp. Example h9 | Silicon nitride series 13 h | 1.7 | 790 | 2.42 | 3 |
| Comp. Example h10 | Silicon nitride series 14 h | 1.5 | 790 | 2.56 | 2 |
| Comp. Example h11 | Zirconia series 7 h | 0.8 | 1790 | 3.33 | 0.5 |
| Comp. Example h12 | Zirconia series 8 h | 0.7 | 1290 | 2.13 | 0.3 |
| Comp. Example h13 | Zirconia series 5 h | 0.7 | 790 | 1.86 | 0.1 |

1) Δ T/T: [Thermal impact resistance value of ceramic material (° C.)]/[Molten metal temperature (° C.)]
2) Unit: Mpa

TABLE 21

| | Inner ring · outer ring | | | Specific | High |
|---|---|---|---|---|---|
| Material | | 1) ΔT/T | 2) Bending strength | strength (×10⁷ mm) | temperature durabiliby |
| Example H48 | Cemented carbide 1 h | 1.74 | 1800 | 1.77 | 20 |
| Example H49 | Cemented carbide 2 h | 1.52 | 2400 | 1.78 | 5 |
| Example H50 | Cermet 3 h | 1.74 | 2000 | 2.23 | 7 |
| Example H51 | Cermet 4 h | 2.17 | 2350 | 2.55 | 28 |
| Comp. Example h14 | Cemented carbide 4 h | 1.09 | 1000 | 1.95 | 0.6 |
| Comp. Example h15 | Cermet 1 h | 1.20 | 1800 | 2.73 | 0.9 |

1) Δ T/T: [Thermal impact resistance value of material (° C.)]/[Molten metal temperature (° C.)]
2) unit: Mpa The ceramic materials used are as shown below.

Silicon nitride series 2h: NPN-3, manufactured by Nippon tungsten Co., thermal impact resistance value 800° C. (1.7), bending strength 1300 MPa, specific strength 3.93×10⁷ mm.

Silicon nitride series 6h: S-110. manufactured by Shin Nittetsu Sialon Co., thermal impact resistance value 750° C. (1.6), bending strength 870 MPa, specific strength 3.6×10⁷ mm.

Silicon nitride series 7h: MSN-110, manufactured by Mitsui Mining material Co., thermal impact resistance value 700° C. (1.5), bending strength 870 MPa, specific strength 2.75×10⁷ mm.

Silicon nitride series 8h: EC-141 manufactured by Nippon Tokushu Togyo Co., thermal impact resistance value 880° C. (1.9), bending strength 990 MPa, specific strength 2.94×10⁷ mm.

Silicon nitride series 9h: SN-55 manufactured by Nippon Gaishi Co., thermal impact resistance value 800° C. (1.7), bending strength 800 MPa, specific strength 2.66×10⁷ mm.

Silicon nitride series 10h: SN-73 manufactured by Nippon Gaishi Co., thermal impact resistance value 1000° C. (2.2), bending strength 1140 MPa, specific strength 3.59×10⁷ mm.

Silicon nitride series 11h: SN-84 manufactured by Nippon Gaishi Co., thermal impact resistance value 1000° C. (2.2), bending strength 850 MPa, specific strength 2.69×10⁷ mm.

Silicon nitride series 12h: TSN-05, manufactured by Toshiba Co., thermal impact resistance value 600° C. (1.3), bending strength 690 MPa, specific strength 2.19×10⁷ mm.

Silicon nitride series 13h: SRBSN, manufactured by Kimura Taika Co., thermal impact resistance value 800° C. (1.7), bending strength 790 MPa, specific strength 2.42×10⁷ mm.

Silicon nitride series 14h: SSN manufactured by Kimura Taoka Co., thermal impact resistance value 700° C. (1.5), bending strength 790 MPa, specific strength 2.56×10⁷ mm.

Zirconia series 7h: NPZ-5, manufactured by Nippon Tungsten Co. thermal impact resistance value 350° C. (0.8), bending strength 1790 MPa, specific strength 3.33×10⁷ mm.

Zirconia series 8h: UTZ33H, manufactured by Nippon Tokushu Togyo Co. thermal impact resistance value 300° C. (0.7), bending strength 1290 MPa, specific strength 2.13×10⁷ mm.

Alumina series 5h: HC2, manufactured by Nippon Tokushu Togyo Co. thermal impact resistance value 300° C. (0.7), bending strength 790 MPa, specific strength 1.86×10⁷.

Numerical value in each of the blankets after the thermal impact resistance values described above shows the ratio between the thermal impact resistance value for each of the ceramic materials and the molten metal temperature (460° C.) (value of [thermal impact resistance value of ceramic material]/[molten metal temperature]). Further, the bending strength and the specific strength are bending strength and specific strength at 460° C. which is the molten metal temperature.

Further, for the cermet and the cemented carbide, those described above were used.

Then, the test conditions for the high temperature durability are to be described.

Ball bearings were attached to a bearing rotation testing equipment manufactured by Nippon Seiko Co. at a room temperature and the ball bearings were immersed in a molten metal bath at 460° C. Then, in a state immersed in the molten zinc bath, they were rotated under the conditions at an axial load of 980N and at a rotational speed of 200 $min^{-1}$ (inner ring rotated). Then, the rotation time of the ball bearing till the rotational torque increased to three times the initial value was defined as a life to evaluate the high temperature durability. The ingredient of the molten metal zinc bath comprises 0.1 to 5% of Al, 0.1% or less of Fe, 0.1% or less of Pd and the balance of Zn.

The results of evaluation are collectively shown in Table 20 and Table 21. The high temperature durability (life) of the ball bearing in each of the examples and the comparative examples is indicated as a relative value based on the high temperature durability (life) of Comparative Example h8 being assumed as 1.

Figure 24:
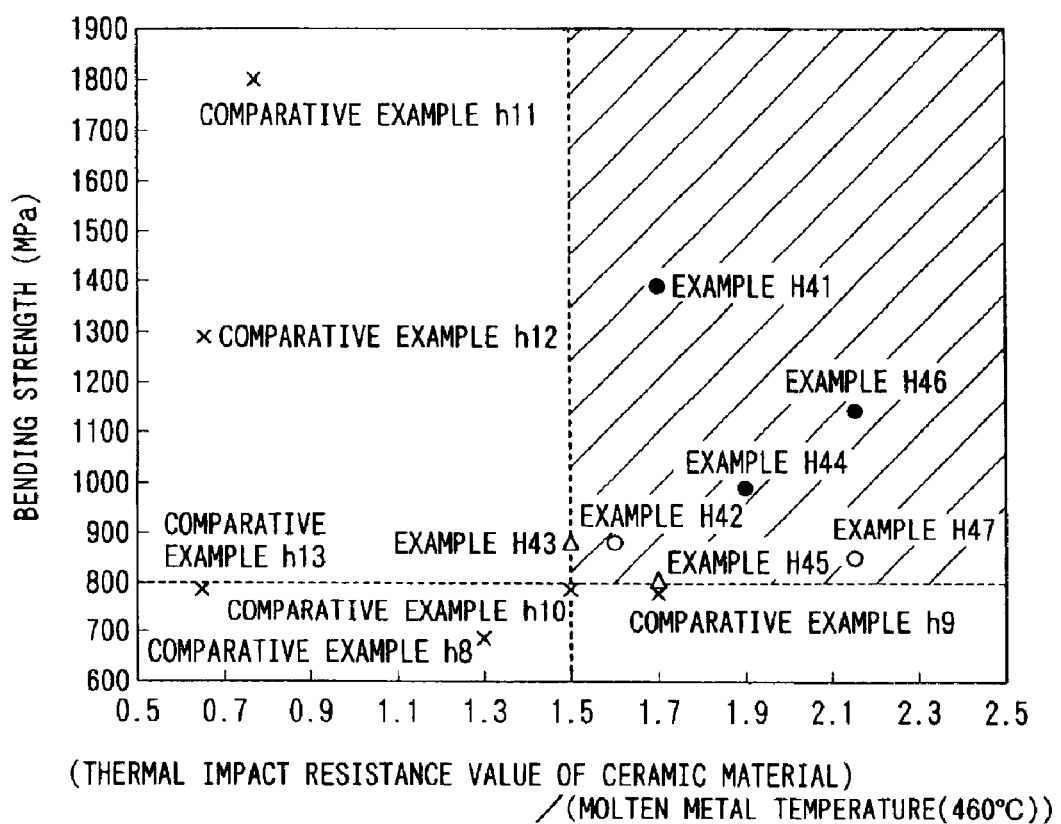
FIG. 24 is a view showing a relation between the thermal impact resistance value and the bending strength of ceramic materials at 460° C. and the high temperature durability of the ball bearings.

Further, FIG. 24 shows the results of Table 22 in a graphic form. The graph of FIG. 24 shows a relation for the value of [thermal impact resistance value of ceramic material]/ [molten metal temperature (460° C.)] and the bending strength at a molten metal temperature (460° C.) which is the working circumferential temperature of the ball bearing, and the high temperature durability (life) of the ball bearing for each of the ceramic materials.

Among the plots in FIG. 24, a symbol "●" shows a case where the life (the relative value) is 20 or more, a symbol "○" shows a case where it is 10 or more and less than 20. Further, a symbol "Δ" shows a case where it is 5 or more and less than 10 and symbol "×" shows a case where it is less than 5.

From Table 20, Table 21 and Table 24, it can be seen that since the ball bearings of Examples H41–H51 have the value for [thermal impact resistance value of ceramic material, cermet or cemented carbide]/[molten metal temperature] of 1.5 or more and the bending strength of the ceramic material, the cermet or the cemented carbide at a temperature of molten metal (460° C.) of 800 MPa or more and the specific strength of $1.2 \times 10^7$ or more, they are excellent in the high temperature durability (life) in a case of using being immersed in a molten metal bath, compared with the ball bearings in Comparative Examples h8–h15.

Further, the boride series cermet which is a hard alloy having excellent hardness and strength up to high temperature can be obtained, for example, by the following method. A powder of (MoB, WB) and Ni which are starting material for constituting the hard phase and a powder selected from Ni, (W, Ni)—Ti alloy, Ni—Ti alloy, (Cr, Ni)—Ta alloy, Ni—Nb alloy and carbon which is a starting material constituting the binding phase were weighed and then mixed and pulverized in a wet process by a rotational ball mill or a vibrational ball mill using an organic solvent such as ethanol as a medium. After drying the obtained slurry under a reduced pressure, it was press molded by using a mold press or hydrostatic press and sintered usually at 1100–1400 ° C. in a non-oxidative atmosphere such as in vacuum. The MoB—Ni series hard alloy described above includes, for example, UD-11-30, UD-11T-35 T, UD-11-50-T, etc. which are the name of products manufactured by Asahi Glass Co.

For evaluating the sliding property of the boride series cermet described above, the wear amount was investigated using a four-ball type wear testing equipment.

At first, the method of four-ball type wear test is to be described. Three balls were arranged in a regular triangle form such that they were in contact with each other and fixed in a specimen vessel. One test ball was placed in a recess defined at the center for the three fixed balls. Then, the test ball is applied with rotation and, at the same time, applied with a load from below.

The wear test was conducted in a lubricant Supermulpass, manufactured by Nisseki Mitsubishi Co., viscosity 2). The test conditions include rotational speed: 700 $min^{-1}$, load: 147 N, temperature: room temperature and test time: 1 hr. Further, the diameter of the test ball was ⅜ inch and both of the test ball and the fixed balls were constituted with an identical kind of material.

In the wear test, the test was terminated at the instance the torque increased to three times the initial value. Then, the area for the indentation of the three fixed balls was measured after the test and the average value thereof was defined as a wear amount. The test results are shown in table 22. The wear amount in each of the examples and the comparative examples are shown as relative values based on the wear amount in Comparative Example h16 being assumed as 1.

TABLE 22

| | Material | Specific strength (× $10^7$ mm) | Fracture toughness $K_{1c}$ (MPa · $m^{1/2}$) | Thermal expansion coefficient (×$10^{-6}$/° C.) | Bending strength (MPa) | Wear amount |
|---|---|---|---|---|---|---|
| Example H52 | $(Mo,W)_2NiB_2$ | 2.2 | 10 | 8 | 850 | 0.2 |
| Example H53 | $(Mo,W)_2NiB_2$ | 2.5 | 11 | 8.3 | 1050 | 0.15 |
| Example H54 | $(Mo,W)_2NiB_2$ | 2.8 | 13 | 8.5 | 1230 | 0.1 |
| Example H55 | $(Mo,W)_2NiB_2$ | 3.1 | 15 | 8.7 | 1510 | 0.05 |
| Example H56 | $(Mo,W)_2NiB_2$ | 3.2 | 12.5 | 9 | 1650 | 0.05 |
| Example H57 | $(Mo,W)_2NiB_2$ | 2.1 | 10 | 8.5 | 840 | 0.6 |
| Comp. Example h16 | $Si_3N_4$ | 3.3 | 6 | 2.8 | 1000 | 1 |

TABLE 22-continued

|  | Material | Specific strength (× $10^7$ mm) | Fracture toughness $K_{1c}$ (MPa · $m^{1/2}$) | Thermal expansion coefficient (×$10^{-6}$/° C.) | Bending strength (MPa) | Wear amount |
|---|---|---|---|---|---|---|
| Comp. Example h17 | $Al_2O_3$ | 0.82 | 4 | 7.6 | 350 | 4 |

As can be seen from Table 22, the wear amount of the boride series cermet in Examples H52–H57 were outstandingly smaller compared with that of Comparative Examples h16 and h17. This is attributable to that the boride series cermet is a composite material of a boron compound having lubricity and a metal.

Then, for the evaluation of the durability of the boride series cermet described above, ball bearings were manufactured using the boride series cermet as the starting material and a rotational test was conducted.

The ball bearings used for the rotational test (Examples H58–H63 and Comparative Examples h18–h20) are ball bearings manufactured by Nippon Seiko Co. (bearing No.: 6000, inner diameter: 10 mm, outer diameter: 26 mm, width: 8 mm), in which the materials constituting the outer ring, the inner ring and the rolling element were changed variously as shown in Table 23. A snap cage formed of a resin composition (formed by blending 80% by volume of a tetrafluoroethylene perfluoroalkyl vinyl ether resin (PFA) and 20% by volume of potassium titanate whisker) manufactured by an injection molding method was used for the cage.

TABLE 23

|  | Material for inner/outer ring | Material for rolling element | Durability |
|---|---|---|---|
| Example H58 | Cermet identical with Example H57 | Cermet identical with Example H55 1) | 7 |
| Example H59 | SUS440C | Cermet identical with Example H53 1) | 5 |
| Example H60 | Cermet identical with Example H52 | Cermet identical with Example H54 1) | 10 |
| Example H61 | Cermet identical with Example H56 | $Si_3N_4$ | 8 |
| Example H62 | SUS440C | Cermet identical with Example H56 | 7 |
| Example H63 | SUS440C | Cermet identical with Example H57 | 3.5 |
| Comp. Example h18 | SUS440C | $Si_3N_4$ | 1 |
| Comp. Example h19 | $Si_3N_4$ | $Si_3N_4$ | 2 |
| Comp. Example h20 | $Al_2O_3$ | $Al_2O_3$ | 0.1 |

1) $(Mo,W)_2NiB_2$

As described above rolling bearings were attached to the same bearing rotation testing equipment manufactured by Nippon Seiko Co as described above (shaft of the rotation testing equipment formed of stainless steel material) and rotated with no lubrication under the conditions at a rotational speed of 1500 $min^{-1}$, under a radial load of 300 N and at a temperature of 250° C. Then, the instance the vibration value increased to three times the initial value was defined as a life of the ball bearing. The results are collectively shown in Table 23. The durability (life) of the ball bearings in each of the examples and the comparative examples is indicated as a relative value based on the durability (life) of Comparative Example H18 being assumed as 1.

Figure 25:
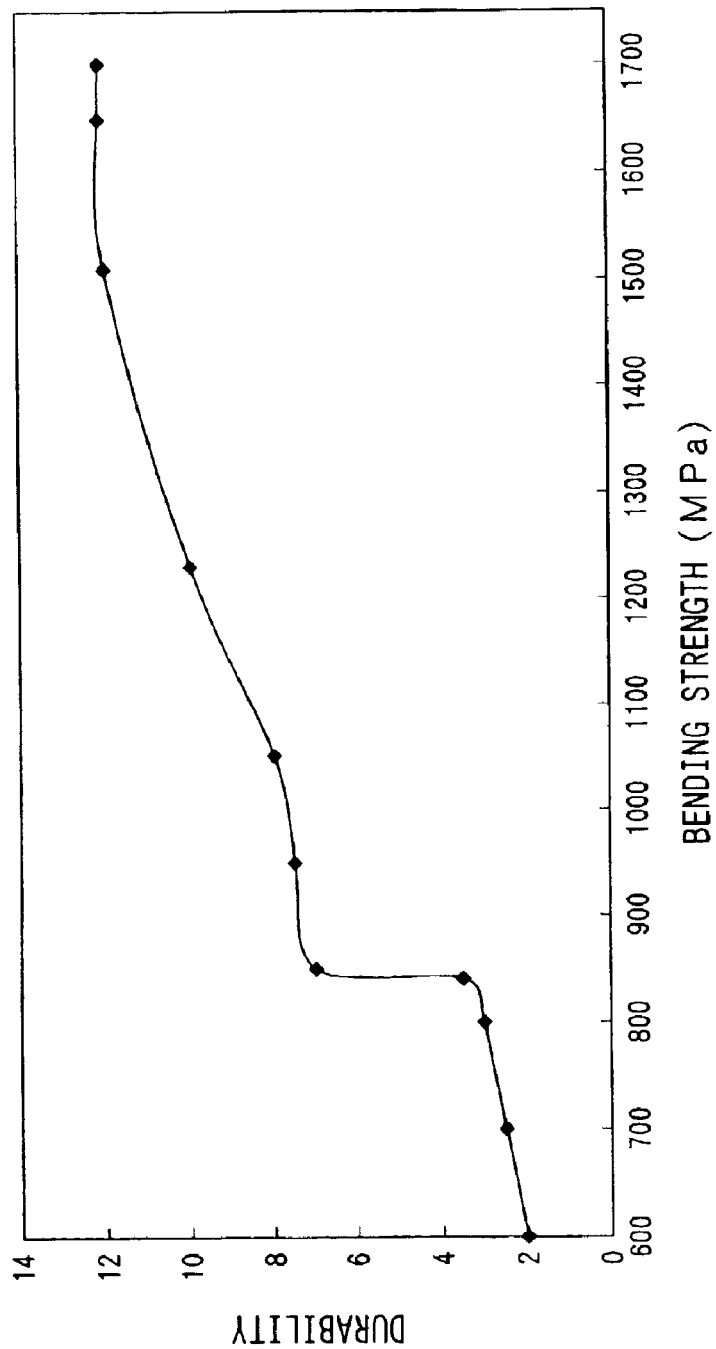
FIG. 25 is a graph showing a correlation between the bending strength of a boride series cermet and the durability of a ball bearing.

As can be seen from Table 23, the durability of the ball bearings in Examples H58 to H63 was excellent compared with Comparative Examples h18–h20. FIG. 25 shows a graph showing a correlation between the durability of the ball bearing and the bending strength for the material constituting the ball bearing. It can be seen from the graph that the durability is outstandingly excellent when the bending strength is 850 MPa or more.

Then, for evaluating the durability of the boride series cermet in a molten metal, ball bearings were manufactured by using the boride series cermet as the material and a rotation test was conducted.

Rolling bearings used for the rotation test (Examples H64–H66 and Comparative Example h21) were thrust ball bearings manufactured by Nippon Seiko Co. (Bearing No. 51305, inner diameter 25 mm, outer diameter 52 mm, height 18 mm) in which the material for constituting the outer ring and the inner ring were changed variously as shown in Table 24. Further, each of the thrust ball bearings was constituted with a silicon nitride series 8h described above (number of rolling elements: 3) and has a machined cage formed of C/C composite.

TABLE 24

|  | Material of inner/outer ring | Fracture toughness $K_{1c}$ (Mpa · $m^{1/2}$) | Thermal expansion coefficient (×$10^{-6}$/° C.) | Thermal impact resistance value | Bending strength (MPa) | Specific strength (×$10^7$ mm) | Durability |
|---|---|---|---|---|---|---|---|
| Example H64 | Cermet identical with Example H52 1) | 10 | 8 | 750 | 850 | 2.2 | 7 |
| Example H65 | Cermet identical with Example H54 1) | 13 | 8.5 | 700 | 1230 | 2.8 | 5 |

TABLE 24-continued

| | Material of inner/outer ring | Fracture toughness $K_{1c}$ (Mpa · m$^{1/2}$) | Thermal expansion coefficient (×10$^{-6}$/° C.) | Thermal impact resistance value | Bending strength (MPa) | Specific strength (×10$^7$ mm) | Durability |
|---|---|---|---|---|---|---|---|
| Example H66 | Cermet identical with Example H55 1) | 15 | 8.7 | 1000 | 1510 | 3.1 | 10 |
| Comp. Example h21 | $Si_3N_4$ | 6 | 2.8 | 650 | 1000 | 3.3 | 1 |

1) $(Mo,W)_2NiB_2$

The thrust ball bearings described above were attached to a bearing rotation test equipment manufactured by Nippon Seiko Co. at a room temperature and the thrust ball bearings were immersed in a molten zinc bath at 460° C. Then, in a state immersed in the molten zinc bath, they were rotated (inner ring rotated) under the condition of a thrust load of 980 N and at a rotational speed of 200 min$^{-1}$. Then, the rotation time of the thrust ball bearing till the rotation torque increased to three times the initial value was defined as the life to evaluate the durability. The ingredients for the molten zinc bath are identical with those described above.

Table 24 shows the result of the evaluation collectively. The durability (life) of the ball bearing in each of the examples and the comparative examples is indicated as a relative value based on the durability (life) of Comparative Example h21 being assumed as 1. Further, Table 24 also shows the fracture toughness $K_{IC}$, the thermal expansion coefficient, the thermal impact resistance value and the bending strength and the specific strength of the boride series cermet together at a molten metal temperature (460° C.).

As can be seen from Table 24, durability of the thrust ball bearings of Examples H64–H66 was excellent compared with Comparative Example h21.

Further, this invention is not restricted to each of the embodiments described above. For example, while the deep groove ball bearing or the like has been explained as an example in the embodiment described above, the rolling device according to this invention is applicable to various rolling bearings. For example, they include angular ball bearings, radial type rolling bearings such as cylindrical rolling bearings, tapered roller bearings, needle roller bearings and the self-aligning roller bearings and thrust type rolling bearings such as thrust roller bearings and thrust roller bearings.

Further, while the rolling bearing has been explained as an example as the rolling device in the embodiments described above, the rolling device of this invention is applicable also to various other types of rolling devices. For example, it is suitably applicable to other rolling devices such as linear motion guiding devices, ball screws, and linear motion bearings.

As has been described above, the rolling device according to this invention is light in weight, excellent in corrosion resistance, thermal impact shock resistance and wear resistance and shows long life even when used in high temperature.corrosive circumstances or at high speed in high temperature circumstance.

[Embodiment 3]

Figure 26:
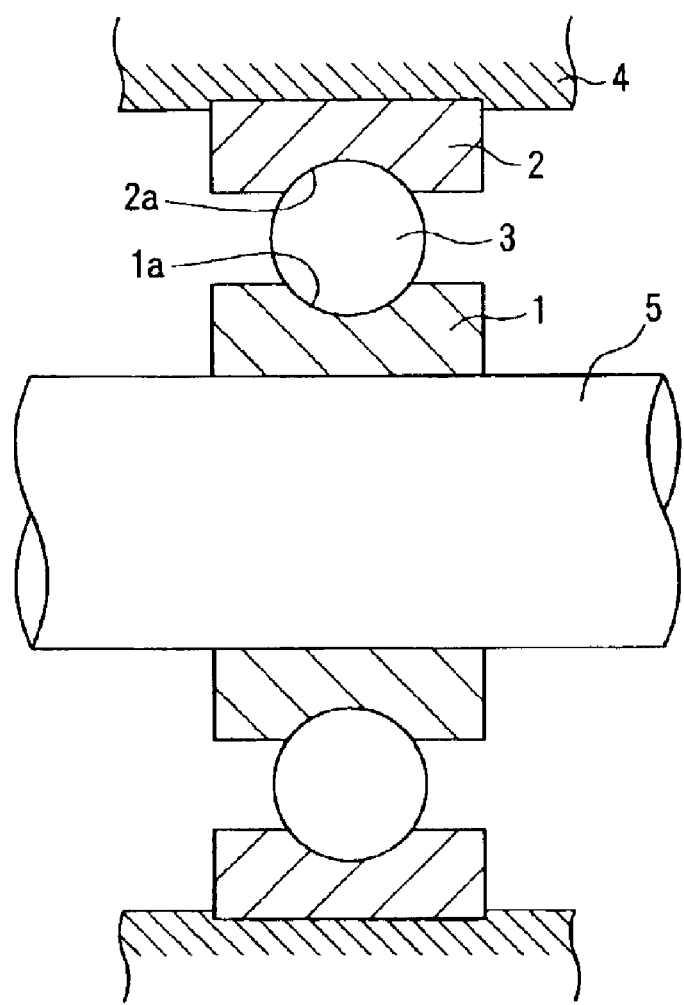
FIG. 26 is a fragmentary cross sectional view showing a rolling bearing as an embodiment of a rolling device according to this invention.

FIG. 26 shows a rolling bearing as a rolling device according to this embodiment in which rolling elements 3 are interposed between a raceway surface 1a of an inner ring 1 (guiding surface) and a raceway surface 2a (guiding surface) of an outer ring 2.

The outer ring 2 is attached to a housing 4 to constitute a support and the inner ring 1 is secured to the shaft 5 to constitute a movable member.

The inner ring 1 and the outer ring 2 are formed of bearing steels such as SUJ2 or SUS4040C.

Further, the rolling element 3 is formed of a ceramic material or a cemented carbide, and each of the ratio of the linear expansion coefficient of the rolling element 3 to the inner ring 1 and the ratio of the linear expansion coefficient of the rolling element 3 to the outer ring 2 is set to 0.45 or less by selecting the ceramic material or the cemented carbide.

In the rolling bearing having the constituent described above, the thermal expansion amount of the rolling element 3 is outstandingly smaller than the thermal expansion amount of the inner ring 1 and the outer ring 2 relatively even under a condition where a great amount of heat is generated at high speed rotation. Accordingly, increase of the preload caused by the temperature gradient can be moderated effectively and seizure is less caused even under the condition at a high speed rotation where heat generation is increased and, as a result, it can rotate under the high speed condition and can operate for a long period of time at high speed rotation.

In this case when a ceramic material or a cemented carbide having the ratio of the fracture toughness value (MPa·m$^{1/2}$) to the Vickers hardness (GPa) is 0.40 or more is adopted for the rolling element 3, even when a large centrifugal force exerts under high speed rotational condition, cracks are less generated and less propagate on the surface or in the inside of the rolling element 3 formed of the ceramic material or cemented carbide. Accordingly, since flaking and wear less occur and adhesion less occurs, the bearing can operate at a higher rotational condition and can operate for long time even under a high speed rotational condition.

In this case, the fracture toughness value calculated according to the IF method of JIS R1607 is used for the fracture toughness value (MPa·m$^{1/2}$) of the material adopted in this invention intended for the planar surface of the material constituting the rolling device. A value measured according to JIS R1610 is used for the Vickers hardness intended for the planar surface of the material constituting the rolling device.

In a case of forming all of the inner and the outer ring 1 and 2 and the rolling element 3 of the ceramic material or the cemented carbide and the ratio of the fracture toughness value (MPa·m$^{1/2}$) to the Vickers hardness (GPa) of the ceramic material or the cemented carbide is less than 0.40, when a large centrifugal force exerts on the rolling element under a high speed rotational condition, cracks tend to occur starting from defects on the surface or in the inside, or they tend to propagate to form a great amount of wear powder or flaking to sometimes shorten the life of the rolling device extremely.

Further, it is preferred that rolling element 3 has a longitudinal modulus of coefficient (GPa) ratio to the specific rigidity (density (g/cm³)) of $0.90 \times 10^8$ mm or more and the specific strength of $1.2 \times 10^7$ or more.

In a case of a rolling element 3 having a specific rigidity of $0.90 \times 10^8$ mm or more and a specific strength of $1.2 \times 10^7$ mm or more, the centrifugal force and the gyro moment caused in the rolling element 3 can be moderated effectively and the load on the rolling element and the slip can be decreased effectively, so that the heat generation is reduced and the increase of preload can be lowered, so that seizure less occurs. As a result, the bearing can rotate at a higher speed condition and can operate for a long period of time under high speed rotation.

Further, when the specific rigidity of the rolling element 3 is $0.90 \times 10^8$ mm or more, the elastic deformation amount of the rolling element when undergoing the load can be decreased to improve the rigidity of the rolling device. Accordingly, when the rolling bearing for within the range of the invention is used as a rolling bearing supporting the main shaft of the machine tool, the rigidity of the main shaft is improved to further enhance the accuracy for the size and the shape of the work.

There is no particular restriction on the ceramic materials described above and they can include, for example, silicon nitride ($Ni_3N_4$) series, zirconia ($ZrO_2$) series, alumina ($Al_2O_3$) series, silicon carbide (SiC) series, aluminum nitride (AlN) series, boron carbide ($B_4C$) series, titanium boride ($TiB_2$) series, boron nitride (BN) series, titanium carbide (TiC) series, titanium nitride (TiN) series or a ceramic series composite material formed by compositing them.

Further, the ceramic material for use in this invention can be blended with a fibrous filler for improving fracture toughness, the longitudinal modulus of elasticity, the hardness and the mechanical strength. There is no particular restriction on the fibrous filler, and silicon carbide whisker, silicon nitride whisker, alumina whisker or aluminum nitride whisker can be exemplified.

There is no particular restriction on the cemented carbide and the cemented carbide can include the followings.

That is, they include, WC—Co series, WC—$Cr_3C_2$—Co series, WC—TaC—Co series, WC—TiC—Co series, WC—NbC—Co series, WC—TaC—NbC—Co series, WC—TiC—TaC—NbC—Co series, WC—TiC—TaC—Co series, WC—ZrC—Co series, WC—TiC—ZrC—Co series, WC—TaC—VC—Co series, WC—$Cr_3C_2$—Co series, WC—TiC—$Cr_3C_2$—Co series and WC—TiC—TaC series. Further, alloys of non-magnetic property and improved with corrosion resistance can include, for example, WC—Ni series, WC—Co—Ni series, WC—$Cr_3C_2$—$Mo_2C$—Ni series, WC—Ti (C, N)—TaC series, WC—Ti(C, N) series and $Cr_3C_2$—Ni series.

A typical composition for the WC—Co series alloy is W:Co:C=70.41-91.06:3.0-25.0:4.59-5.94 and a typical composition for WC—TaC—NbC—Co series alloy is W:Co:Ta:Nb:C=65.7-86.3:5.8-25.0:1.4-3.1:0.3-1.5:4.7-5.8. Further, a typical composition for the WC—TiC—TaC—NbC—Co series alloy is W:Co:Ta:Ti:Nb:C=65.0-75.3:6.0-10.7:5.2-7.2:3.2-11.0:1.6-2.4:6.2-7.6 and a typical composition for WC—TaC—Co series alloy is W:Co:Ta=53.51-90.30:3.5-25.0:0.30-25.33. Further, a typical composition for WC—TiC—Co series alloy is W:Co:Ti=57.27-78.86:4.0-13.0:3.20-25.59 and a typical composition for WC—TiC—TaC—Co series alloy is W:Co:Ta:Ti:C=47.38-87.31:3.0-10.0:0.94-9.38:0.12-25.59:5.96-10.15.

With the reasons described above, the rolling device in this invention is excellent in the high speed rotational performance and can operate at a higher speed rotation and can be used for a long time in a location where the thermal expansion is large by the temperature elevation such as in the rotational portion of various spindles in machine tools or various pumps such as dry vacuum pumps, or in a place causing temperature gradient in the inside of the rolling device.

While the rolling bearing is shown as the example of the rolling device in the embodiment described above, it may be a rolling device such as a linear motion guiding device.

In this case, the cemented carbide has a merit that the working is easy and the cost is inexpensive compared with the ceramic material.

Examples I1–I10 as the rolling bearings according to this invention and Comparative Examples i1–i7 as the rolling bearing for comparison were provided by forming the inner and outer rings 1 and 2 and the rolling element 3 of the materials shown in Table 25 and Table 26, and the high speed rotational performance and the durability were evaluated for each of the rolling bearings as to be explained later. Each of the rolling bearings is an angular type rolling bearing (bearing No.: 7013C, inner diameter: 65 mm, outer diameter: 100 mm, width; 18 mm, angle of contact: 15°). Each of the examples is an example of using the ceramic material for the rolling element and FIG. 26 shows examples of using cemented carbides for the rolling element.

TABLE 25

|  | Inner ring | Outer ring | Rolling element | Specific strength ($\times 10^7$ mm) | Linear expansion coefficient ratio | | Fracture toughness value Vickers hardness | Specific rigidity $\times 10^8$ | High speed rotation property (limit rotational speed) | Durability (vibration life) |
|  |  |  |  |  | Rolling element/ inner ring | Rolling element/ outer ring |  |  |  |  |
| --- | --- | --- | --- | --- | --- | --- | --- | --- | --- | --- |
| Example I1 | SUJ2 | SUJ2 | Silicon nitride series 1i | 3.93 | 0.27 | 0.27 | 0.41 | 0.94 | 3 | 10 |
| Example I2 | SUJ2 | SUJ2 | Silicon nitride series 2i | 3.06 | 0.24 | 0.24 | 0.46 | 0.95 | 4 | 13 |

TABLE 25-continued

| | Inner ring | Outer ring | Rolling element | Specific strength (×10$^7$ mm) | Linear expansion coefficient ratio | | Fracture toughness value Vickers hardness | Specific rigidity ×10$^8$ | High speed rotation property (limit rotational speed) | Durability (vibration life) |
|---|---|---|---|---|---|---|---|---|---|---|
| | | | | | Rolling element/ inner ring | Rolling element/ outer ring | | | | |
| Example I3 | SUJ2 | SUJ2 | Silicon nitride series 3i | 2.94 | 0.22 | 0.22 | 0.40 | 0.94 | 5 | 15 |
| Example I4 | SUS440C | SUJ2 | Silicon nitride series 1i | 3.93 | 0.34 | 0.27 | 0.41 | 0.94 | 3.5 | 10 |
| Example I5 | SUS440C | SUS440C | Silicon nitride series 3i | 2.94 | 0.28 | 0.28 | 0.40 | 0.94 | 5 | 12 |
| Comp. Example i1 | SUJ2 | SUJ2 | SUJ2 | — | 1.00 | 1.00 | — | — | 1 | 1 |
| Comp. Example i2 | SUS440C | SUJ2 | SUJ2 | — | 1.24 | 1.00 | — | — | 1.2 | 1.3 |
| Comp. Example i3 | SUS440C | SUJ2 | Silicon nitride series 4i | 2.41 | 0.53 | 0.43 | 0.33 | 0.86 | 1.5 | 3 |
| Comp. Example i4 | SUS440C | SUJ2 | Zirconia series 1i | 1.73 | 0.95 | 0.77 | 0.51 | 0.47 | 1.25 | 1.8 |

TABLE 26

| | Inner ring | Outer ring | Rolling element | Specific strength (×10$^7$ mm) | Linear expansion coefficient ratio | | Fracture toughness value Vickers hardness | Specific rigidity ×10$^8$ | High speed rotation property (limit rotational speed) | Durability (vibration life) |
|---|---|---|---|---|---|---|---|---|---|---|
| | | | | | Rolling element/ inner ring | Rolling element/ outer ring | | | | |
| Example I6 | SUJ2 | SUJ2 | Cemented carbide 1i | 1.27 | 0.4 | 0.4 | 1.10 | 0.38 | 1.8 | 4 |
| Example I7 | SUJ2 | SUJ2 | Cemented carbide 5i | 2.17 | 0.32 | 0.32 | 0.58 | 0.41 | 2 | 3.5 |
| Example I8 | SUJ2 | SUJ2 | Cemented carbide 3i | 1.46 | 0.36 | 0.36 | 0.76 | 0.41 | 2.1 | 6 |
| Example I9 | SUJ2 | SUJ2 | Cemented carbide 4i | 1.95 | 0.35 | 0.35 | 0.92 | 0.36 | 2.2 | 6.5 |
| Example I10 | SUS440C | SUJ2 | Cemented carbide 5i | 2.17 | 0.396 | 0.32 | 0.58 | 0.41 | 2.3 | 5 |
| Comp. Example i5 | SUJ2 | SUJ2 | Cemented carbide 6i | 1.99 | 0.46 | 0.46 | 1.10 | 0.38 | 0.8 | 1.1 |
| Comp. Example i6 | SUS440C | SUJ2 | Cemented carbide 7i | 2.25 | 0.60 | 0.49 | 0.83 | 0.39 | 0.5 | 0.6 |
| Comp. Example i7 | SUS440C | SUS440C | Cemented carbide 2i | 1.02 | 0.54 | 0.54 | 0.55 | 0.4 | 0.2 | 0.3 |

The silicon nitride series and the zirconia series in Table 25 are ceramic materials having the following performance.

① Silicon nitride series 1i:

Linear expansion coefficient: 3.4×10$^{-6}$ (K$^{-1}$), (fracture toughness value/Vickers hardness): 0.41, specific rigidity: 0.94×10$^8$ (mm), specific strength: 3.93×10$^7$ (mm).

② Silicon nitride series 2i:

Linear expansion coefficient: 3.0×10$^{-6}$ (K$^{-1}$), (fracture toughness value/Vickers hardness): 0.46, specific rigidity: 0.95×10$^8$ (mm), specific strength: 3.06×10$^7$ (mm).

③ Silicon nitride series 3i:

Linear expansion coefficient: 2.8×10$^{-6}$ (K$^{-1}$), (fracture toughness value/Vickers hardness): 0.40, specific rigidity: 0.94×10$^8$ (mm), specific strength: 2.94×10$^7$ (mm).

④ Silicon nitride series 4i:
Linear expansion coefficient: $5.4 \times 10^{-6}$ ($K^{-1}$), (fracture toughness value/Vickers hardness): 0.33, specific rigidity: $0.86 \times 10^8$ (mm), specific strength: $2.41 \times 10^7$ (mm).
⑤ Zirconia series 1i:
Linear expansion coefficient: $9.6 \times 10^{-6}$ ($K^{-1}$), (fracture toughness value/Vickers hardness): 0.51, specific rigidity: $0.47 \times 10^8$ (mm), specific strength: $1.73 \times 10^7$ (mm).

Further "cemented carbide" in Table 26 shows a cemented carbide having the following performance.
① Cemented carbide 1i (WC—Co series G1, manufactured by Nippon Tungsten Co.)
Linear expansion coefficient: $5.0 \times 10^{-6}$ ($K^{-1}$), (fracture toughness value/Vickers hardness): 1.10, specific rigidity: $0.38 \times 10^8$ (mm), and specific strength: $1.27 \times 10^7$ (mm).
② Cemented carbide 2i (WC—TiC—TaC—Co series HN05, manufactured by Nippon Tungsten Co.)
Linear expansion coefficient: $5.5 \times 10^{-6}$ ($K^{-1}$), (fracture toughness value/Vickers hardness): 0.55, specific rigidity: $0.41 \times 10^8$ (mm), and specific strength: $1.02 \times 10^7$ (mm).
③ Cemented carbide 3i (WC—Ni series DN, manufactured by Dijet Industry Co.)
Linear expansion coefficient: $4.5 \times 10^{-6}$ ($K^{-1}$), (fracture toughness value/Vickers hardness): 0.76, specific rigidity: $0.41 \times 10^8$ (mm), and specific strength: $1.46 \times 10^7$ (mm).
④ Cemented carbide 4i (WC—Ni—Cr series M61U, manufactured by Sumitomo Electric Industry Co.)
Linear expansion coefficient: $4.4 \times 10^{-6}$ ($K^{-1}$), (fracture toughness value/Vickers hardness): 0.92, specific rigidity: $0.36 \times 10^8$ (mm), specific strength: $1.95 \times 10^7$ (mm).
④ Cemented carbide 4i (WC—Ni—Cr series M61U, manufactured by Sumitomo Electric Industry Co.)
Linear expansion coefficient: $4.4 \times 10^{-6}$ ($K^{-1}$, (fracture toughness value/Vickers hardness): 0.92, specific rigidity: $0.36 \times 10^8$ (mm), specific strength: $1.95 \times 10^7$ (mm).
⑤ Cemented carbide 5i (WC—Co—Ni—Cr series M4, manufactured by Sumitomo Electric Industry Co.)
Linear expansion coefficient: $4.0 \times 10^{-6}$ ($K^{-1}$), (fracture toughness value/Vickers hardness): 0.58, specific rigidity: $0.41 \times 10^8$ (mm), specific strength: $2.17 \times 10^7$ (mm).
⑥ Cemented carbide 6i (WC—Co series G30, manufactured by Nippon Tungsten Co.)
Linear expansion coefficient: $5.7 \times 10^{-6}$ ($K^{-1}$), (fracture toughness value/Vickers hardness): 1.10, specific rigidity: $0.38 \times 10^8$ (mm), specific strength: $1.99 \times 10^7$ (mm).
⑦ Cemented carbide 7i (WC—Ni—Cr—Mo series M45, manufactured by Fuji Dice Co.)
Linear expansion coefficient: $6.1 \times 10^{-6}$ ($K^{-1}$), (fracture toughness value/Vickers hardness): 0.83, specific rigidity: $0.39 \times 10^8$ (mm), specific strength: $2.25 \times 10^7$ (mm).

Further, SUJ2 has a linear expansion coefficient of $12.5 \times 10^{-6}$ ($K^{-1}$) (0–100° C.), a longitudinal modulus of coefficient of 208 (GPa) and a density of 7.83 (g/cm³).

Further, SUS440C has a linear expansion coefficient of $10.1 \times 10^{-6}$ ($K^{-1}$) (0–100° C.), a longitudinal modulus of coefficient of 200 (GPa) and a density of 7.68 (g/cm³).

Then, each of the rolling bearings for the test were assembled each by two in a back-to-back manner and the preload at a normal temperature was set to 700N. In each of the cases, a nylon cage was used as the cage and oil-air lubrication was conducted using SUPERHIGHLAND 11 (VG22) for the lubricant (flow rate at 0.225 cc/hr).

The high speed rotational performance was evaluated by using a bearing rotation testing equipment manufacture by Nippon Seiko (comprising back-to-back assembled spindle structure, although details being not shown). The outer ring 2 is fixed to a housing 4 to constitute a support, while the inner ring is secured to a shaft member to constitute a movable member conducting rotational movement.

For the evaluation, preload was set to 700N before test at a normal temperature in atmospheric air, and the test was started from the rotational speed of 500 $min^{-1}$ while measuring the temperature for the outer diametrical surface of the outer ring 2. The rotational speed was increased each by 1000 rpm on every 30 min and the rotational speed at the instance the temperature on the outer diametrical surface of the outer ring increased abruptly was defined as limit rotational speed as a reference value for the evaluation of high speed rotational performance.

The results of evaluation are shown collectively in Table 25 and Table 26. The high speed rotational performance (limit rotational speed) of the rolling bearing in each of the examples and the comparative examples is indicated as a relative value based on the high speed rotational performance (limit rotational speed) of Comparative Example i1 (Table 25) being assumed as 1.

On the other hand, for the evaluation test of durability, the test was conducted by using the same bearing rotation testing equipment manufactured by Nippon Seiko Co. as the testing equipment used for the evaluation of the high speed rotational performance (limit rotational speed) at a normal temperature in an atmospheric air while setting the preload to 700N before the test and at a rotational speed: 15,000 $min^{-1}$. The durability was evaluated with reference to the vibration value. In this case, the instance that the vibrational value reached five times the initial value is defined as the life for the rolling bearing.

The results of evaluation are shown collectively in Table 25 and Table 26. The high speed rotational performance and the durability (vibration life) of the rolling bearing in each of the examples and the comparative examples are indicated as relative values based on the high speed rotational performance and the durability (vibration life) in Comparative Example i1 (Table 25) being assumed as 1, respectively.

As shown in Table 25 and Table 26, the rolling bearing in each of the examples according to this invention has an outstandingly improved high speed rotational performance and the durability compared with each of the comparative examples.

Further, rolling bearings having various ratios for the linear expansion coefficient were manufactured by using materials formed by quenching and tempering SUJ2 or SUS440C for the inner and outer rings 1 and 2, and constituting the rolling element 3 by using materials formed by quenching and tempering SUJ2 or SUS440C or ceramic materials or cemented carbides, for example, as shown in Table 25 and Table 26, and combining them, and high speed rotational performance and the durability were evaluated. The test conditions and the evaluation conditions were identical with those described above.

The durability and the high speed rotational performance are indicated as relative values based on the durability (vibration life) and the high speed rotational performance in a case of constituting all the inner and outer rings 1 and 2 and the rolling element 3 by SUS2 being assumed as 1, respectively.

Figure 27:
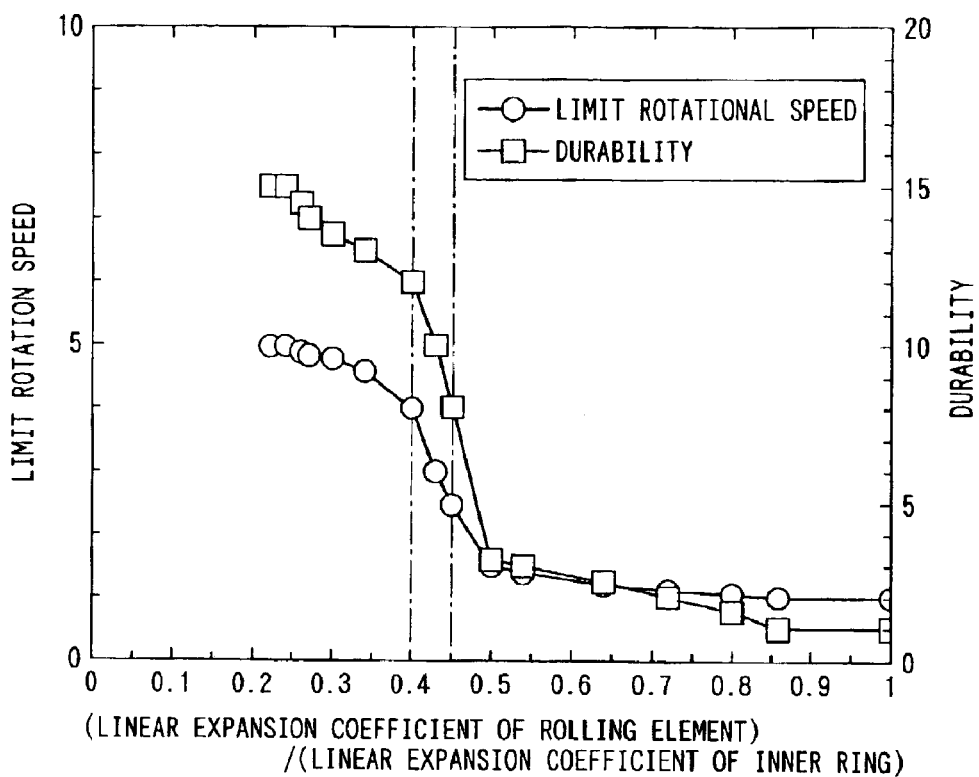
FIG. 27 is a graph showing a relation between the ratio of linear expansion coefficient and high speed rotational performance and durability.

The results are shown in FIG. 27.

In this case, since the expansion of the inner ring 1 tends to decrease the bearing gap and accelerate seizure and deteriorating of life compared with the expansion of the outer ring 2, the high speed rotational performance (limit rotational speed) and durability (vibration life) were determined based on the ratio of the linear expansion efficient of the rolling element 3 relative to the linear expansion coefficient of the inner ring 1 in FIG. 27.

As can be seen from FIG. 27, the high speed rotational performance and the durability are improved by twice or more at the ratio of the linear expansion coefficient of the rolling element 3 relative to the linear expansion coefficient of the inner ring 1 of 0.45 compared with the case where the ratio is 0.5 or more. Further, the effect is further improved and can be ensured stably at the ratio of 0.40 or less. That is, it can be seen that the ratio of the linear expansion coefficient of the rolling element 3 relative to the linear expansion coefficient of the inner ring 1 is preferably at least 0.45 or 5 less, preferably, 0.40 or less.

Further, the rolling element 3 was selected such that the ratio of the linear expansion coefficient of the rolling element 3 relative to the linear expansion coefficient of the inner ring 1 and the ratio of the linear expansion coefficient of the rolling element 3 relative to the linear expansion coefficient of the outer ring 2 were 0.45. The selection was made by applying one of atmospheric pressure sintering, reactive sintering or HIP (hot hydrostatic sintering) for silicon nitride ($Si_3N_4$) series ceramic materials and trially manufacturing those having different ratios of fracture toughness value and Vickers hardness. Then, test and evaluation on the durability of the bearings were conducted under the same condition as described above.

The durability is indicated as a relative value based on the durability (vibration life) in a case of constituting all of the inner and outer rings 1 and 2 and rolling element 3 with SUJ2 being assumed as 1.

Figure 28:
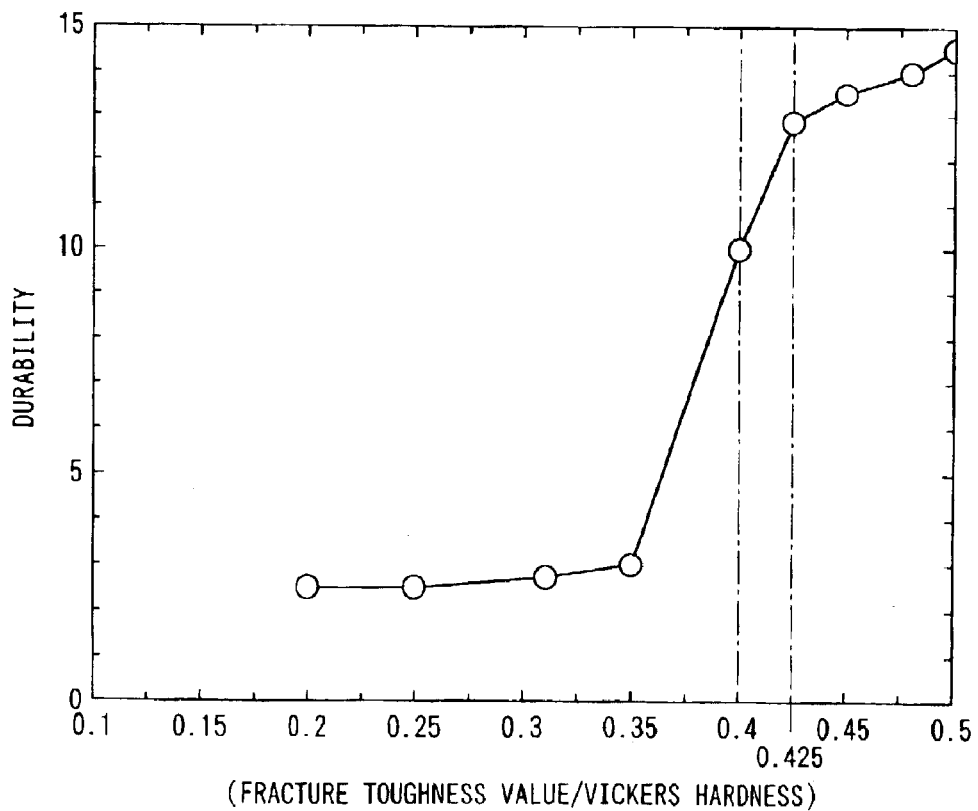
FIG. 28 is a graph showing a relation between (fracture toughness value/Vickers hardness) and durability.

FIG. 28 shows the result.

As can be seen from FIG. 28, when the ratio of the fracture toughness relative to the Vickers hardness of the rolling element 3 is 0.4 or more, the durability is improved by twice or more compared with the case where the ratio is 0.35 or less and, particularly, the durability is improved outstandingly at a ratio of 0.425 or more, that is, it can be seen that the ratio of the fracture toughness relative to the Vickers hardness of the rolling element 3 is 0.4 or more and, preferably, 0.425 or more.

Further, also in a case of forming the rolling element 3 of a cemented carbide instead of the ceramic material described above, it has been confirmed that the same results as those in FIG. 28 can be obtained.

As has been described above, it can be seen that the rolling bearing device according to this invention is excellent in the high speed rotational performance (limit rotational speed) and has a long life.

[Embodiment 4]

Figure 29:
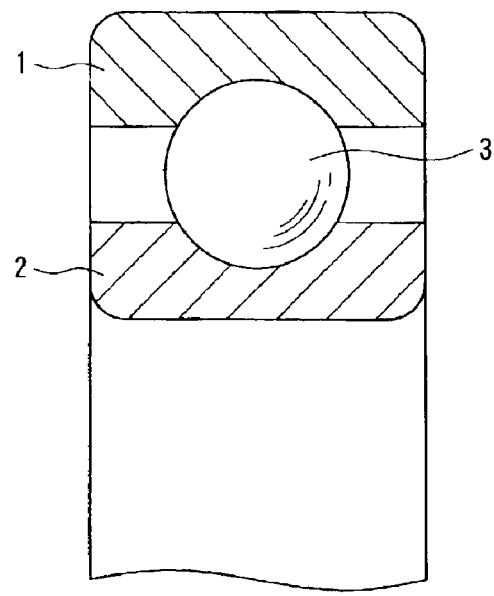
FIG. 29 is a fragmentary cross sectional view showing the structure of a rolling bearing as an embodiment of a rolling device according to this invention.

FIG. 29 is a fragmentary vertical cross sectional view showing the structure of a rolling bearing as an embodiment of a rolling device according to this invention. The rolling bearing comprises, an outer ring 1, an inner ring 2 and a plurality of balls 3 disposed rotationally between the outer ring 1 and inner ring 2, and a snap cage formed of resin (not illustrated) for holding the plurality of balls. The outer ring 1 corresponds to the movable member as the constituent factor of this invention, while the inner ring 2 corresponds to the support as the constituent factor of this invention.

All of the outer ring 1, the inner ring 2, and the balls 3 are formed of ceramic material, and the ratio between the fracture toughness value (MPa·$m^{1/2}$) and the Vickers hardness (GPa) of the ceramic material ([fracture toughness value]/[Vickers hardness]) is 0.25 or more and the specific strength is 1.2×$10^7$ mm.

Since the rolling baring of this embodiment described above is formed of the ceramic material, it is light in weight and excellent in rigidity, wear resistance and heat resistance. Further, even under high speed rotation, it causes much less adhesion and less seizure at the point of contact compared with metal materials.

Further, since the value for [fracture toughness value]/[Vickers hardness] of the ceramic material is 0.25 or more, cracks less propagate on the surface or in the inside of the ceramic material, so that flaking and wear less occur. Accordingly, the rolling bearing of this embodiment has a long lie even under a high load.

Particularly, also in a case of supporting a radial load, cracks less propagate on the surface or in the inside of the ceramic material and flaking and wear less occur in the outer ring having a load region to which the load is concentrated. Accordingly, the life is long under the condition where the high radial load is loaded.

Since the rolling bearing of this embodiment has excellent characteristics as described above, it can be used under a high load even at high speed and in a corrosive circumstance and in a high temperature circumstance. Accordingly, it can be used suitably, for example, in various spindles, various pumps, semiconductor production apparatus (conveying apparatus or the like), machine tools and turbines. It will be apparent that this is a long life rolling bearing when applied to any other equipments or application uses.

This embodiment shows an example of this invention and the invention is not restricted to this embodiment. For example, in this embodiment, while explanation has been made to an example of the rolling bearing as the rolling device, the rolling device according to this invention is applicable to various other types of rolling devices. For example, it can be applied suitably also to other rolling devices such as a linear motion guiding device, a ball screw, a linear motion bearing and a linear bush.

Further, the rolling bearing in the rolling device according to this invention is applicable to various rolling bearings. They include, for example, radial type rolling bearings such as deep groove ball bearings, angular ball bearings, cylindrical roller bearings, tapered roller bearings, needle roller bearings and self-aligning roller bearings, thrust type rolling bearings such as thrust ball bearings and thrust roller bearings.

Then, in the rolling bearings having substantially the same constitution as described above, those in which the ceramic material constituting the outer ring 1, the inner ring 2 and the balls 3 were changed variously were manufactured and various types of evaluation were conducted by a rotation test.

For the rolling bearings of Example J1–J28 and Comparative Examples j1–j4, rolling bearings manufactured by Nippon Seiko Co. (bearing No. 6206, inner diameter 30 mm, outer diameter 62 mm, width 16 mm) were used. The outer ring, the inner ring and the balls were formed of ceramic materials as shown in Table 27 and Table 28. Further, a snap cage formed of a fluoro resin was used for the cage. Table 27 and Table 28 also show the ratio between the fracture toughness value (MPa·$m^{1/2}$) and the Vickers hardness (GPa) for various ceramic materials ([fracture toughness value]/[Vickers hardness]), and the specific strength (×$10^7$ mm) for each of the ceramic materials, collectively.

TABLE 27

| | Inner ring | | Outer ring, ball | | Specific strength (×10⁷ mm) | Load resistance | Durability |
|---|---|---|---|---|---|---|---|
| | Material | Ratio 1) | Material | Ratio 1) | | | |
| Example J1 | Silicon nitride series 1j | 0.41 | Silicon nitride series 1j | 0.41 | 3.9 | 20 | 21 |
| Example J2 | Silicon nitride series 2j | 0.35 | Silicon nitride series 2j | 0.35 | 3.34 | 13 | 15 |
| Example J3 | Silicon nitride series 3j | 0.46 | Silicon nitride series 3j | 0.46 | 3.06 | 23 | 25 |
| Example J4 | Zirconia series 1j | 0.47 | Zirconia series 1j | 0.47 | 2.28 | 10 | 12 |
| Example J5 | Zirconia series 2j | 0.52 | Zirconia series 2j | 0.52 | 2.62 | 17 | 18 |
| Example J6 | Zirconia series 3j | 0.80 | Zirconia series 3j | 0.80 | 2.95 | 27 | 30 |
| Example J7 | Zirconia series 4j | 0.96 | Zirconia series 4j | 0.96 | 2.59 | 30 | 33 |
| Example J8 | Zirconia series 5j | 0.62 | Zirconia series 5j | 0.62 | 2.85 | 21 | 21 |
| Example J9 | Zirconia series 6j | 0.51 | Zirconia series 6j | 0.51 | 3.56 | 15 | 18 |
| Example J10 | Zirconia series 7j | 0.38 | Zirconia series 7j | 0.38 | 1.38 | 5 | 7 |
| Example J11 | Zirconia series 8j | 0.35 | Zirconia series 8j | 0.35 | 2.73 | 8 | 10 |
| Example J12 | Alumina series 1j | 0.35 | Alumina series 1j | 0.35 | 1.86 | 3 | 4 |
| Example J13 | Alumina series 2j | 0.26 | Alumina series 2j | 0.26 | 1.82 | 2.5 | 2.5 |
| Example J14 | Alumina series 3j | 0.63 | Alumina series 3j | 0.63 | 2.46 | 25 | 25 |
| Example J15 | Zirconia series 7j | 0.38 | Silicon nitride series 3j | 0.46 | — | 23 | 25 |
| Example J16 | Alumina series 3j | 0.63 | Zirconia series 3j | 0.80 | — | 25 | 28 |
| Example J17 | Silicon nitride series 1j | 0.41 | Alumina series 3j | 0.63 | — | 25 | 28 |
| Example J18 | Silicon nitride series 2j | 0.35 | Zirconia series 4j | 0.96 | — | 28 | 31 |

1) Ratio between fracture toughness value and Vickers hardness ([Fracture toughness value] / [Vickers hardness])

TABLE 28

| | Inner ring | | Outer ring, ball | | Specific strength (×10⁷ mm) | Load resistance | Durability |
|---|---|---|---|---|---|---|---|
| | Material | Ratio 1) | Material | Ratio 1) | | | |
| Example J19 | Zirconia series 1j | 0.47 | Zirconia series 1j | 0.63 | — | 28 | 30 |
| Example J20 | Silicon nitride series 4j | 0.43 | Silicon nitride series 4j | 0.43 | 2.16 | 21 | 22 |
| Example J21 | Silicon carbide particle dispersed silicon nitride | 0.5 | Silicon carbide particle dispersed silicon nitride | 0.5 | 2.94 | 30 | 31 |
| Example J22 | Zirconia series 9j | 0.41 | Zirconia series 9j | 0.41 | 1.73 | 12 | 13 |
| Example J23 | Zirconia series 10j | 0.40 | Zirconia series 10j | 0.40 | 3.33 | 10 | 12 |
| Example J24 | Zirconia series 11j | 0.58 | Zirconia series 11j | 0.58 | 1.86 | 17 | 16 |
| Example J25 | Alumina series 5j | 0.25 | Alumina series 5j | 0.25 | 1.89 | 5 | 6 |
| Example J26 | Silicon carbide whisker composite silicon nitride series | 0.49 | Silicon carbide whisker composite silicon nitride series | 0.49 | 2.94 | 24 | 22 |
| Example J27 | Silicon carbide whisker composite silicon nitride series | 0.49 | Silicon carbide whisker composite silicon nitride series | 0.49 0.5 | — | 25 | 24 |
| Example J28 | Silicon nitride series 1j | 0.41 | Silicon nitride series 2j | 0.35 | — | 15 | 17 |

TABLE 28-continued

| | Inner ring | | Outer ring, ball | | Specific strength ($\times 10^7$ mm) | Load resistance | Durability |
|---|---|---|---|---|---|---|---|
| | Material | Ratio 1) | Material | Ratio 1) | | | |
| Comparative Example j1 | Alumina series 4j | 0.20 | Alumina series 4j | 0.20 | 0.84 | 1 | 1 |
| Comparative Example j2 | Silicon carbide series | 0.13 | Silicon carbide series | 0.13 | 1.81 | 0.3 | 0.3 |
| Comparative Example j3 | Titanium boride series 1j | 0.20 | Titanium boride series | 0.20 | 1.29 | 0.7 | 0.6 |
| Comparative Example j4 | Alumina series 6j | 0.16 | Alumina series 6j | 0.16 | 0.95 | 0.5 | 0.5 |

1) Ratio between fracture toughness value and Vickers hardness ([Fracture toughness value]/[Vickers hardness])

The ceramic materials used are as shown below.
Silicon nitride series 1j: NPN-3, manufactured by Nippon Tungsten Co.
Silicon nitride series 2j: SAN-P, manufactured by Shinagawa Shirorenga Co.
Silicon nitride series 3j: SN733, manufactured by Kyocera Corp.
Silicon nitride series 4j: S/RBSN, manufactured by SIN-ERAMICS Co.
Zirconia series 1j: Z701N, manufactured by Kyocera Corp.
Zirconia series 2j: NPZ-2, manufactured by Nippon Tungsten Co.
Zirconia series 3j: NPZ-1, manufactured by Nippon Tungsten Co.
Zirconia series 4j: KGS20, manufactured by Nippon Tokushu Togyo Co.
Zirconia series 5j: RZ601, manufactured by Sumitomo Denko Co.
Zirconia series 6j: Z703, manufactured by Kyocera Corp.
Zirconia series 7j: Z21H0, manufactured by Kyocera Corp.
Zirconia series 8j: AZ-80GH, manufactured by Nippon Tokushu Togyo Co.
Zirconia series 9j: NPZ-3, manufactured by Nippon Tungsten Co.
Zirconia series 10j: NPZ-5, manufactured by Nippon Tungsten Co.
Zirconia series 11j: CZ-51, manufactured by Nippon Gaishi Co.
Alumina series 1j: HC2, manufactured by Nippon Tokushu Togyo Co.
Alumina series 2j: NAZ-83H, manufactured by Nippon Tokushu Togyo Co.
Alumina series 3j: AZ-93, manufactured by Sangoban Norton Co.
Alumina series 4j: AL-16, manufactured by Toshiba Co.
Alumina series 5j: NPA-2, manufactured by Nippon Tungsten Co.
Alumina series 6j: KP-95, manufactured by Nippon Tokushu Togyo Co.
Silicon carbide series: NPS-1, manufactured by Nippon Tungsten Co.
Silicon carbide particle dispersed silicon nitride series: KN-101N, manufactured by Kubota Co.
Silicon carbide whisker composite silicon nitride series: SNW, manufactured by Nichiju New Material Co.
Titanium boride series 1j: TB-901, manufactured by Kubota Co.

Then, the evaluated contents and the conditions for the rotational test are to be explained.

At first, load resistance (limit load) is to be explained.

Figure 30:
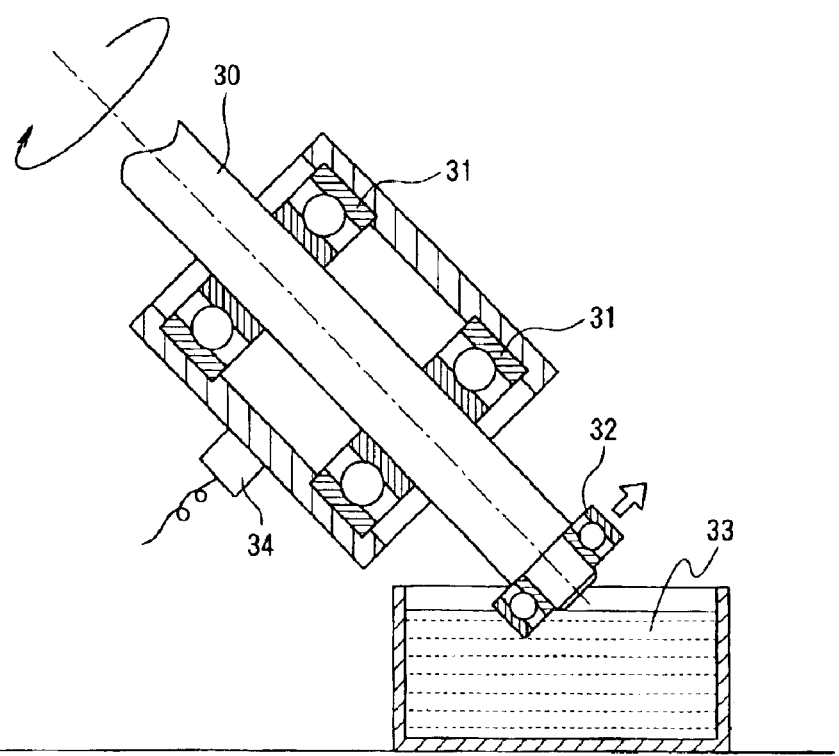
FIG. 30 is a cross sectional view showing the structure of a bearing rotation testing equipment.

Rolling bearing 32 was attached to a rolling bearing testing machine manufactured by Nippon Seiko Co. as shown in FIG. 30, and rotated at a normal temperature at a rotational speed of 5000 min$^{-1}$ while setting a initial radial load to 400N and using water 33 as a lubricant. Then, the radial load was increased each by 100N on every 6 hours and the radial load at the instance the vibration value detected by a vibration sensor 34 increased abruptly was defined as a limit value, to evaluate the load resistance.

In FIG. 30, reference numeral 30 denotes a rotational shaft, rotated by a not-illustrated motor. Further, a ball bearing 31 is a support bearing for supporting the rotational shaft 30. Further, the test bearing 32 is rotated in the manner of inner ring rotation by the rotational shaft 30, and the test load is loaded in the radial direction by a not-illustrated external load device.

The results of the test are shown collectively in Table 27 and Table 28. The load resistance (limit load) of the rolling bearing in each of the examples and the comparative examples is shown as a relative value based on the load resistance of Comparative Example j1 (limit load) being assumed as 1.

Then, the durability (life) is to be explained.

The rolling bearing was attached to the same bearing rotation test equipment manufactured by Nippon Seiko Co. as described above and rotated at a rotational speed of 5000 min$^{-1}$ at an ambient temperature of 5000 min$^{-1}$ under a radial load of 980N, using water as a lubricant. Then, the instance the vibration value increased three times the initial value was defined as the life of the rolling bearing. The results are collectively shown in Table 27 and Table 28. The durability of the rolling bearing (life) in each of the examples and the comparative examples is indicated as a relative value based on the durability of Comparative Example j1 (life) being assumed as 1.

It can be said that the rotational speed in the two types of the test described above is a high speed rotational test for the rolling bearing formed of ceramic materials.

Then, the results of the evaluation for the rolling bearings in which the outer ring, the inner ring and the ball are formed of an identical kind of ceramic material are to be considered.

It can be seen from the results of Examples J1–J14, J20–J28, and Comparative Examples j1–j4 that the load resistance and the durability of the rolling bearing tend to be excellent when the specific strength is 1.2×10$^7$ mm or more and the ratio between the fracture toughness value and the Vickers hardness is larger.

Example J21 is an example in which the ceramic material having a ratio of the fracture toughness value (MPa·m$^{1/2}$) and the Vickers hardness (GPa) of 0.25 or more is silicon nitride (Si$_3$N$_4$) containing silicon carbide (SiC) with a grain size of 1 μm or less. It can be seen that this is particularly excellent in the load resistance and the durability among those rolling bearings constituted with silicon nitride series ceramics.

Silicon nitride containing silicon carbide with particle size of 1 μm or less is obtained by sintering a powder mixture in which 1 to 40 mass % of a silicon carbide powder with a particle size of 1 μm or less and 3 to 20 mass % of a spinnel (MgAl$_2$O$_4$)/zirconia (ZrO$_2$) powder as a sintering aid are blended with a silicon nitride powder and it is preferred that the silicon nitride particle has a structure in which silicon carbide particles are dispersed in the particle and the grain boundary thereof.

The blending amount of the sintering aid (spinnel/zirconia) present in the sintering material is preferably from 3 to 20 mass %. When it is less than 3 mass %, sintering reaction can not be precede efficiently to possibly result in insufficient densification of the sintering product in which cracks tend to propagate to sometimes reach the life of the rolling bearing in a relatively short period of time.

On the other hand, when the blending amount of the sintering aid present in the starting sintering material exceeds 20 mass %, a residual glass phase in the boundary of particles of the silicon nitride matrix increases to deteriorate the mechanical properties such as strength and toughness to sometimes reach the life of the rolling bearing in a relatively short period of time. In order to suppress such a problem, it is preferred that the blending amount of the sintering aid present in the starting sintering material is from 5 to 15 mass %.

The quantity ratio of the two ingredients of spinnel and zirconia constituting the sintering aid is preferably as spinnel/zirconia=1/2–2/1 (weight ratio) in order to develop the effect of the aid more effectively. Further, for zirconia, a so-called partially stabilized zirconia containing about 1–2.8 mol % of yttria (Y$_2$O$_3$) is used preferably in order to suppress and prevent of the phase transfer and lowering of the effect of the sintering aid relevant thereto.

For the silicon carbide as the dispersion phase ingredient, those having a fine particle size of 1 μm or less are used. When the fine powder including nano-meter level size is applied, a structure in which silicon carbide particles are distributed in the particle and on the boundary of the silicon nitride matrix particles can be formed and, as the dispersion effect thereof, since flaking and detachment of particles from the sliding surface can be suppressed and prevented to improve the strength and the toughness and also enhance the wear resistance, so that the rolling bearing can operate stably for a long period of time.

The blending amount of the silicon carbide powder in the starting sintering material is preferably within a range from 1 to 40 mass %. When it is less than 1 mass %, it can not sufficiently improve the toughness of the silicon nitride matrix particles as the dispersion phase, so that it can not provide sufficient effect for suppressing and preventing flaking and detachment of the particles from the sliding surface. On the other hand, when it exceeds 40 mass %, silicon carbide particles tend to be agglomerated to increase the residual porosity and, as a result, the effect of improving the property of the sintered product can no more be ensured. For suppressing such a problem, it is more preferred that the blending amount of the silicon carbide powder present in the starting sintering material is from 5 to 30 mass %.

There is no particular restriction on the method of sintering the silicon nitride containing silicon carbide with a particle size of 1 μm or less but an ambient pressure sintering method of keeping a press molding product of the starting sintering material under heating in an inert atmosphere thereby taking place sintering reaction can be applied. Further, when a hot hydrostatic pressing (HIP) is applied optionally to the sintered product obtained by the atmospheric pressure sintering, higher density and mechanical property can be provided.

Further, Example J27 is an example of a rolling bearing in which an outer ring and an inner ring are formed of an identical kind of ceramic material and the ball is formed of a ceramic material of a type different therefrom. It can be seen from the result that the rolling bearing is excellent in the load resistance and the durability in a case where the ratio of the fracture toughness value and the Vickers hardness is as large as 0.25 or more.

Figure 31:
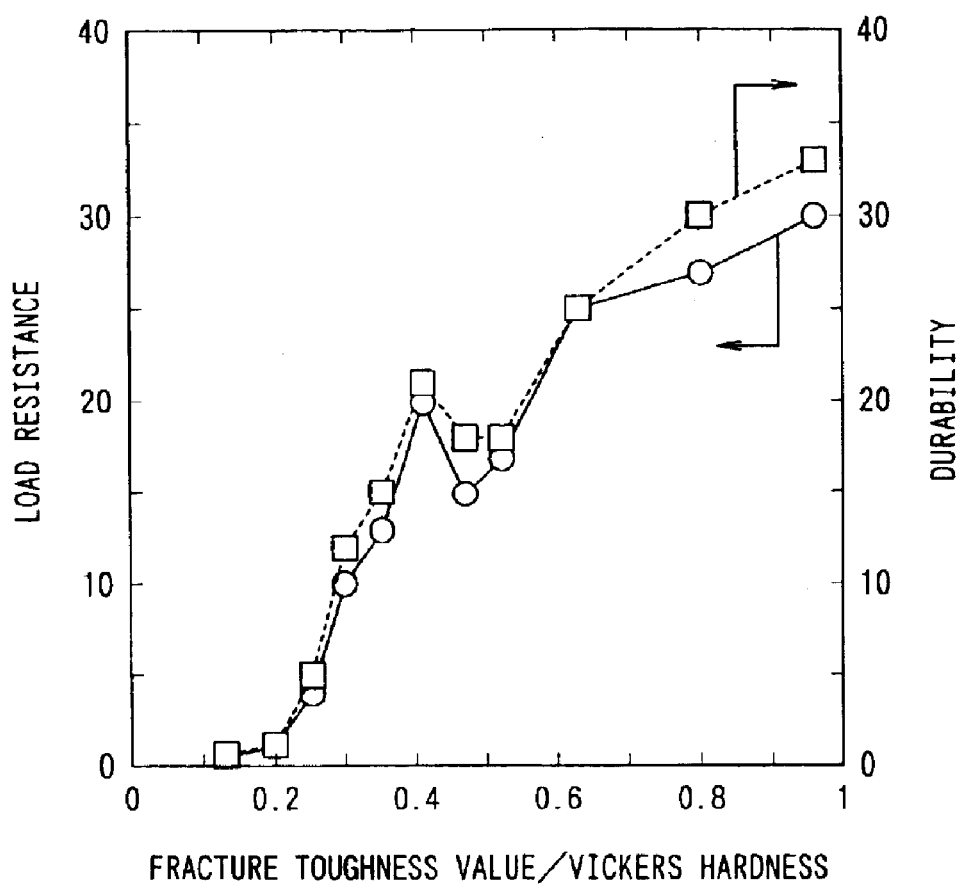
FIG. 31 is a graph showing a correlation between the ratio of the fracture toughness value and the Vickers hardness of ceramic materials and the load resistance and the durability of rolling bearings.

Further, FIG. 31 shows, in a graphic form, the result of evaluation for a portion of the result of Table 27 and Table 28 and that for other rolling bearings (rolling bearing in which outer ring, inner ring and balls are constituted with a ceramic material of an identical type). The abscissa of the graph expresses the ratio of the fracture toughness value and the Vickers hardness of the ceramic material, the ordinate on the left expresses the load resistance and the ordinate on the right expresses the durability. Further, in the graph, data relevant to the load resistance is shown by a symbol "○" while the data relevant to the durability is shown by a symbol "□". As can be seen from the graph in FIG. 31, the load resistance and the durability of the rolling bearing are excellent when the ratio of the fracture toughness value and the Vickers hardness is 0.25 or more. Further, the load resistance and the durability are more excellent as the ratio is 0.35 or more and the load resistance and the durability are further more excellent when it is 0.40 or more.

Then, the result of evaluation for the rolling bearing in which the outer ring and the ball are formed of the identical kind of ceramic material, while the inner ring is formed of a ceramic material of a type different therefrom is to be considered.

In Examples J15–J19, the specific strength of the ceramic material is 1.2×10$^7$ mm or more and the ratio of the fracture toughness value and the Vickers hardness is 0.25 or more for all of the outer ring, the inner ring and the ball. In addition, the ratio of the fracture toughness value and the Vickers hardness of the ceramic material constituting the outer ring, and the ratio of the fracture toughness value and the Vickers hardness of the ceramic material constituting the ball is larger than the ratio of the fracture toughness value and the Vickers hardness of the ceramic material constituting the inner ring.

As can be seen from Table 27 and Table 28, such rolling bearings are excellent in the load resistance and the durability.

As has been described above, this invention can provide a rolling device operating at a high speed, capable of effectively suppressing deterioration of the repetitive positioning accuracy caused by the thermal expansion of the support or the wear of the rolling element, usable stably for a long period of time and capable of improving the strength of the guide rail to the bending moment while keeping the high rigidity of the guide rail and suppressing the wear of the rolling element.

Further, vibrations do not increase for a long period of time, accuracy is high and reliability can be improved in view of the strength. Further, stress concentration to the corner at the recess formed to the guide rail can be moderated. Further, the strength of the guide rail relative to the bending moment can be improved while keeping the high rigidity of the guide rail and the wear of the guide rail and the rolling element can be suppressed.

Further, it can provide a rolling device formed of a ceramic material having a long life even when used under a high load at a high speed, in a corrosive circumstance, in a high temperature circumstance or in a circumstance for supporting a radial load.

Further, it can provide a rolling device that can be used in a place where thermal expansion is large due to temperature elevation, or in a place where temperature gradient is caused to the inside of the rolling device.

Further, it can provide a long life rolling device excellent in corrosion resistance, thermal impact resistance and wear resistance and having a long life even when used at a high speed in a high temperature.corrosive circumstance or in a high temperature circumstance.

What is claimed is:

1. A rolling device comprising a movable member capable of rotation or capable of linear motion, a support for the movable member and a plurality of rolling elements disposed rotationally between the movable member and the support, in which at least one of the movable member, the support and the rolling element is formed of a ceramic material, a cermet or a cemented carbide and the material as a ratio of bending strength and density of $1.2 \times 10^7$ mm or more, wherein the ratio of the bending strength and the density of the material constituting the movable member and the rolling element is larger than the ratio of the bending strength and the density of the material constituting the support.

2. A rolling device comprising a movable member capable of rotation or capable of line motion, a support for the movable member and a plurality of rolling elements disposed rotationally between the movable member and the support, in which at least one of the movable member, the support and the rolling element is formed of a ceramic material, a cermet or a cemented carbide and the material as a ratio of bending strength and density of $1.2 \times 10^7$ mm or more, wherein the ceramic materials, the cermets and the cemented carbides have a thermal impact resistance of 1.5 times or more relative to the temperature in use.

3. A rolling device comprising a movable member capable of rotation or capable of linear motion, a support for the movable member and a plurality of rolling elements disposed rotationally between the movable member and the support, in which at least one of the movable member, the support and the rolling element is formed of a ceramic material, a cermet or a cemented carbide and the material as a ratio of bending strength and density of $1.2 \times 10^7$ mm or more, wherein one of the ceramic materials, cermets and the cemented carbides has a fracture toughness of 10 MPa·m$^{0.5}$ or more.

4. A rolling device comprising a movable member capable of rotation or capable of linear motion, a support for the movable member and a plurality of rolling elements disposed rotationally between the movable member and the support, in which at least one of the movable member, the support and the rolling element is formed of a ceramic material having a ratio of bending strength and density of $1.2 \times 10^7$ mm or more, and the ceramic material has a ratio of fracture toughness value (MPa·m$^{1/2}$) and Vickers hardness (GPa) of 0.25 or more, wherein the ceramic material is silicon nitride containing silicon carbide particles with a particle size of 1 μm or less, and the silicon carbide powder particles are blended in an amount of 1 to 40 mass % of the ceramic material.

5. A rolling device comprising a movable member capable of rotation or capable of linear motion, a support for the movable member and a plurality of rolling elements disposed rotationally between the movable member and the support, wherein the movable member, the support and the rolling element are formed of a ceramic material having a ratio of bending strength and density of $1.2 \times 10^7$ mm or more, and a ratio of the fracture toughness value (MPa·m$^{1/2}$) and the Vickers hardness (GPa) of 0.25 or more, and wherein A1 and A2 satisfy the relation A1, A2>A3, wherein the ratio of the fracture toughness value and the Vickers hardness of the ceramic material constituting the support is A1, the ratio of the fracture toughness value and the Vickers hardness of the ceramic material constituting the rolling element is A2, and the ratio of the fracture toughness value and the Vickers hardness of the ceramic material constituting the movable member is A3.

6. A rolling device comprising a movable member capable of rotation or capable of linear motion, a support for the movable member and a plurality of rolling elements disposed rotationally between the movable member and the support, in which at least one of the movable member, the support and the rolling element is formed of a ceramic material, a cermet or a cemented carbide and the material has a ratio of bending strength and density of $1.2 \times 10^7$ mm or more, wherein the ratio of the linear expansion coefficient between the rolling element and the movable member at normal temperature is 0.45 or less and the ratio of the linear expansion coefficient between the rolling element and the support is 0.45 or less at normal temperature.

7. A rolling device as defined in claim 6, wherein the rolling element is formed of a ceramic material having a ratio of the fracture toughness value (MPa·m$^{1/2}$) and the Vickers hardness (GPa) of 0.40 or more.

8. A rolling device as defined in claim 6, wherein the rolling element is formed of a cemented carbide having a ratio of the fracture toughness value (MPa·m$^{1/2}$) and the Vickers hardness (GPa) 0.40 or more.

9. A rolling device comprising a movable member capable of rotation or capable of line motion, a support for the movable member and a plurality of rolling elements disposed rotationally between the movable member and the support, in which at least one of the movable member, the support and the rolling element is formed of a ceramic material, a cermet or a cemented carbide and the material has a ratio of bending strength and density of $1.2 \times 10^7$ mm or more, wherein the movable member or the support is a guide rail of a linear motion guiding device, and the guide rail is formed of a ceramic material, a cermet or a cemented carbide and has a planar part finished to a surface roughness of 0.5 μmRa or less.

10. A rolling device as defined in claim 9, wherein the ceramic material is a ceramic material having a ratio of the bending strength and the density of $2 \times 10^7$ mm or more.

11. A rolling device as defined in claim 9, wherein the cermet is a cermet having a ratio of the bending strength and the density of $1.7 \times 10^7$ mm or more.

12. A rolling device as defined in claim 9, wherein the cemented carbide is a cemented carbide having a ratio of the bending strength and the density of $1.7 \times 10^7$ mm or more.

13. A rolling device as defined in claim 9, wherein the ceramic material has a fracture toughness value of 5.0 MPa·m$^{0.5}$ or more and a heat conductivity of 46 W/m·K or more.

14. A rolling device as defined in claim 13, wherein the ceramic material is a ceramic material comprising silicon nitride as a main ingredient in which the ratio of the crystalline phase in the grain boundary phase contained in the sintered product is 10% by volume or more.

15. A rolling device as defined in claim 9, wherein the guide rail has a recess and the recess has a corner with a radius of curvature of 0.1 mm or more.

16. A rolling device as defined in claim 9, wherein the rolling element is coated with a hard layer having a thickness of 0.1 $\mu$m to 5.0 $\mu$m.

17. A rolling device as defined in claim 16, wherein the hard layer is formed of at least one of materials of TiN, TiC, TiAlN, TiCN, $Cr_7C_3$, $Cr_2O_3$, CrN, WC, $B_4C$, cBN, CN, TaC, TaN, ZrN, diamond-like carbon and diamond.

18. A rolling device as defined in claim 16, wherein the hard coating layer has a surface roughness of 0.05 $\mu$mRa or less.

19. A rolling device as defined in claim 9, wherein the rolling element has a surface hardness 0.6 to 1.5 times the hardness of the guide rail.

20. A rolling device as defined in claim 9, wherein the rolling element is coated with a nitride layer having a hardness of Hv 800 to Hv 1400.

21. A rolling device as defined in claim 20, wherein the nitride layer has a surface roughness of 0.05 $\mu$mRa or less.

22. A rolling device as defined in claim 9, wherein the rolling element is coated with a composite carbide layer containing a Cr carbide and carbon and having a hardness of Hv 1000 to Hv 1800.

23. A rolling device as defined in claim 22, wherein the composite carbide layer has a surface roughness of 0.05 $\mu$mRa or less.

24. A rolling device as defined in claim 9, wherein the rolling element is coated with a boride layer having a hardness of Hv 1000 to Hv 1700.

25. A rolling device as defined in claim 24, wherein the boride layer has a surface roughness of 0.05 $\mu$mRa or less.

26. A rolling device as defined in any one of claims 9 to 25, wherein the guide rail has a rolling groove of rolling element and the rolling groove of rolling element has a surface roughness of 0.2 $\mu$mRa or less along the lateral direction and the surface roughness of 0.1 $\mu$mRa or less along the longitudinal direction.

* * * * *

UNITED STATES PATENT AND TRADEMARK OFFICE
CERTIFICATE OF CORRECTION

PATENT NO. : 6,874,942 B2
DATED : April 5, 2005
INVENTOR(S) : Toyohisa Yamamoto et al.

It is certified that error appears in the above-identified patent and that said Letters Patent is hereby corrected as shown below:

<u>Title page,</u>
Item [22], delete and insert -- PCT Filed: March 1, 2002 --.
Item [30], Foreign Application Priority Data, should read:
-- July 6, 2001  (JP)  2001-205300 --.

Signed and Sealed this

Eighth Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,874,942 B2　　　　　　　　　　　　　　　　　　　　　　　　　Page 1 of 1
APPLICATION NO. : 10/296155
DATED : April 5, 2005
INVENTOR(S) : Toyohisa Yamamoto et al.

It is certified that error appears in the above-identified patent and that said Letters Patent is hereby corrected as shown below:

<u>Title page,</u>
Item [30], Foreign Application Priority Data, should read:
　　　July 5, 2001　(JP)　　　2001-205300

Signed and Sealed this

Twenty-third Day of October, 2007

JON W. DUDAS
*Director of the United States Patent and Trademark Office*